United States Patent
Soucek

(10) Patent No.: US 8,691,342 B2
(45) Date of Patent: Apr. 8, 2014

(54) MULTI-PHASE SELF-STRATIFYING COATING EXHIBITING GRADIENT BEHAVIOR

(75) Inventor: Mark D. Soucek, Akron, OH (US)

(73) Assignee: The University of Akron, Akron, OH (US)

( * ) Notice: Subject to any disclaimer, the term of this patent is extended or adjusted under 35 U.S.C. 154(b) by 184 days.

(21) Appl. No.: 13/020,630

(22) Filed: Feb. 3, 2011

(65) Prior Publication Data

US 2012/0201965 A1 Aug. 9, 2012

(51) Int. Cl.
*B05D 3/02* (2006.01)

(52) U.S. Cl.
USPC .......... 427/372.2; 427/384; 427/385.5; 427/421.1; 427/427.4; 427/430.1; 427/435

(58) Field of Classification Search
None
See application file for complete search history.

(56) References Cited

U.S. PATENT DOCUMENTS

| | | | |
|---|---|---|---|
| 2004/0011657 A1* | 1/2004 | Muramoto et al. | 205/198 |
| 2004/0127593 A1* | 7/2004 | Berkau et al. | 522/71 |
| 2010/0087596 A1* | 4/2010 | Baghdachi et al. | 524/728 |
| 2010/0317787 A1* | 12/2010 | Baghdachi et al. | 524/441 |

* cited by examiner

*Primary Examiner* — Erma Cameron
(74) *Attorney, Agent, or Firm* — Renner Kenner Greive Bobak Taylor & Weber

(57) ABSTRACT

The present invention relates to multi-phase self-stratifying coating systems, and in particular, to multi-phase self-stratifying coating systems having a substantially homogeneous composition of polymeric binder components that upon application and cure generates a multi-phase stratified coating wherein each phase is rich in a different polymeric binder component and wherein individual phases are separated by a diffuse interface, such that the stratified coating exhibits a gradient behavior wherein a given interface exhibits the attributes of the polymeric binder component that is rich at that interface, and wherein at least one phase is rich in a polymeric binder having a telechelic resin with reactive internal groups, reactive end groups, and an alkoxide oligomer, and at least one other phase is rich in a polymeric binder having a fluorinated polymer derived from fluorinated vinyl-based monomers.

20 Claims, 26 Drawing Sheets a) BPA based Epoxide Resin b) Epoxy Phosphate c) Epoxy Ester a) BPA based Epoxide Resin b) Epoxy Phosphate c) Epoxy Ester a) TEOS Modified Epoxide b) TEOS Modified Epoxy Phosphate c) TEOS Modified Epoxy Ester

MULTI-PHASE SELF-STRATIFYING COATING EXHIBITING GRADIENT BEHAVIOR

FIELD OF THE INVENTION

The present invention relates to multi-phase self-stratifying coating systems, and in particular, to multi-phase self-stratifying coating systems having a substantially homogeneous composition of polymeric binder components that upon application and cure generates a multi-phase stratified coating wherein each phase is rich in a different polymeric binder component and wherein individual phases are separated by a diffuse interface, such that the stratified coating exhibits a gradient behavior wherein a given interface exhibits the attributes of the polymeric binder component that is rich at that interface, and wherein at least one phase is rich in a polymeric binder having a telechelic resin with reactive internal groups, reactive end groups, and an alkoxide oligomer, and at least one other phase is rich in a polymeric binder having a fluorinated polymer derived from fluorinated vinyl-based monomers.

BACKGROUND OF THE INVENTION

Coatings for motor vehicles, airplanes, rail-mounted vehicles and the like typically combine functions of decoration and protection. As such, the development of coatings having desired properties with respect to corrosion protection, scratch resistance, optics, coloring, chemical attack and resistance to a variety of other possible environmental effects is known. In addition, coatings can include multiple layers. For example, the "paint" on a motor vehicle can include a topcoat that has a base layer and a separately applied clearcoat on top of the base layer. The base layer is typically employed for color while the clearcoat provides protection of coating pigments in the base layer, scratch/mark resistance, gloss and/or depth of field.

The application of a coating having multiple separate layers can be costly and present technical challenges such as prolonged application time, increased equipment needs and the like. Therefore, a coating formulation that self-stratifies into, for example, a base layer and a top layer could streamline a coating process, reduce manufacturing costs, etc., and thus would be desirable.

Regarding a base layer, organic/inorganic hybrid materials have received much attention for more than two decades [1, 2], since the hybrids synergistically combine the advantageous properties of both materials. The hybrid materials provide unique properties such as improved physical, mechanical, thermal, gas barrier, and photonic properties [3-7]. A variety of elastomers, thermoplastics, and crosslinked systems have been modified in situ with inorganic materials [8-10]. The hybrid materials have combined the properties of the inorganic materials, i.e. hardness, durability, and thermal stability, and organic polymers, i.e. flexibility and toughness. As a consequence, such hybrids are promising materials for various applications, such as solid state lasers, replacements for silicon dioxide as insulating materials in the microelectronic industry, contact lenses or host materials for chemical sensors [11-14].

Coatings science has also made improvements in corrosion protection, impact, chemical, tamper resistance, antifouling, appearance, flexibility, and impermeability by the application of inorganic/organic hybrid coating systems [15-18]. In the hybrids, the sol-gel technique of alkoxysilanes is one of the useful methods to prepare organic/inorganic hybrid materials, since the reaction can proceed in liquid solution at ambient temperature. The general sol-gel reaction scheme is based on the hydrolysis of various alkoxides to form respective silanols [19]. This is followed by a condensation reaction occurring between silanols or silanols and alkoxides. The organic components of the inorganic-organic hybrids can be, in general, generated either by simultaneous synthesis of two independent (not covalently-bound) polymer networks (organic and inorganic), or by creation of matrices with covalent bonds connecting the organic and inorganic components [20, 21]. Organic monomers or polymers modified with alkoxysilane groups are used as coupling agents to provide bonding to the in situ formed inorganic structure. Strong interaction between organic and inorganic phases has been found to improve the mechanical properties of the hybrid [20, 22, 23].

Silicon sol-gel techniques have been widely used to prevent the corrosion of metals and to improve the coatings adhesion [24-27]. Holmes-Farley and Yanyo [28] used tetraethoxysilane (TEOS) in conjunction with an aminosilane adhesion promoter to prevent corrosion on aluminum substrate. Soucek et al. [29, 30] studied polyurea and polyurethane organic/inorganic films using different sol-gel precursors such as organofunctional alkoxysilanes. The polyurethane/polysiloxane was developed to be a "Unicoat" system [31-33]. In this system, polyurethane provides the general mechanical properties as both the primer and topcoat, and polysiloxane functions as an adhesion promoter and corrosion inhibitor. The ceramer films exhibited enhanced adhesion and corrosion resistance properties via a self-assembly phase separation mechanism. The corrosion resistance was comparable to chromate pretreated systems, and thus part of the body of research devoted to chromate replacement. Organic/inorganic hybrid coatings were also reported mixing drying oils with sol-gel precursors, using an approach developed by Soucek and coworkers [34, 35]. The resulting hybrid coatings showed improved hardness and adhesion with increasing sol-gel precursor content.

There have been few reports to date on the preparation of epoxide resin/silica hybrids. Several researchers [36-38] investigated epoxide resin-montmorillonite hybrids, using the intercalation process and the well-defined dimensions of the clay layers. Landry et al. [39] prepared a hybrid material from a very high molecular weight epoxide, functionalized with γ-aminopropyltriethoxysilane, and silica. Hussain et al. [40] reported the preparation of a hybrid material based on an epoxy resin/silica system, using tetraglycidyl-meta-xylenediamine as the resin. In their study, the hybrid was prepared via producing silica filler, using sol-gel method, which was subsequently incorporated into the epoxy resin mixture. The epoxide-silica interpenetrating networks (IPNs) were also investigated by Bauer et al. [41] and modeled by Matejka et al. [42, 43]. The hybrid systems composed of organic rubbery network and inorganic silica structure formed by the sol-gel process from tetraethoxysilane.

Epoxides, in particular bisphenol-A type (BPA) epoxides, have been the primer of choice for metal since its introduction into the commercial marketplace. Epoxide primers have excellent adhesion to metal due to the secondary hydroxyl group in the repeat unit [44]. Epoxides are also noted for hardness, hydrophobicity, and chemical resistance due to the BPA group. The systematic characterization, evaluation and comparison of the corrosion performance and adhesion for low molecular weight epoxide derivatives/tetraethoxysilane oligomer hybrid systems have not yet been reported.

Regarding a top layer, fluoropolymers are considered an ideal solution for coatings applications requiring chemical resistance (to acids, bases, solvents, and hydrocarbons), high thermal stability [45], low friction [46], and excellent weatherability. The unique combination of optical and electrical characteristics, low dielectric constant, low dissipation factor [47], and low surface energy [48, 49] has also led to growing interest in fluorine chemistry for a wide range of applications. In addition to the fluorinated olefin-based polymers, step growth fluoropolymers have been developed to obtain similar performance characteristics as well as to expand the potential scope of coatings applications. Even low fluorine content results in substantial beneficial properties [50]. Acrylics are non-yellowing and resist chemicals, i.e. gasoline, salt, oil, anti-freeze. Thus, in commercial coatings, fluorinated acrylics are used in the automotive industry, especially for automotive clearcoat formulations.

Fluoroacrylic copolymers have been extensively researched to discover applications in optics [51, 52], electronics [53], and construction (protective [54-56] and high performance coatings [57]). There have been various reports of fluoroacrylates prepared by emulsion polymerization [58-62], atom transfer radical polymerization [63-65], and high radiation polymerization [66, 67]. Furthermore, fluorinated methacrylates have been investigated for the synthesis of fluoropolymers with reduced polymerization shrinkage and improved strength [68]. The effect of fluorinated monomers on reduction of surface energy and surface wettability has also been published elsewhere [69, 70].

A number of fluorinated coatings have also been recently reported. Wynne et al. [71] focused on the surface modification of polyurethanes with short fluorinated side chains. The fluorinated groups improved the hydrophobicity, while retaining the bulk properties of a conventional polyurethane. They also demonstrated that the effectiveness of antimicrobial coatings was dependent on the nature of both fluorinated side chains and quaternary alkylammonium side chains [72]. Ober et al. [73] reported the antifouling coatings based on both hydrophobic (fluorinated) and hydrophilic functionalities as surface domains. They explored the marine organisms' settlement behavior on surface domains with distinct wettability. Delucchi et al. [74] studied the fluoropolyether coatings based on perfluoroether oligomeric diols cured with isocyanates. They concluded that fluorine content is not always the dominating parameter since other physical factors, such as the crosslink density, phase separation, and glass transition temperature, can play major roles on coating performance.

Solventborne high-solids acrylic technology is still widely used in the coatings of automotive and general industrial plastics. The primary advantages of solventborne acrylic technology are adhesion, quick drying, and durability [75]. On the other hand, the requirements of several government regulations have resulted in the product development to improve the environment, which is one of the main drivers in the coatings industry. Therefore, high-solids acrylics have been the subject of continuing research [76-80]. However, a very comprehensive study on synthesis and characterization of fluorinated acrylic copolymers for high-solids coatings has not yet been reported. Since the coating industry still relies on conventional free radical-initiated polymerization for the production of acrylics, it is important to obtain high-solids (60 wt. %) surface active acrylics with moderate polydispersity by a technique capable of economically producing functional acrylic copolymers.

SUMMARY OF THE INVENTION

The present invention provides a multi-phase self-stratifying coating system. The coating system includes a substantially homogeneous composition of polymeric binder components that upon application and cure generates a multi-phase stratified coating wherein each phase is rich in a different polymeric binder component and wherein individual phases are separated by a diffuse interface. The resulting stratified coating exhibits a gradient behavior wherein a given interface exhibits the attributes of the polymeric binder component that is rich at that interface. At least one phase of the coating may be rich in a polymeric binder having a telechelic resin with reactive internal groups, reactive end groups, and an alkoxide oligomer, and at least one other phase of the coating may be rich in a polymeric binder having a fluorinated polymer derived from fluorinated vinyl-based monomers. A crosslinking agent may also be included.

The telechelic resin with reactive internal groups, reactive end groups, and an alkoxide oligomer may be an epoxide that may or may not have two phenol functional groups, for example bisphenol-A (BPA) epoxide, a cycloaliphatic epoxide and the like. In addition, the telechelic resin may be an epoxy phosphate, an epoxy ester, an epoxy molybdate and the like. The alkoxide oligomer can be a metal or non-metal alkoxide oligomer or an alkoxysilane oligomer such as a tetraethylorthosilicate oligomer or a tetramethylorthosilicate.

The polymeric binder having a fluorinated polymer derived from fluorinated vinyl-based monomers may be an acrylate, a fluorinated carboxylic acid, a fluorinated ester, or a fluorinated methacrylate. The acrylate may be a plurality of acrylates that can include, for example, methyl methacrylate, ethyl acrylate, cylcohexyl acrylate, hexyl acrylate, hydroxyacrylate, n-butyl acrylate, 2-hydroxyethyl methacrylate and the like. The fluorinated methacrylate can be 2,2,2-trifluoroethyle methacrylate and the like. The vinyl-fluorinated monomer may further be an fluorinated alcohol esterified with, for example, methacrylic acid, acrylic acid, or acid chlorides thereof. In addition, the crosslinking agent can include a methylated melamine formaldehyde resin, an ethylene glycol acrylate and/or a methylenebisacrylamide.

A process for making the multi-phase self-stratified coating in accord with the foregoing is also provided. The process includes providing a substantially homogeneous composition of polymeric binder components; applying said substantially homogeneous composition of polymeric binder components to a substrate; and curing said substantially homogeneous composition of polymeric binder components to cause the composition self-stratify into a multi-phase coating exhibiting a gradient compositional character, wherein each phase is rich in a different polymeric binder component and phases are separated by a diffuse interface exhibiting the attributes of the polymeric binder component that is rich at that interface.

DETAILED DESCRIPTION OF THE INVENTION

Figure 1:
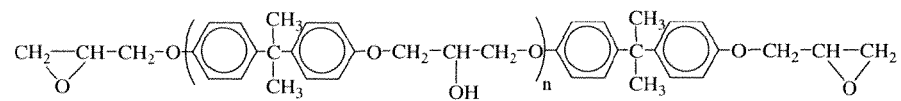
FIG. 1 is a schematic illustration of a chemical structure for: a) BPA based epoxide resin; b) epoxy phosphate; and c) epoxy ester.
Figure 1:
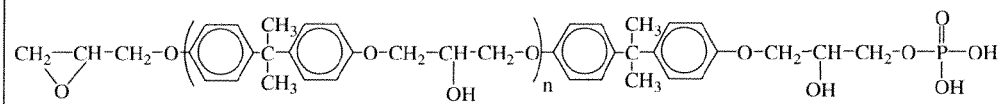
Figure 1:
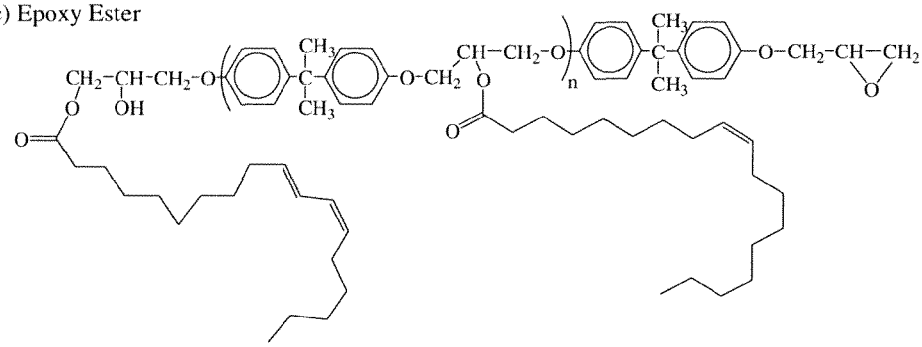

The present invention discloses a multi-phase self-stratifying coating system and a process for generating the coating. In one embodiment, the present invention has utility as a coating for a motor vehicle. It is anticipated, however, that the coating has application beyond motor vehicles, and as such, it is understood that any vehicle coating data, examples, or disclosure are merely representative and are not intended to in any way limit the invention or the use thereof.

The term "self-stratifying" or any variation thereof as used herein refers to a coating having no clear phase or layer separation, but rather having multiple phases establishing a compositional gradient within the resulting coating with respect to any one polymeric binder component. For example, one phase may be predominantly, e.g., have as its highest % component the telechelic resin set forth below, while another phase may have as its highest % component the fluorinated polymer set forth below. Still other phases of the coating may having differing combinations on the basis of percent composition of the polymeric binder components. In addition, the coating thus characterized exhibits a diffuse interface between phases, which may itself be considered a phase. Each diffuse interface within the coating exhibits a behavior consistent with that of the polymeric binder component making up the most of its composition.

The coating system includes a substantially homogeneous composition of polymeric binder components that upon application and cure generates a multi-phase stratified coating wherein each phase is rich in a different polymeric binder component and wherein individual phases are separated by a diffuse interface. The resulting stratified coating exhibits a gradient behavior wherein a given interface exhibits the attributes of the polymeric binder component that is rich at that interface. At least one phase of the coating may be rich in a polymeric binder having a telechelic resin with reactive internal groups, reactive end groups, and an alkoxide oligomer, and at least one other phase of the coating may be rich in a polymeric binder having a fluorinated polymer derived from fluorinated vinyl-based monomers. A crosslinking agent may also be included.

The telechelic resin with reactive internal groups and reactive end groups can be an epoxide having internal hydroxyl groups and telechelic reactive epoxide end groups, that may or may not have two phenol functional groups, for example bisphenol-A (BPA) epoxide, a glycidyl ester, a glycidyl ether, a cycloaliphatic epoxide and the like. In addition, the telechelic resin with reactive internal groups and reactive end groups can be an epoxy phosphate, an epoxy ester, and the like. The alkoxide oligomer can be a metal or non-alkoxide oligomer or a non-metal alkoxysilane oligomer such as a tetraethylorthosilicate oligomer or a tetramethylorthosilicate oligomer.

The fluorinated polymer derived from fluorinated vinyl-based monomers can include one or more acrylates, a fluorinated carboxylic acid, a fluorinated ester, and a fluorinated methacrylate. The acrylates for example may include methyl methacrylate, ethyl methacrylate, cyclohexyl acrylate, hexyl acrylate, n-butyl acrylate, 2-hydroxyethyl methacrylate, and the like. The fluorinated ester may include fluorinated alcohol esterified with a methacrylic acid, an acrylic acid, acid chlorides thereof, and the like. The fluorinated methacrylate can be 2,2,2-trifluoroethyle methacrylate, and the like. In addition, the crosslinking agent can include a methylated melamine formaldehyde resin, an ethylene glycol acrylate and/or a methylenebisacrylamide.

A process for making the multi-phase self-stratified coating in accord with the foregoing is also provided. The process includes providing a substantially homogeneous composition of polymeric binder components; applying said substantially homogeneous composition of polymeric binder components to a substrate; and curing said substantially homogeneous composition of polymeric binder components to cause the composition to self-stratify into a multi-phase coating exhibiting a gradient compositional character, wherein each phase is rich in a different polymeric binder component and phases are separated by a diffuse interface exhibiting the attributes of the polymeric binder component that is rich at that interface. The substantially homogeneous composition is in accord with the system set forth hereinabove. It is appreciated that the process contacts the various components polymeric components in such a manner that the components mix into a single, substantially homogeneous solution that can be applied to a surface. It is further appreciated that the coating composition can be applied to a surface as a single layer and/or using a single spray application, and the single layer will self-stratify to afford the multi-phase coating described more fully below. As used herein, the term "substantially homogeneous" refers to a solution that is fully integrated or mixed, with little or no apparent phase separation.

In order to better illustrate one or more embodiments of the invention, and yet in no way limit the scope of the invention, at least one example of the various phases of the gradient composition is provided below. The term "phase" may sometimes be used interchangeably with the term "layer" herein, and both shall be considered to refer to phases within the gradient coating as defined above and set forth below more fully.

I. Telechelic Resin Phase

Telechelic resins with reactive internal groups and reactive end groups (epoxy phosphate and epoxy ester) were synthesized using bisphenol-A (BPA) epoxide. In one embodiment, the bisphenol-A based epoxide, the epoxy phosphate, and the epoxy ester were modified with tetraethylorthosilicate (TEOS) oligomers, which were prepared through the hydrolysis and condensation of TEOS monomer with water under acidic condition. The epoxide/polysilicate (organic/inorganic) hybrid systems were characterized systematically, using fourier transform infrared spectroscopy (FTIR); $^1$H, $^{13}$C, $^{31}$P, and $^{29}$Si nuclear magnetic resonance (NMR); and matrix-assisted laser desorption/ionization time of flight mass spectroscopy (MALDI-TOF). The modified epoxides were thermally cured with a melamine-formaldehyde resin, and cast on steel substrates. The coating performance of the modified epoxides was evaluated by pencil hardness, cross-hatch adhesion, reverse and direct impact resistance, mandrel bending, and pull-off adhesion. Viscoelastic properties of the hybrid systems were also evaluated as a function of polysilicate content. Corrosion performance was evaluated via salt spray (fog) test for 264 hours. Salt spray analysis revealed that inorganically modified epoxides provided improvement over the unmodified epoxide resins with respect to both corrosion resistance and adhesion to steel substrates.

Bisphenol-A (BPA) based liquid epoxide (trade name: DER 317) was obtained from Dow Chemicals. Pamolyn 380 mixture of fatty acids (70 wt. % conjugated linoleic acid, the remaining portion is oleic and nonconjugated linoleic acid) was obtained from Eastman Chemical Company. Tetraethoxysilane (TEOS), phosphoric acid (ACS reagent, ≥99.0%), hydrochloric acid (37 wt. % in water), ethanol, p-xylene (puriss. p.a., ≥99.0%), diethylene glycol butyl ether (puriss. p.a., ≥99.2%), and dibutyltin oxide were purchased from Aldrich Chemical Company. Methanol-etherified melamine formaldehyde resin (trade name: Luwipal 072) was obtained from BASF Corporation. Plain steel (0.020 inch thick) substrates were purchased from The Q-Panel Company. All of the materials were used as received. The chemical structures of materials are shown in Table 1.

TABLE 1

Chemicals nomenclature and structure

| Chemicals | Nomenclature | Structure |
|---|---|---|
| Sol-gel Precursor | Tetraethoxysilane (TEOS) | |
| DER317 Epoxide Resin | Bisphenol-A Based Epoxide | 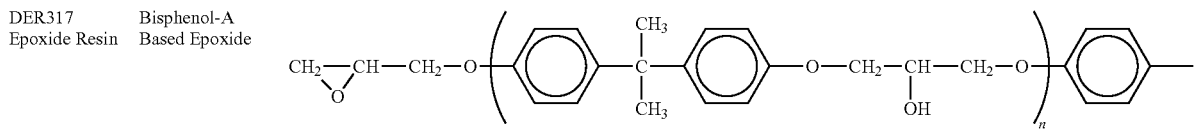 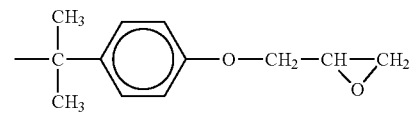 |

TABLE 1-continued

Chemicals nomenclature and structure

| Chemicals | Nomenclature | Structure |
| --- | --- | --- |
| Pamolyn 380 Mixture of Fatty Acids | Conjugated Linoleic Acid (70 wt. %) | (structure of conjugated linoleic acid) |
| Solvent | p-Xylene | (structure of p-xylene) |
| Solvent | Ethanol | HO–CH2CH3 |
| Solvent | Diethylene Glycol Butyl Ether | (structure of diethylene glycol butyl ether) |
| Catalyst | Dibutyltin Oxide | (structure of dibutyltin oxide) |
| Catalyst | Hydrochloride Acid | H—Cl |
| Acid | Phosphoric Acid | (structure of phosphoric acid) | a. Epoxide Equivalent Weight Determination

Epoxide equivalent weight was determined according to ASTM D1652-97. Liquid epoxide resin (DER 317, 0.3 g) was put into a 250-mL Erlenmeyer flask. Methylene chloride (30 mL) was also added to the flask to dissolve the resin. Tetraethyl ammonium bromide (3.75 g) was dissolved in glacial acetic acid (15 mL) and the solution was mixed with epoxide using a magnetic stirrer. A few drops of phenolphthalein solution (0.1 wt. % in methanol) were added as an indicator. The titration was performed with a perchloric acid solution (0.1 N in glacial acetic acid). Epoxide equivalent weight was calculated using the equation below:

$$EEW = \frac{W \times 1000}{V \times N} \quad (1)$$

where W is the weight of the epoxide (g), V is the amount of 0.1 N perchloric acid solution used for sample titration (mL), and N is the normality of the perchloric acid solution. The equivalent weight of epoxide was calculated as 192 g/eq. After EEW determination, n was calculated as 0.155 based on the chemical structure of liquid epoxide resin depicted in Table 1.

b. Synthesis of BPA Based Epoxy Phosphate (EP)

Based on epoxide resin, 1 wt. % phosphoric acid (1 g, 0.0102 mol) was dissolved in diethylene glycol butyl ether (9.67 g, 0.0596 mol, 10 mL). The solution was added dropwise to a round-bottom four-neck flask (500 mL) containing epoxide resin (DER 317, 100 g) while the mixture was mechanically stirred. The reaction was carried out at 150° C. for 1 h. 2 wt. % (based on epoxy resin) distilled water (2.00 g, 0.111 mol) was then added to the hot mixture, and stirred at 150° C. for 2 h. The number average molecular weight ($M_n$) obtained by gel permeation chromatography (GPC) was 543 with a polydispersity index of 1.48. $^{31}$P NMR shows a singlet at 108.2 ppm, assigned to phosphorous in C—O—P group. $^1$H and $^{13}$C NMR resonance assignments of the epoxy phosphate are given in Table 2.

TABLE 2

$^1$H and $^{13}$C NMR resonance assignments of epoxy phosphate

| Structural Group | $^1$H NMR (ppm) | Structural Group | $^{13}$C NMR (ppm) |
| --- | --- | --- | --- |
| P—O$\underline{H}$ | 1.32-1.38 | — | — |
| C(C$\underline{H_3}$)$_2$‡ | 2.07 | C($\underline{C}H_3$)$_2$ | 30.70 |

TABLE 2-continued 1H and 13C NMR resonance assignments of epoxy phosphate

| Structural Group | 1H NMR (ppm) | Structural Group | 13C NMR (ppm) |
|---|---|---|---|
| C$\underline{H}_2$—O—C$\underline{H}$§ | 3.16-3.19 | C$\underline{H}_2$—O—CH | 43.93 |
| C$\underline{H}_2$—O—C$\underline{H}$§ | 3.31-3.34 | CH$_2$—O—$\underline{C}$H | 49.71 |
| CH—C$\underline{H}_2$—O | 3.50-4.60 | CH—$\underline{C}$H$_2$—O* | 68.53 |
| C$\underline{H}$—OH | 3.50-4.60 | $\underline{C}$H—OH* | 68.53 |
| CH(OH)—C$\underline{H}_2$—O | 3.50-4.60 | CH(OH)—$\underline{C}$H$_2$—O* | 68.53 |
| C$\underline{H}$ϵ | 7.24 and 7.56-7.59 | $\underline{C}$H† | 113.70$^a$ and 127.40$^b$ |
| — | — | $\underline{C}$—C(CH$_3$)$_2$□ | 143.1 |
| — | — | $\underline{C}$—O—CH$_2$□ | 156.0 |

‡Pendant methyl groups in the bisphenol-A based epoxide network.
§1,2-oxirane ring.
ϵProtons in the benzene ring.
*Peak originating from carbon atoms directly bonded to an oxygen atom.
†Carbons in the benzene ring are attached to a carbon atom which is directly bonded to either an oxygen atom$^a$ or a carbon atom$^b$.
□Aromatic carbon.

c. Fatty Acid Equivalent Weight Determination

Fatty acid (Pamolyn 380, 2 g) was dissolved in high purity grade acetone (39.25 g, 50 mL) in a 250-mL Erlenmeyer flask. 3-4 drops of phenolphthalein solution (0.1 wt. % in methanol) were added as an indicator. The solution was then titrated with a KOH solution (0.1 N in methanol). Fatty acid equivalent weight was determined by the equation below:

$$E_{FA} = \frac{W \times 1000}{(B-V) \times N} \quad (2)$$

where W is the weight of the fatty acid (g), B is the amount of 0.1 N KOH solution used for blank test (mL), V is the amount of 0.1 N KOH solution used for sample titration (mL), and N is the normality of the KOH solution. The equivalent weight of fatty acid was determined as 321 g/eq.

d. Synthesis of BPA Based Epoxy Ester (EE)

Esterification reaction was conducted in a 500-mL, round bottom, four-necked flask placed in a heating mantle which was connected to a temperature controller and the reaction flask was equipped with a thermometer, a mechanical stirrer, a nitrogen gas inlet, a Dean-Stark trap, and a reflux condenser. The liquid epoxy resin (DER 317, $M_n$=356 with a polydispersity index of 1.03, $E_E$=192 g/eq.) was reacted with fatty acid (Pamolyn 380, $E_{FA}$=321 g/eq.) based on 1:1 equivalence ratio of epoxide group to fatty acid group. Accordingly, the epoxide resin (100 g.), fatty acid (167 g.), xylene (10.68 g, 0.1008 mol, 4 wt. % based on total amount of epoxide and fatty acid) and catalyst, dibutyltin oxide (0.8010 g, 0.0032 mol, 0.3 wt. % based on total amount of epoxide and fatty acid) were all charged to the reaction flask. The reaction mixture was heated slowly to 210° C. and kept at that temperature for 6 h until the acid value is below 5 mg KOH/g. (ASTM D1639-90). The number average molecular weight ($M_n$) was measured as 1528 with a polydispersity index of 1.42. 1H and 13C NMR resonance assignments of the epoxy ester are given in Table 3.

TABLE 3

1H and 13C NMR resonance assignments of epoxy ester

| Structural Group | 1H NMR (ppm) | Structural Group | 13C NMR (ppm) |
|---|---|---|---|
| C$\underline{H}_3$¥ | 0.8-1.0 | $\underline{C}$H$_3$ | 14.1 |
| C$\underline{H}_2$¥ | 1.4 | $\underline{C}$H$_2$ | 23-35 |
| C(C$\underline{H}_3$)$_2$‡ | 1.7-1.8 | C($\underline{C}$H$_3$)$_2$ | 31 |
| OC(=O)CH$_2$C$\underline{H}_2$ | 1.7-1.8 | $\underline{C}$(CH$_3$)$_2$ | 42.4 |
| OC(=O)C$\underline{H}_2$CH$_2$$^\alpha$ | 2.1 | OC(=O)$\underline{C}$H$_2$CH$_2$ | 33.9 |
| C$\underline{H}_2$—O—CH§ | 2.5-2.8 | $\underline{C}$H$_2$—O—CH | 44.2 |
| CH$_2$—O—C$\underline{H}$§ | 3.2 | CH$_2$—O—$\underline{C}$H | 50.0 |
| C$\underline{H}$(—OH)CH$_2$OC(=O) | 4.4-4.9 | $\underline{C}$H(—OH)CH$_2$OC(=O)* | 67.1-71.3 |
| CH(—OH)C$\underline{H}_2$OC(=O) | 4.4-4.9 | CH(—OH)$\underline{C}$H$_2$OC(=O)* | 67.1-71.3 |
| OC$\underline{H}_2$CH(—OC(=O)) | 4.4-4.9 | O$\underline{C}$H$_2$CH(—OC(=O))* | 67.1-71.3 |
| OCH$_2$C$\underline{H}$(—OC(=O) | 4.4-4.9 | OCH$_2$$\underline{C}$H(—OC(=O)* | 67.1-71.3 |
| C$\underline{H}$=C$\underline{H}$CH$_2$C$\underline{H}$=C$\underline{H}$CH$_2$Δ | 5.4-6.2 | $\underline{C}$H=$\underline{C}$HCH$_2$$\underline{C}$H=$\underline{C}$HCH$_2$ | 127.0-132.2 |
| C$\underline{H}$ϵ | 6.7-7.6 | $\underline{C}$H† | 114.5$^a$ and 128.3$^b$ |
| — | — | $\underline{C}$—C(CH$_3$)$_2$□ | 140.7 |
| — | — | $\underline{C}$—O—CH$_2$□ | 155.8 |
| — | — | $\underline{C}$=O | 173.6 |

¥Methyl or methylene or methyne groups in the ester chain.
‡Pendant methyl groups in the bisphenol A based epoxide network.
$^\alpha$Protons of carbon atom which is attached to carboxyl group in the ester chain.
§1,2-oxirane ring.
ΔProtons of methylidyne/methyne groups in the ester chain.
ϵProtons in the benzene rings.
*Peak originating from carbon atoms directly bonded to an oxygen atom.
†Carbons in the benzene ring are attached to a carbon atom which is directly bonded to either an oxygen atom$^a$ or a carbon atom$^b$.
□Aromatic carbon.

e. Preparation of TEOS Oligomers and TEOS Oligomer Modified Epoxides

Tetraethylorthosilicate (TEOS, 100 g, 0.48 mol) was dissolved in ethanol (88.32 g, 1.92 mol) in a round-bottom flask (250 mL); distilled water (8.64 g, 0.48 mol) was then added into the mixture. After the water dissolved, hydrochloric acid (0.175 g, 0.0048 mol) was added dropwise, while the mixture was mechanically stirred. The reaction was carried out at ambient temperature for 96 h. The unreacted residuals in the mixture were removed using a rotary evaporator at 50° C. to afford TEOS oligomers (77.23% yield based on TEOS). The product was characterized by $^1$H and $^{29}$Si NMR, FTIR, and ESI-MS. Later, commercial epoxide, synthesized phosphated epoxy and synthesized epoxy ester were all mixed with TEOS oligomer solution in different weight ratios (2.5 wt. %, 5 wt. %, 7.5 wt. % and 10 wt. %; based on total solution) and stirred under acidic condition at 40° C. for 72 h to produce the corresponding hybrid systems prior to being mixed with the crosslinking agent. $^1$H and $^{13}$C NMR resonance assignments of TEOS oligomer modified epoxy phosphate and epoxy ester are given in Table 4.

TABLE 4

$^1$H and $^{13}$C NMR resonance assignments of inorganic modified epoxy derivatives; epoxy ester (EE) and epoxy phosphate (EP)

| Structural Group | $^1$H NMR (ppm) EE | $^1$H NMR (ppm) EP | Structural Group | $^{13}$C NMR (ppm) EE | $^{13}$C NMR (ppm) EP |
|---|---|---|---|---|---|
| C$\underline{H}_3$* | 0.9-1.1 | — | $\underline{C}H_3$ | 14.0-14.2 | — |
| SiOCH$_2$C$\underline{H}_3$ | 0.9-1.1 | 1.1 | SiO$\underline{C}H_2$CH$_3$ | 18.3-18.6 | 19.1 |
| C$\underline{H}_2$* | 1.3-1.4 | — | $\underline{C}H_2$ | 22.3-34.1 | — |
| PO$\underline{H}$ | — | 1.3-1.4 | $\underline{C}$(CH$_3$)$_2$ | 41.7 | 41.5 |
| C(C$\underline{H}_3$)$_2$‡ | 1.7-1.8 | 1.7-1.8 | C($\underline{C}$H$_3$)$_2$ | 31.1 | 30.9 |
| OC(=O)C$\underline{H}_2$CH$_2$ | 1.7-1.8 | — | OC(=O)$\underline{C}$H$_2$CH$_2$ | 24.9 | — |
| OC(=O)C$\underline{H}_2$CH$_2$$^\alpha$ | 2.2-2.3 | — | OC(=O)$\underline{C}$H$_2$CH$_2$ | 25.7 | — |
| C$\underline{H}_2$—O—CH§ | 2.4-2.5 | 2.8-2.9 | $\underline{C}$H$_2$—O—CH | 44.7 | 44.5 |
| CH$_2$—O—C$\underline{H}$§ | 2.9-3.1 | 3.0-3.1 | CH$_2$—O—$\underline{C}$H | 50.3 | 50.1 |
| SiOC$\underline{H}_2$CH$_3$ | 3.8-4.6 | 3.5-4.4 | SiO$\underline{C}$H$_2$CH$_3$ | 58.2-61.6 | 61.5 |
| OCH$_2$C$\underline{H}$(—OSi)CH$_2$) | 3.8-4.6 | — | OCH$_2$$\underline{C}$H(—OSi)CH$_2$) | 62.5-63.6 | 63.6 |
| CH—C$\underline{H}_2$—O | — | 3.5-4.4 | CH—$\underline{C}$H$_2$—O | 65.2-66.2 | 68.6 |
| C$\underline{H}_2$(O(C=O))CH(—OSi) | 3.8-4.6 | — | $\underline{C}$H$_2$(O(C=O))CH(—OSi) | 68.5-68.7 | — |
| C$\underline{H}_2$—O—P | — | 3.5-4.4 | $\underline{C}$H$_2$—O—P | — | 70.4 |
| CH$_2$(O(C=O))C$\underline{H}$(—OSi) | 3.8-4.6 | — | CH$_2$(O(C=O))$\underline{C}$H(—OSi) | 70.5 | — |
| OC$\underline{H}_2$CH(—OSi)CH$_2$) | 3.8-4.6 | 3.5-4.4 | O$\underline{C}$H$_2$CH(—OSi)CH$_2$) | 72.7 | 72.5 |
| C$\underline{H}^\varepsilon$ | 6.9-7.4 | 6.9-7.3 | $\underline{C}$H† | 113.9$^a$ | 113.9$^a$ |
|  |  |  |  | 127.8$^b$ | 127.6$^b$ |
| — | — | — | $\underline{C}$—C(CH$_3$)$_2^\square$ | 143.6 | 143.4 |
| — | — | — | $\underline{C}$—O—CH$_2^\square$ | 156.2 | 156.2 |
| — | — | — | $\underline{C}$=O | 173.5 | — |

¥Methyl or methylene or methyne groups in the ester chain.
‡Pendant methyl groups in the bisphenol A based epoxide network.
$^\alpha$Protons of carbon atom which is attached to carboxyl group in the ester chain.
§1,2-oxirane ring.
$^\Delta$Protons of methylidyne/methyne groups in the ester chain.
$^\varepsilon$Protons in the benzene rings.
*Peak originating from carbon atoms directly bonded to an oxygen atom.
†Carbons in the benzene ring are attached to a carbon atom which is directly bonded to either an oxygen atom$^a$ or a carbon atom$^b$.
$^\square$Aromatic carbon.

f. Film Preparation and Coating Tests

Film formation was performed by crosslinking the epoxy derivatives with melamine formaldehyde (MF) resin, based on 2:1 equivalence ratio of methoxy groups in MF resin to hydroxy groups in the epoxide. Equivalent weight of MF resin was taken as 80 g/eq, resulting from the presence of dimers, trimers, and higher oligomers [81]. As a strong acid catalyst, p-toluenesulfonic acid monohydrate, 1 wt. % of the MF resin was added to the formulation. The mixtures were stirred for 1 h; later, thin films were cast on steel panels by a draw-down bar with a wet thickness of 125 μm. The wet films were placed in a dust free dry environment at room temperature for 24 h, and were thermally cured at 120° C. for 1 h. The films were used for salt spray (fog) test (ASTM B117) and for coating tests such as pencil hardness (ASTM D3363), cross-hatch adhesion (ASTM D3359), pull-off adhesion (ASTM D4541), impact resistance (ASTM D2794), mandrel bend test (ASTM D522-93), and solvent (MEK) resistance (ASTM D4752). Dry film thickness was typically 50-80 μm. All films were kept for 7 days before testing.

The nomenclature developed to represent the hybrid systems in this study, is focused on the type of the epoxide and the concentration of TEOS in the composition. The designation consists of a term and a number. The first term, "E", "EP", or "EE", defines epoxide, epoxide phosphate, or epoxide ester, respectively. The second term (0, 2.5, 5, 7.5, or 10) designates the alkoxysilane present in the coating. The number quantifies the weight fraction of TEOS relative to the total composition.

g. Instruments

Fourier transform infrared (FTIR) spectroscopy was performed with 32 scans in 4000-400 cm$^{-1}$ on a Thermo Scientific Nicolet 380 FTIR with a diamond crystal UATR. $^1$H NMR, $^{13}$C NMR and $^{31}$P NMR spectra were recorded on a Gemini-300 MHz spectrometer (Varian) in chloroform-d as a solvent. $^{29}$Si-NMR spectra were recorded on a Gemini-400 MHz spectrometer (Varian) in chloroform-d as a solvent. Chemical shifts in $^{29}$Si-NMR spectra were determined relative to tetramethylsilane (TMS) reference.

Gel permeation chromatography was performed using a Waters Breeze GPC system consisting of an isocratic HPLC pump, a refractive index detector and a column set consisting of three styragel HR series columns; HR1, HR2, and HR3.

Polystyrene (PS) standards were used to calibrate the system. The sample was prepared in distilled tetrahydrofuran (THF) to obtain a 1% (v/v) concentration. Solutions were filtered on 0.45 μm membrane syringe filters and 200 μL was injected into the chromatograph at room temperature with an eluent flow rate of 1.0 mL·min$^{-1}$.

Mass spectral experiments were performed to assist in determining the chemical structure of copolymers, using a Bruker REFLEX-III time-of-flight matrix-assisted laser desorption ionization mass spectrometer (Bruker Daltonics, Billerica, Mass.) equipped with an LSI model VSL-337ND pulsed nitrogen laser (337 nm, 3 nm pulse width), a two-stage gridless reflector and a single stage pulsed ion extraction source. Separate THF (anhydrous, ≥99.9≥99.9; Aldrich) solutions of dithranol matrix (20 mg/mL) (>97%; Alfa Aesar), sodium trifluoroacetate (10 mg/mL) (>98%; Aldrich) and copolymer (10 mg/mL) were mixed in a ratio of matrix:cationizing salt:copolymer (10:1:2), and 0.5 μL of the resulting mixture was introduced onto the MALDI target plate. The spectra were obtained in the reflectron mode. The attenuation of the nitrogen laser was adjusted to minimize unwanted copolymer fragmentation and to maximize the sensitivity. The calibration of mass scale was carried out externally using poly(methyl methacrylate) standard (Fluka) with a similar molecular weight as the sample.

The viscoelastic properties were measured on a dynamic mechanical thermal analyzer (Perkin Elmer Instruments, Pyris Diamond DMTA), with a frequency of 1 Hz. in tensile mode, and a heating rate of 3° C./min over a range of −50 to 200° C. $N_2$ flow rate set to 40 psi was circulated in the DMTA furnace during the measurements. The gap distance was set at 2 mm for rectangular test specimens (length 15 mm, width 8-10 mm and thickness 0.05-0.08 mm). Reproducibility of the DMTA data was verified by scanning over the useful temperature range multiple times.

Pull-off adhesion testing on the coatings was carried out using Elcometer 106 adhesion tester. Three aluminum pull stubs (dollies) were glued to each test panel using a commercial two-part epoxy adhesive. The adhesive was cured for 24 h prior to testing. The tester applied a true axial tensile stress to pull the stub off and the bond strength between the coating and the test surface was quantitatively measured. Average values of bond strengths obtained from three dollies were reported in $lb_f/in^2$.

Salt spray testing [82] was conducted according to ASTM B117. Coated steel panels were scribed through the coating in a standardized fashion exposing bare substrate and suspended in a salt spray chamber where the panels were exposed to a mist of 5% NaCl solution sprayed by atomizer with a nozzle pressure of 10-12 psi. During the test, the chamber was sealed air tight. The temperature and relative humidity inside the chamber were maintained at 35±2° C. and 99±1%, throughout the test period of 264 h. The condition of the coated panels was closely examined periodically for any surface change by visual inspection. The non-scribed areas were examined for blistering, and the scribe was observed to see how far from the scribe mark the coating was undercut or lost adhesion. The digital images of the coated panels were taken at 96 and 264 h intervals.

h. Results

Commercially obtained BPA based epoxide was chemically modified by three different chemical groups; fatty acid, phosphoric acid, and TEOS oligomer. Tetraethylorthosilicate (TEOS) oligomers were prepared through the hydrolysis and condensation of TEOS with water under acidic condition. The organic/inorganic hybrid systems were characterized utilizing FTIR spectroscopy, $^1H$, $^{13}C$, $^{31}P$ and $^{29}Si$-NMR and mass spectrometry. The corrosion resistance was examined, exposing the coatings to the salt spray (fog) test. Coating properties were evaluated before the 264 hour salt spray exposure. Viscoelastic properties of the films were investigated as a function of TEOS oligomer content.

i. Preparation and Depiction of Organic/Inorganic Hybrid Systems

Bisphenol-A based epoxide resin was modified with phosphoric acid and fatty acid to obtain epoxy phosphate and epoxy ester, respectively. The chemical structures of the epoxy derivatives are depicted in FIG. 1.

Figure 2:
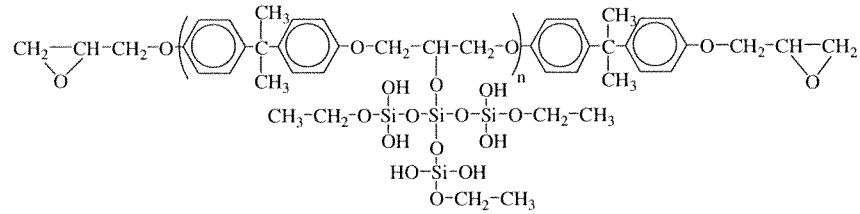
FIG. 2 is a schematic illustration of a chemical structure for: a) BPA based epoxide resin; b) epoxy phosphate; and c) epoxy ester, modified with TEOS oligomers.
Figure 2:
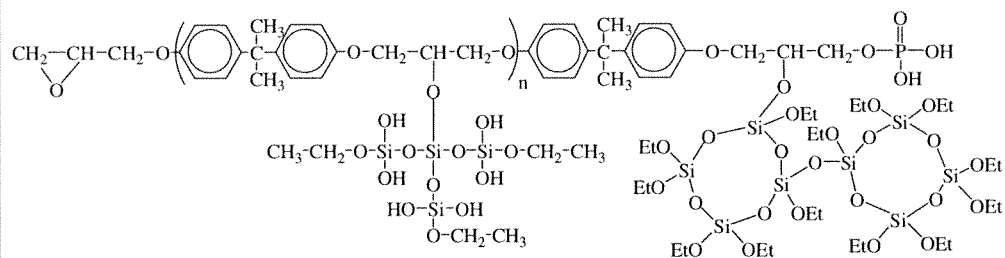
Figure 2:
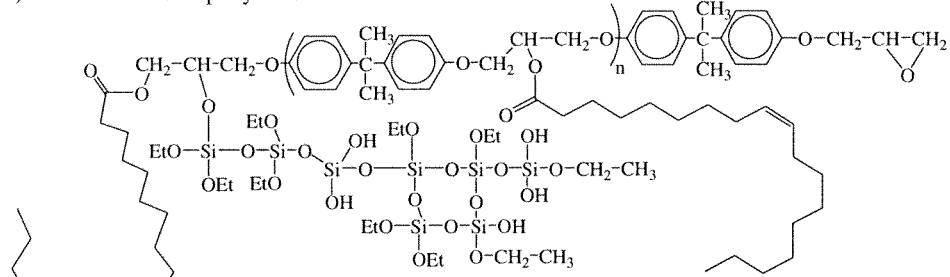

The covalent bonds between inorganic and organic networks may form by the reaction of silanol groups of hydrolyzed tetraethoxysilane clusters and pendant hydroxyl group in the $CH_2CH(OH)CH_2O$ segment of the epoxide. The inorganic structure grafted to epoxy derivatives may exist in different forms as cyclic and/or linear polysilicates. FIG. 2 illustrates the inorganic modified epoxide network structures.

ii. Structural Characterization of Epoxide Derivatives

Figure 3:
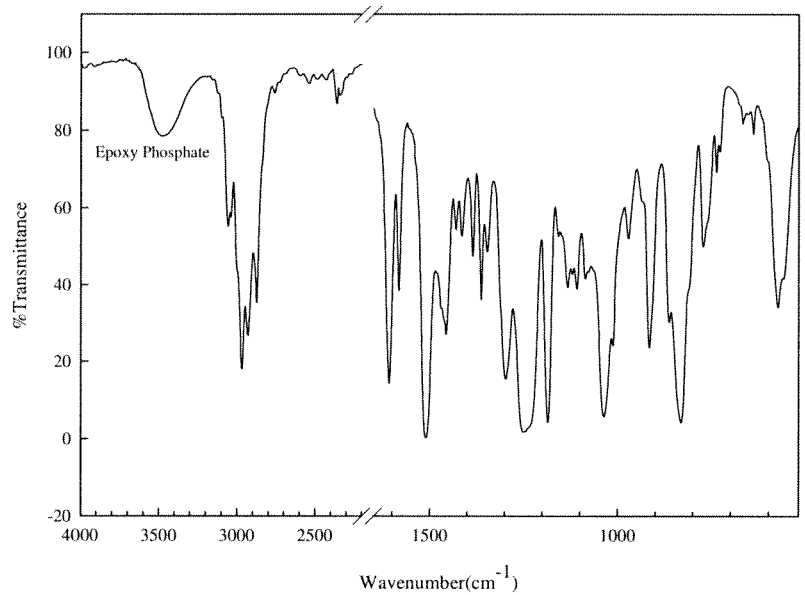
FIG. 3 is a Fourier transform infrared spectroscopy (FTIR) spectrum of the bisphenol-A based epoxy phosphate.

The room temperature FTIR transmission spectrum (FIG. 3) confirms the structure of the bisphenol-A based epoxy phosphate (EP) in all aspects. A very broad absorption peak in the range 3200-3700 cm$^{-1}$ is attributed to O—H stretching arising from pendant hydroxyl groups in the phosphated epoxide structure. Any C—H stretching bands above 3000 cm$^{-1}$ result from aromatic C—H stretching. Thus, two closely spaced absorption bands at 3057 and 3036 cm$^{-1}$ are assigned to the asymmetrical and symmetrical aromatic C—H stretching vibrations in the benzene ring of bisphenol-A and in the oxirane ring (epoxide group). Three distinct bands occurring at 2967, 2928, and 2871 cm$^{-1}$ are due to asymmetrical and symmetrical C—H stretching modes of several methyl ($CH_3$) and methylene ($CH_2$) groups in the structure. The double absorption bands at around 2350 cm$^{-1}$ is assigned to P—OH stretching vibrations [83]. Weak combination and overtone bands appear in the 1650-2100 cm$^{-1}$ region (not shown, used an axis break in FIG. 3).

Three strong bands at 1610, 1580, and 1506 cm$^{-1}$ can be attributed to the aromatic C═C and C—C stretchings of benzene rings in the structure. The absorption bands at 1454 and 1362 cm$^{-1}$ results from out-of-phase (asymmetrical) and in-phase (symmetrical) bending vibrations of C—H bonds in methyl ($CH_3$) groups, respectively. The absorption band at 1383 cm$^{-1}$ is attributed to C—H scissoring vibration of methylene ($CH_2$) groups. The intensity of the band, arising from the symmetrical bending of the methyl C—H bonds, is greater than that for the asymmetrical methyl bending vibration or the methylene scissoring vibration. Methylene twisting and wagging vibrations are observed in the 1350-1150 cm$^{-1}$ region. A strong band in the 1260-1200 cm$^{-1}$ region is the asymmetrical C—O—C stretching vibration in the 1,2-oxirane ring or benzene ring, and the P═O stretching of the phosphate units. A shoulder at 1160 cm$^{-1}$ is assigned to the vibration modes of P—O bonds [84].

The band at 1035 cm$^{-1}$ is ascribed to the symmetrical C—O—C stretching vibrations in the epoxy ring and benzene rings. Two distinct bands occurring at 971 and 914 cm$^{-1}$ are due to out-of-plane C—H bending (twisting) vibrations of methyl and methylene groups in the structure. On the other hand, aromatic out-of-plane C—H bending vibrations in the structure appear at 831 and 775 cm$^{-1}$. As a result, the modification of BPA based epoxide with phosphoric acid produced small variations, raising slightly the intensity and/or width of different bands related to the phosphorous atom.

Figure 4:
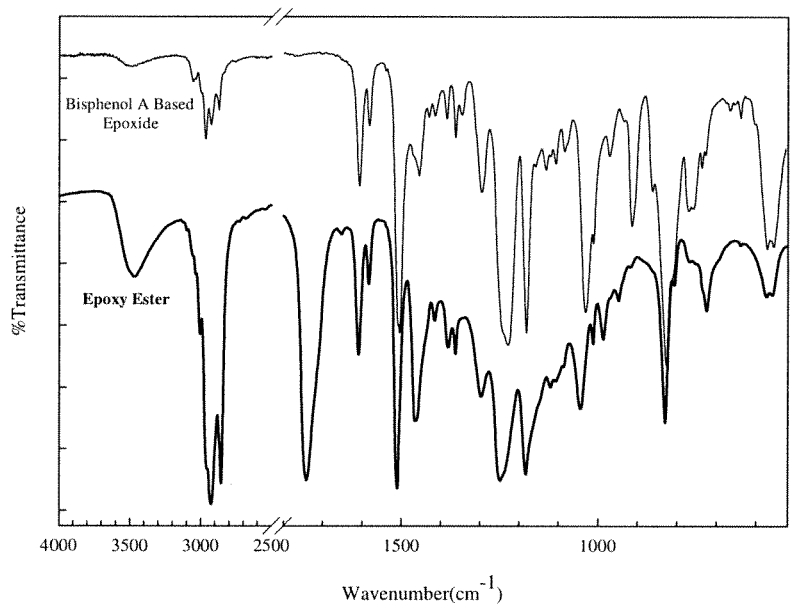
FIG. 4 is an FTIR spectra of the bisphenol-A based epoxide and the epoxy ester.

FIG. 4 shows the FTIR spectra of bisphenol-A based epoxide resin and synthesized epoxy ester. The O—H stretching band in the range 3200-3600 cm$^{-1}$ is much broader and sharper in the infrared spectrum of the epoxy ester than the corresponding band observed in the spectrum of the epoxide. The increase in intensity and width results from the higher hydroxyl functionality in the epoxy ester structure. Two absorption bands at 3047 and 3029 cm$^{-1}$ in the epoxide are assigned to the aromatic C—H stretching vibrations. However, only one absorption band at around 3010 cm$^{-1}$ appears in the spectrum of the epoxy ester, due to the fact that 1,2-oxirane ring opens up to react with fatty acid during esterification reaction. This may cause the epoxy ester to lose the intensity of ring stretching vibrations. The C—H stretching modes of methyl ($CH_3$) and methylene ($CH_2$) groups appear as three distinct bands occurring at 2970, 2921, and 2867 cm$^{-1}$ in the infrared spectrum of bisphenol-A based epoxide. Whereas, the epoxy ester shows two absorption bands in the same region, occurring at 2918 and 2852 cm$^{-1}$. In FIG. 4, an axis break is used in the x-axis of the spectrum in order to avoid the large empty wavenumber region between 2500 and 1800 cm$^{-1}$ and to enlarge the low wavenumber region between 1800 and 500 cm$^{-1}$.

The strong C=O stretching absorption band has a relatively constant position and high intensity at 1737 cm$^{-1}$, easily recognized in the spectrum of the epoxy ester. Three bands attributed to the aromatic C=C and C—C stretches are observed at 1608, 1581, and 1508 cm$^{-1}$ for the epoxy ester. The position of these stretching frequencies remains nearly constant for the epoxy resin, occurring at 1604, 1579, and 1504 cm$^{-1}$. The absorptions at 1460, 1377, and 1359 cm$^{-1}$ in the epoxy ester, and at 1452, 1382, and 1361 cm$^{-1}$ in the epoxide resin, result from asymmetrical vibration of C—H bonds in methyl groups, C—H scissoring vibration of methylene groups, and symmetrical vibration of C—H bonds of methyl groups, respectively.

A strong band resulting from the methylene rocking vibration, in which all of the methylene groups in the epoxy ester structure rock in phase, appears at 723 cm$^{-1}$ as a singlet. The symmetrical stretching of the epoxy ring occurs near 1250 cm$^{-1}$. Another band appears at 825 cm$^{-1}$ attributed to asymmetrical epoxy ring stretching in which the C—C bond is stretching during contraction of the C—O bond [85]. The third band related to the epoxy ring only appears in the spectrum of the epoxide resin at around 750 cm$^{-1}$.

In the low wavenumber region (600-1500 cm$^{-1}$) of FTIR spectra of TEOS oligomer modified epoxy derivatives, the intensity of the absorption band at 1000-1110 cm$^{-1}$ increases due to the Si—O—C (aliphatic) and Si—O—Si stretches [86]. Two strong absorption bands appear at 1107 and 1080 cm$^{-1}$ in the FTIR spectrum of inorganic modified phosphated epoxide; likewise, two closely spaced absorption bands occurring at 1099 and 1081 cm$^{-1}$ are observed in the infrared spectrum of inorganic modified epoxy ester. In addition, the O—H stretching vibrations of the Si—OH group absorb in the region 3700-3200 cm$^{-1}$. The absorption characteristics in that region depend on the degree of hydrogen bonding. Therefore, the intensity and width of the absorption band at around 3500 cm$^{-1}$ significantly increases after the epoxy derivatives were modified with TEOS oligomer. As previously reported by Soucek et al. [29], spectroscopic characterization of TEOS oligomers were performed using $^1$H NMR, $^{29}$Si NMR and ESI-MS.

The chemical shifts in the $^1$H and $^{13}$C NMR ($CDCl_3$) spectra of TEOS oligomer modified epoxy phosphate are summarized in Table 4. $^{29}$Si NMR shows a singlet at δ −81.6 ppm, a doublet at −88.6 ppm assigned to Si—O—C (aliphatic) group. The resonance difference may be contributed by the substitution of adjacent silicon atoms. Two singlets at δ −91.2 ppm and −96.0 ppm also appear in the spectrum, attributed to Si—O—Si bonds in the linear or cyclic polysilicates attached to the epoxy phosphate.

Figure 5:
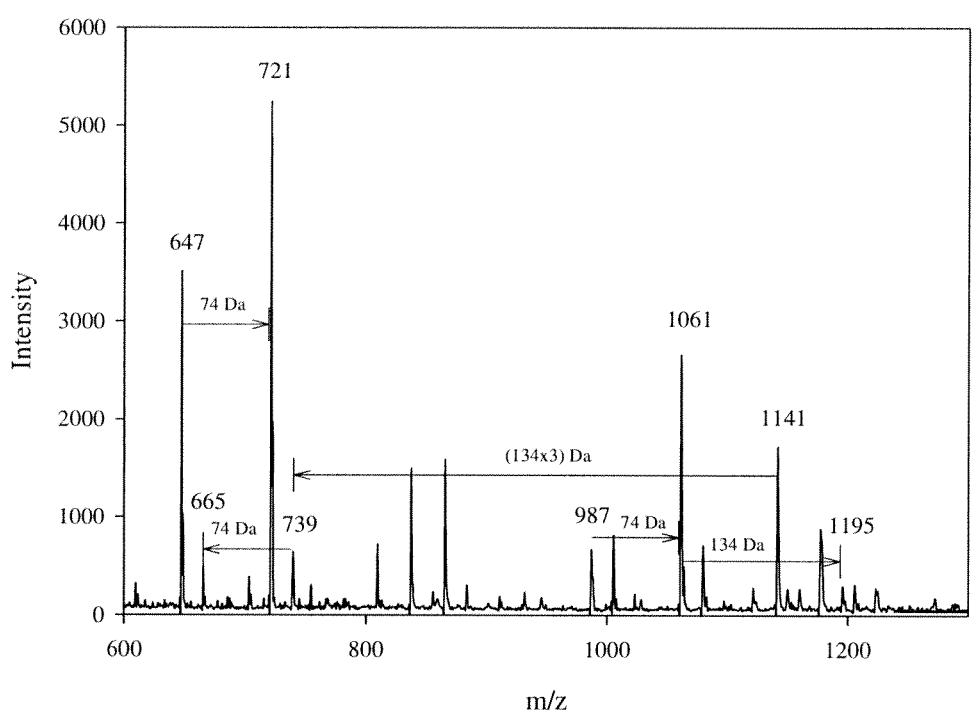
FIG. 5 is a Mass spectrum of the TEOS oligomer modified epoxy phosphate.

TEOS oligomer modified epoxy phosphate was further analyzed by MALDI-TOF spectrometry, shown in FIG. 5. The observed ions result from the sodium attachment to the species present. For example, the structure corresponding to 1141 Da results from sodium (23 Da) cationization of the cyclic $Si_3O_3(OEt)_6$ grafted epoxy phosphate. The cyclic $Si_3O_3(OEt)_6$ ([M]=134n) weighs 402 Da and the inorganically modified epoxy phosphate loses the cyclic trisilicate unit from m/z=1141 to m/z=739. Another distribution corresponding to the modification with linear trisilicate ([M]=74+134n) also appears in the spectrum exhibiting a peak at 665 Da. The species associated with the 1195 Da ion and 1061 Da are interrelated with each other by monocyclic structure, SiO $(OEt)_2$ (134 Da) unit. On the other hand, the peak at 987 Da is interrelated with the species observed at 1195 Da by the addition of linear $Si(OEt)_4$ silicate (208 Da).

iii. Preparation of Thermosetting Epoxy Derivatives

Figure 6:
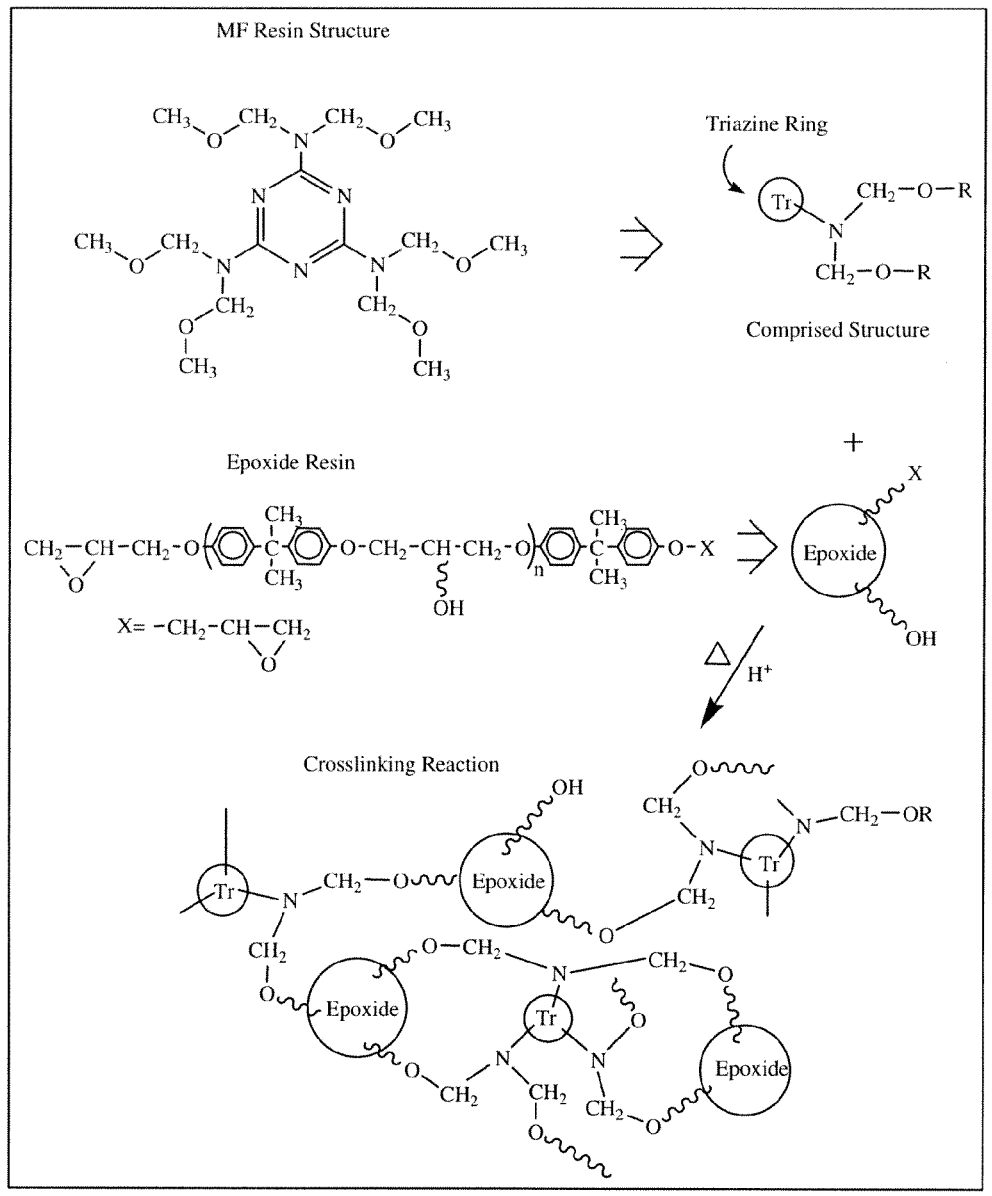
FIG. 6 is a schematic representation of a crosslinking reaction between melamine formaldehyde resin and the —OH functionality of the epoxide resin.

The major crosslinking reaction between the unmodified epoxy resin and the melamine formaldehyde resin is depicted in FIG. 6, showing how the hydroxyl groups in the epoxide repeat unit react with the melamines. After the unmodified and chemically modified epoxy derivatives were all crosslinked with the curing agent; general coatings tests, as well as dynamic mechanical thermal properties, and corrosion resistance were evaluated.

iv. Viscoelastic Properties

Figure 7:
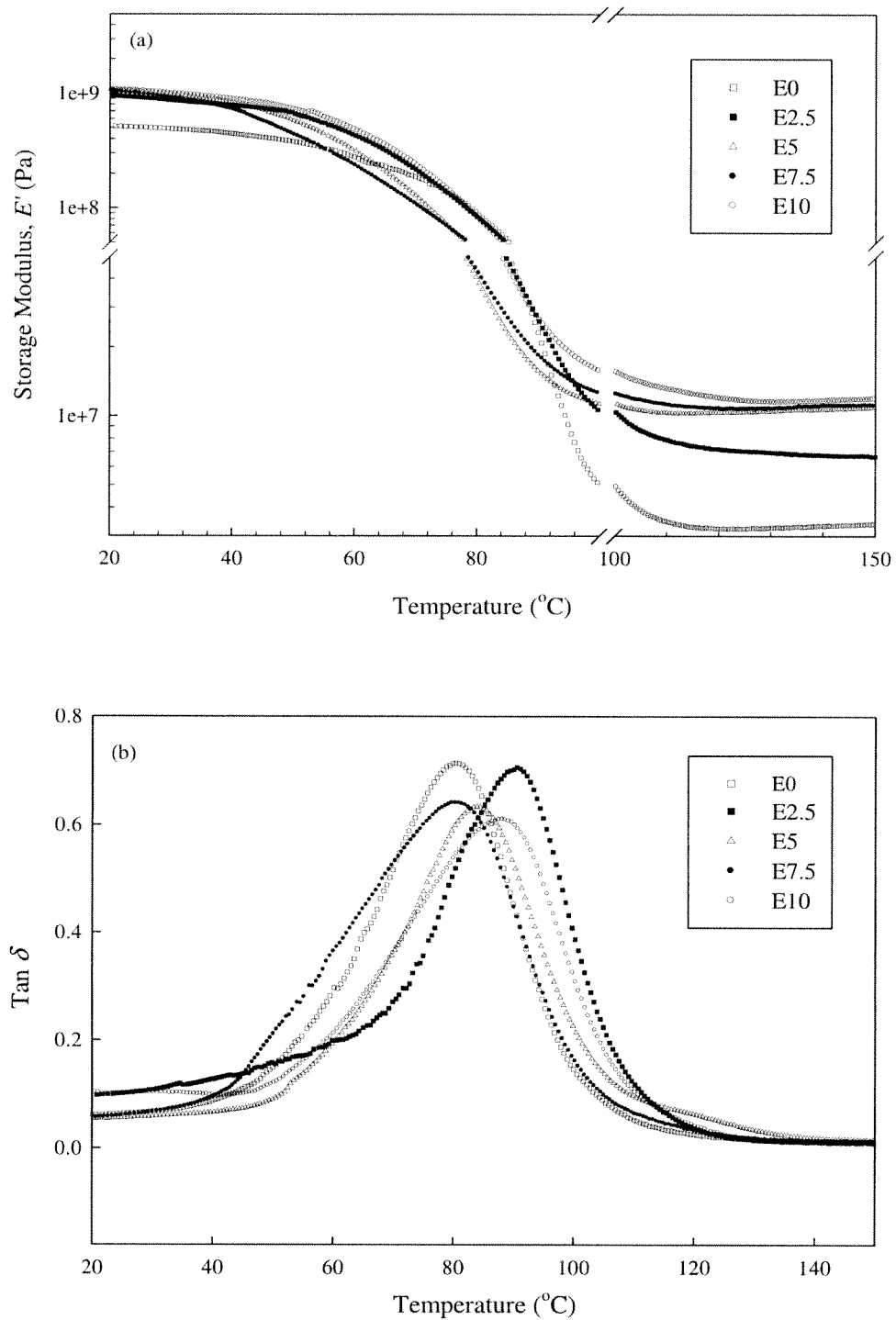
FIG. 7 is a graphical illustration of the viscoelastic properties: (a) storage modulus; and (b) tan δ, as a function of temperature in epoxy/TEOS hybrid coatings for 0% (E0), 2.5% (E2.5), 5% (E5), 7.5% (E7.5) and 10% (E10) TEOS.

The viscoelastic properties of the hybrid networks were investigated using dynamic mechanical thermal analyzer (DMTA). FIGS. 7a and 7b show the storage modulus and loss factor tan δ of epoxy (E) hybrid networks as a function of temperature, respectively. FIG. 7a is referred to as a semi-logarithmic graph. As the storage modulus data span several orders of magnitude, the distribution of values is more clearly discerned by replacing the linear y scale with a logarithmic y scale in FIG. 7a. In order to enlarge the rubbery plateau of the graph, an axis break is positioned along both axes without omitting any data points. The most striking drop in the tan δ maximum is observed in the epoxide containing 10% TEOS, E10, while the epoxide with 2.5% TEOS, E2.5, shows only a mild lowering. The storage modulus (FIG. 7a) decreases slightly until the film reaches the temperature of 50° C. and decreases significantly between 50 and 110° C. Above 110° C., the storage modulus shows the minimum value for all the epoxy hybrid films. The height of the tan δ peak decreases and the peak broadens as extent of cure increases.

Figure 8:
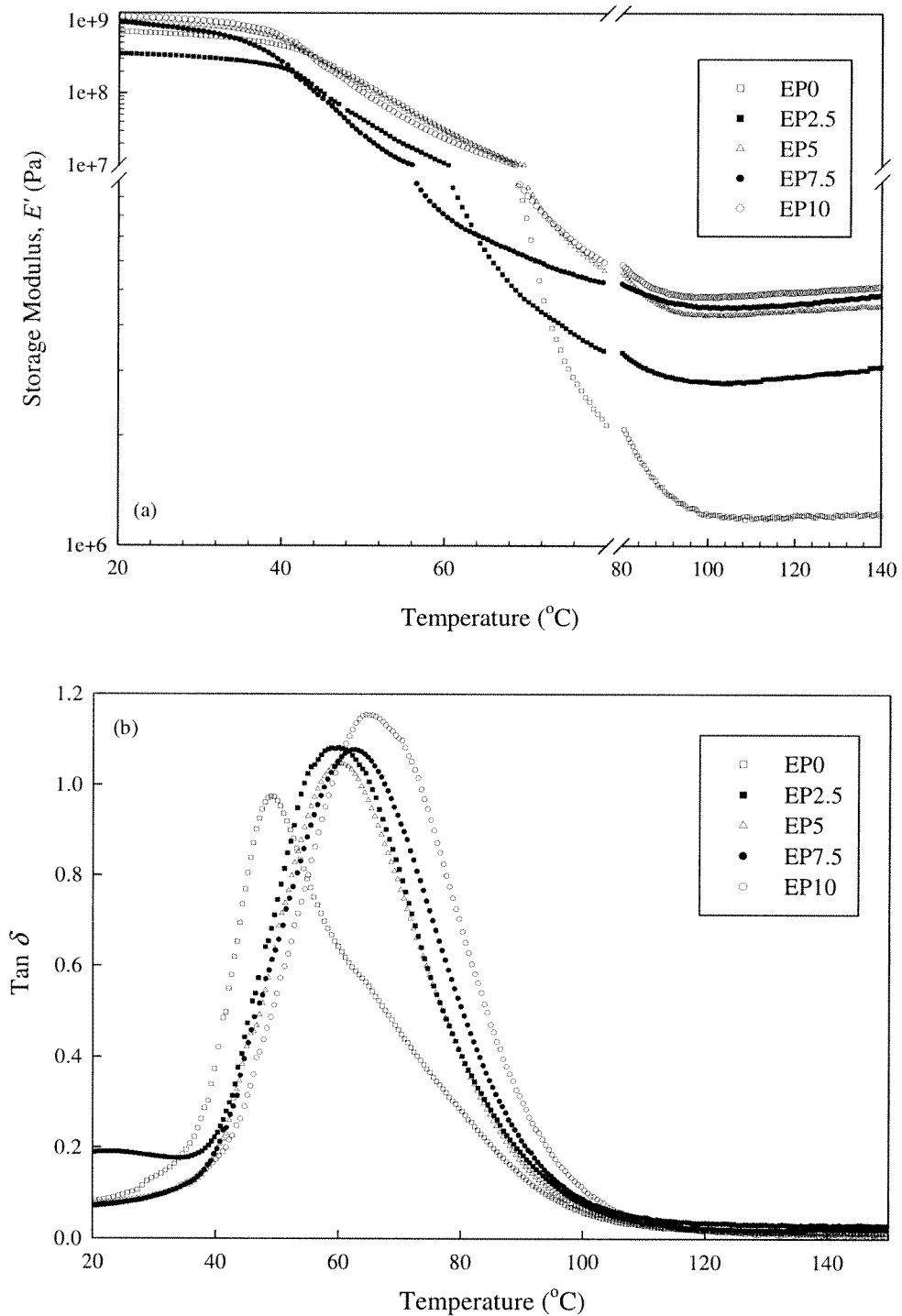
FIG. 8 is a graphical illustration of the viscoelastic properties: (a) storage modulus; and (b) tan δ; as a function of temperature in epoxy phosphate/TEOS hybrid coatings for 0% (EP0), 2.5% (EP2.5), 5% (EP5), 7.5% (EP7.5) and 10% (EP10) TEOS.

The storage modulus and loss factor tan δ of epoxy phosphate-TEOS oligomer hybrid networks are shown in FIGS. 8a and 8b, respectively. In FIG. 8a, the storage modulus (E') of epoxy phosphate (EP) hybrid films show a decreasing trend as well, until the temperature reaches 40° C. The value of E' diminishes drastically between the temperatures 40 and 90° C., and shows the minimum values at temperatures very close to or above 90° C. for phosphated epoxy hybrid networks.

Figure 9:
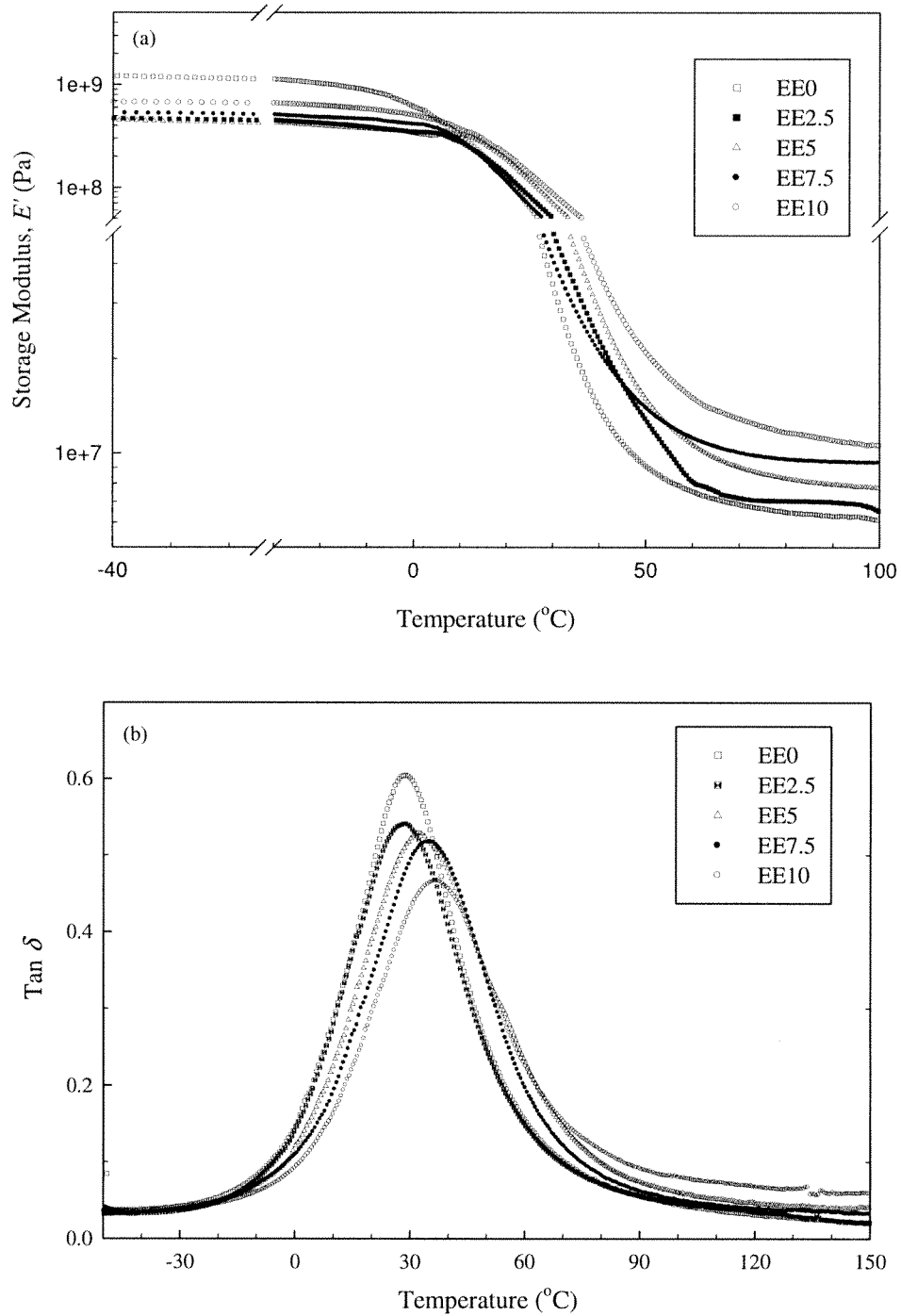
FIG. 9 is a graphical illustration of the viscoelastic properties: (a) storage modulus; and (b) tan δ; as a function of temperature in epoxy ester/TEOS hybrid coatings for 0% (EE0), 2.5% (EE2.5) 5% (EE5), 7.5% (EE7.5) and 10% (EE10) TEOS.

In FIGS. 9a and 9b, the storage modulus (E') and loss factor tan δ of epoxy ester (EE)/TEOS hybrid systems are shown. In FIG. 9a, the storage modulus (E') exhibits a slightly decreasing trend until temperature reaches 0° C. Between 0° C. and 60° C., E' decreases dramatically for epoxy ester (EE)/TEOS oligomer hybrid films. The increase in the storage modulus of the epoxy ester hybrid networks is accompanied by the changes in the loss factor tan δ. The α-transition of tan δ located at about 29° C., corresponds to the glass transition of the neat epoxy ester network, decreases and broadens in the epoxy ester-TEOS oligomer hybrids which is typical of most composite systems [87].

The decrease in the loss maximum height shown in FIG. 9b is directly proportional to the TEOS concentration. Glass transition temperatures of the cured films are also increasing with increasing TEOS content in the hybrid films. None of the hybrid systems display a new damping peak at higher temperatures, which gives evidence of the no macrophase separation in the epoxy derivatives-TEOS hybrid systems. In other words, it promotes a homogenous system with no major separation or clustering of inorganic regions within the film.

FIGS. 8a and 9a are also referred to as semi-logarithmic. No data point was avoided in both graphs and axis breaks were put in the x-axis and in the y-axis, to be able to observe the difference between the minimum storage moduli of the films for a clear comparison on the graph. The crosslink density of the films was calculated via an equation derived from the theory of rubber elasticity [88]. The viscoelastic properties, minimum storage modulus ($E'_{min}$), crosslink density ($v_e$), maximum tan δ, glass transition temperature ($T_g$), and breadth of tan δ transition of the epoxy, the epoxy ester, and the epoxy phosphate hybrid films are summarized in Table 5.

TABLE 5

Viscoelastic properties of the epoxy hybrid coatings

| Hybrid Networks | E' (min) (N/m²) | Crosslink Density (mol/m³) | $T_g$ (° C.) | Max Tan δ | Tan δ breadth* (° C.) |
|---|---|---|---|---|---|
| E0[a] | 3.3 × 10⁶ | 336 | 80 | 0.72 | 27 |
| E2.5 | 7.2 × 10⁶ | 737 | 91 | 0.71 | 27 |
| E5 | 10.3 × 10⁶ | 1074 | 84 | 0.63 | 30 |
| E7.5 | 11.1 × 10⁶ | 1160 | 80 | 0.64 | 35 |
| E10 | 11.6 × 10⁶ | 1169 | 88 | 0.61 | 35 |
| EE0 | 6.5 × 10⁶ | 747 | 29 | 0.61 | 33 |
| EE2.5[b] | 7.0 × 10⁶ | 794 | 29 | 0.54 | 35 |
| EE5 | 8.0 × 10⁶ | 886 | 32 | 0.53 | 37 |
| EE7.5 | 9.4 × 10⁶ | 1056 | 35 | 0.52 | 37 |
| EE10 | 10.8 × 10⁶ | 1180 | 37 | 0.47 | 40 |
| EP0 | 2.6 × 10⁶ | 430 | 56 | 0.75 | 28 |
| EP2.5 | 5.8 × 10⁶ | 642 | 60 | 1.08 | 30 |
| EP5[c] | 9.0 × 10⁶ | 998 | 60 | 1.05 | 31 |
| EP7.5 | 9.3 × 10⁶ | 1028 | 63 | 1.08 | 35 |
| EP10 | 9.8 × 10⁶ | 1075 | 64 | 1.15 | 36 |

*Width at half height of tan δ.
[a]E0 denotes the film formed through the epoxy resin with 0% TEOS oligomer based on the amount of the total solution.
[b]EE2.5 denotes the film formed through the epoxy ester with 2.5% TEOS oligomer based on the amount of the total solution.
[c]EP5 denotes the film formed through the epoxy phosphate with 5% TEOS oligomer based on the amount of the total solution.

In epoxide (E) systems, a significant increase of glass transition temperature from 84° C. to 91° C. is observed with 2.5% TEOS oligomer modification of epoxy resin by weight. Loss factor decreases with increasing inorganic content; whereas, the crosslink density increases. As for epoxy ester (EE) series, the highest percentage (10%) of the inorganic content in the hybrid films shows the largest crosslink density, which was calculated as 1180 mol/m³. The decrease in glass transition temperature is also observed in epoxy phosphate (EP) films ($T_g$ around 60° C.).

v. Coating Properties and Corrosion Performance

Table 6 presents the film properties of different TEOS modified epoxy hybrids cured with MF resin. Most of the coating formulations showed the same pencil hardness (5H) and cross-hatch adhesion (5B) behavior. To obtain more precise results on adhesion properties, pull-off adhesion test was performed. The TEOS modification of the epoxides resulted in increases in the pull-off adhesion from 50% at 2.5 wt % TEOS to >100% at 10 wt % TEOS. The flexibility of the films was judged by the reverse impact test and showed that flexibility was not dependent on the TEOS loading (except for the unmodified epoxide, EO).

TABLE 6

Coating properties of the epoxy hybrid coatings

| Hybrid Networks | Pencil Hardness | Crosshatch Adhesion | Reverse Impact* Resistance (lb/in) | Pull-off Adhesion[‡] (lb/in²) |
|---|---|---|---|---|
| E0[a] | 4H | 4B | 22 ± 3 | 110 ± 10 |
| E2.5 | 5H | 5B | 20 ± 2 | 163 ± 15 |
| E5 | 5H | 5B | 15 ± 2 | 185 ± 5 |
| E7.5 | 5H | 5B | 20 ± 3 | 242 ± 13 |
| E10 | 5H | 5B | 15 ± 3 | 248 ± 8 |
| EE0 | 5H | 5B | >40 | 128 ± 7 |
| EE2.5[b] | 5H | 5B | >40 | 188 ± 11 |
| EE5 | 5H | 5B | >40 | 242 ± 8 |
| EE7.5 | 5H | 5B | >40 | 285 ± 15 |
| EE10 | 5H | 5B | >40 | 293 ± 10 |
| EP0 | 5H | 5B | >40 | 120 ± 10 |
| EP2.5 | 5H | 5B | >40 | 192 ± 8 |
| EP5[c] | 5H | 5B | >40 | 250 ± 10 |
| EP7.5 | 5H | 5B | >40 | 305 ± 5 |
| EP10 | 5H | 5B | >40 | 313 ± 12 |

[a]E0 denotes the film formed through the epoxy resin with 0% TEOS oligomer based on the amount of the total solution.
[b]EE2.5 denotes the film formed through the epoxy ester with 2.5% TEOS oligomer based on the amount of the total solution.
[c]EP5 denotes the film formed through the epoxy phosphate with 5% TEOS oligomer based on the amount of the total solution.
*Average of three reverse impact resistance values were reported for each system in lb/in.
[‡]Average values of bond strengths obtained from three dollies were reported in lb/in². The error is at most ±15 bond strength units.

Figure 10:
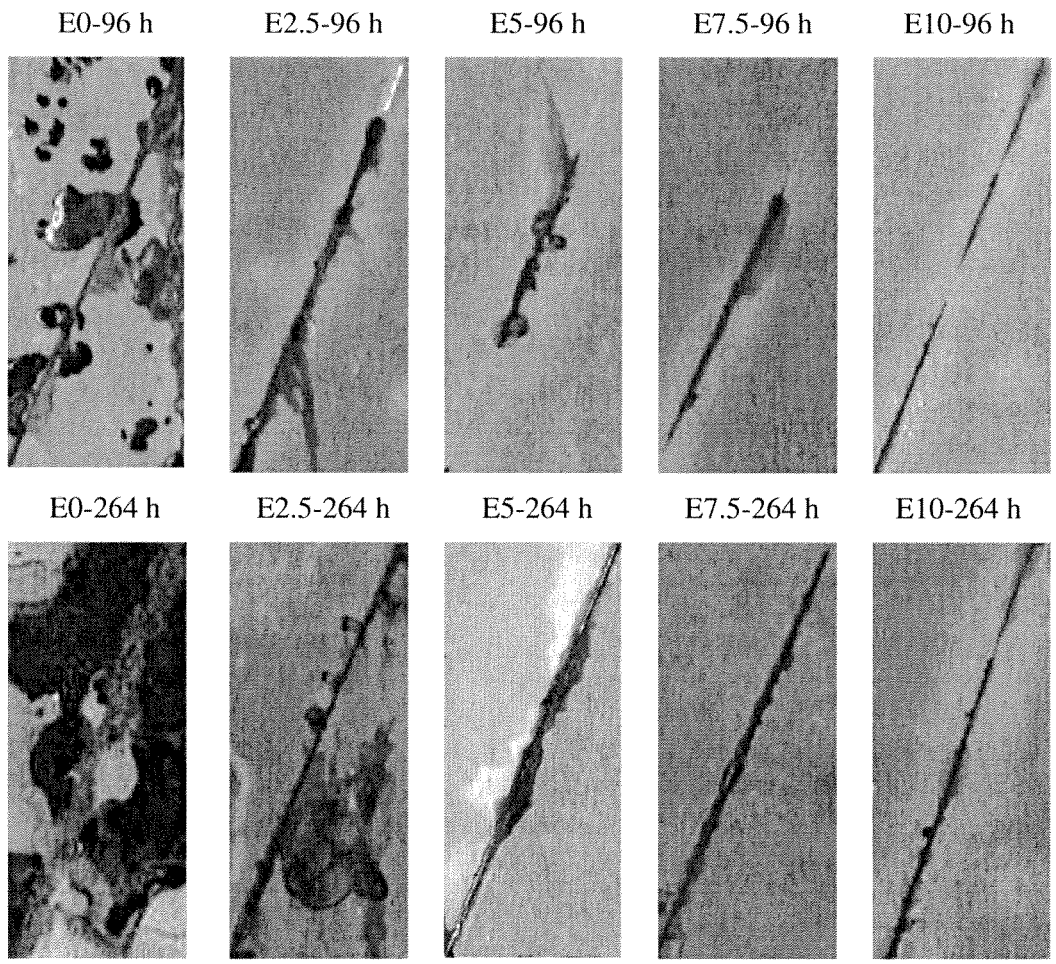
FIG. 10 is a series of optical images for untreated steel substrates coated with epoxide/TEOS hybrid coatings (E0=0%; E2.5=2.5%, E5=5%, E7.5=7.5% and E10=10% TEOS oligomers) after 96 h and 264 h salt spray exposures.
Figure 11:
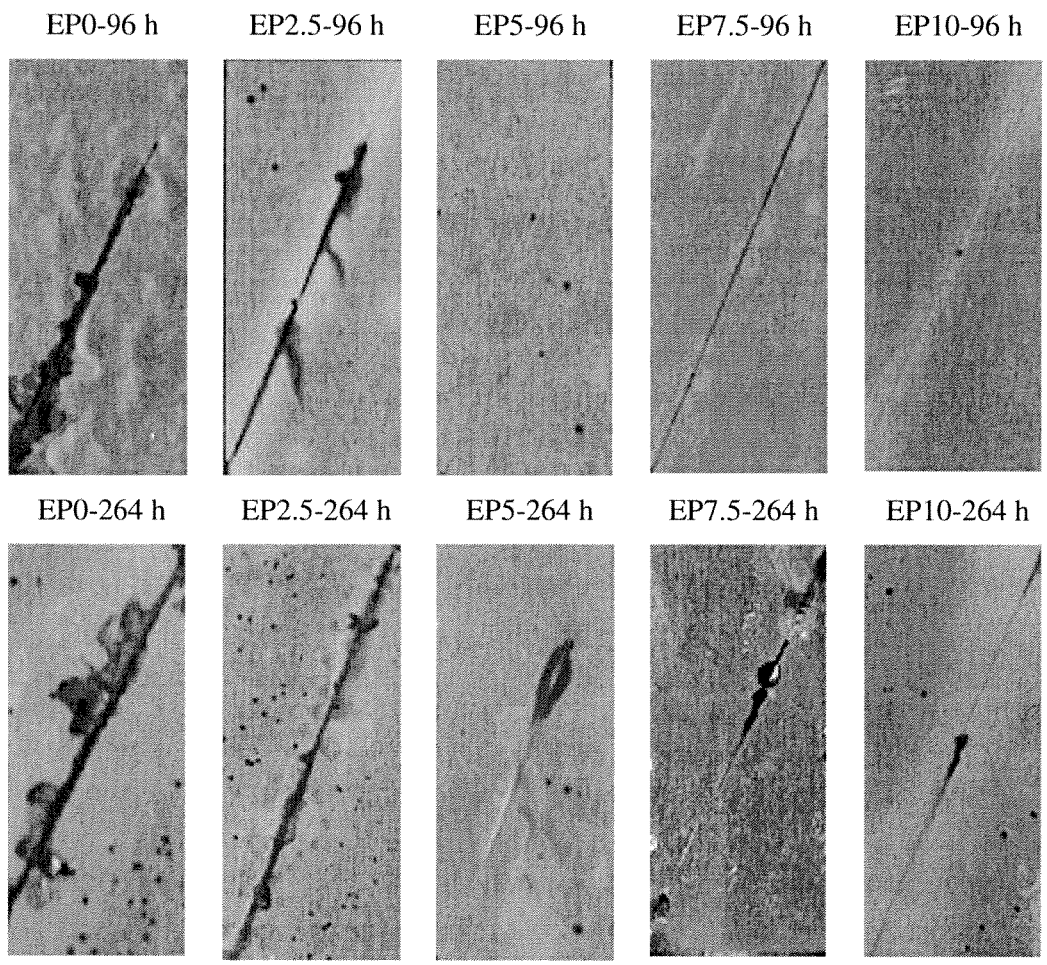
FIG. 11 is a series of optical images for untreated steel substrates coated with epoxy phosphate/TEOS hybrid coatings (EP0=0%; EP2.5=2.5%, EP5=5%, EP7.5=7.5% and EP 10=10% TEOS oligomers) after 96 h and 264 h salt spray exposures.
Figure 12:
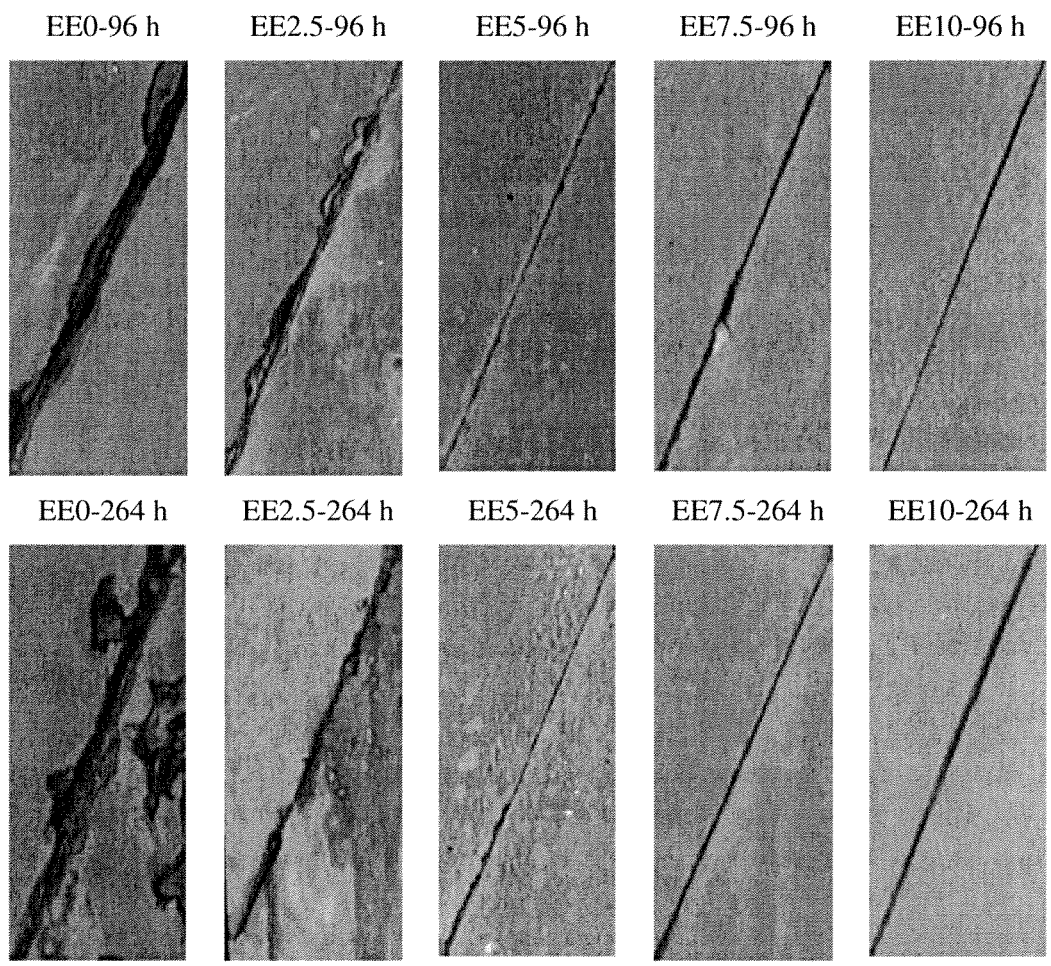
FIG. 12 is a series of optical images for untreated steel substrates coated with epoxy ester/TEOS hybrid coatings (EE0=0%; EE2.5=2.5%, EE5=5%, EE7.5=7.5% and EE10=10% TEOS oligomers) after 96 h and 264 h salt spray exposures.

Corrosion performance of the films are shown in FIGS. 10, 11 and 12. FIG. 10 shows the images of the epoxy hybrid primers coated on untreated steel substrate after 96 h and 264 h salt spray exposure. No blistering or lifting of the coat was observed for any of the 24 h salt spray exposed panels. However, corrosion was observed on unmodified epoxy derivatives after 48 h exposure. The panels coated with inorganic modified epoxides (E5, E7.5 and E10) passed the salt spray test even after 264 h exposure.

The salt spray test results of the epoxy phosphate and epoxy ester hybrid primers are demonstrated in FIGS. 11 and 12 respectively. The scribed panels were evaluated up to 264 h of exposure to salt spray. The inspections were made periodically, although only the images for 96 and 264 h are shown in FIGS. 10, 11 and 12. Buchheit et al. [89] used an inspection method in an attempt to quantify corrosion damage via pitting that occurred during salt spray exposure. In their study, panels were assigned a pass or fail rank at each inspection interval. Based on their criterion, the changes in pitting damage versus time were evaluated for the panels. For example, the blistering in EP0 diminishes dramatically with increasing the inorganic content in the system, producing no visible corrosion product stain or tail for EP10 after 96 h exposure (See FIG. 11). The coated panels of the epoxy derivatives modified with TEOS oligomer content higher than 5 wt % passed the corrosion performance test, having no more than five isolated spots or pits, none larger than 0.031 in. (0.8 mm) in diameter. Further improvement in the salt spray performance of coated panels was observed with modifying epoxide resin with phosphoric acid and unsaturated fatty acid.

The neat epoxy ester coated sample failed only after 24 h of exposure in salt spray, while inorganic modified samples withstood more than around 200 h of exposure. The best salt spray performance was always observed when epoxy coatings were inorganically modified with 10 wt. % TEOS oligomer. The phosphated epoxy and epoxy ester were found to provide substantial improvement over epoxide resin by significantly improving the blister resistance, as well as providing improved adhesion to metal substrates (See Table 6).

It is appreciated that in the epoxy ester systems, the gaffing of the fatty acid provides a capability for an autoxidative cure (thermosetting) mechanism since an unsaturated fatty acid was chosen [15]. The glass transition temperatures are very low in comparison to the epoxy and the epoxy phosphate counterparts due to the flexibility improvements. The flexibility results from the conversion of the epoxy end groups from 1,2-oxirane to ester groups. The decrease in glass transition temperature is also observed in epoxy phosphate (EP) films (See Table 5). The same approach may prove that the 1,2-oxirane groups react with phosphoric acid and water to form phosphate esters. In addition, the unreacted low molecular weight species may also act as a plasticizer, resulting in lower glass transition temperature.

The phosphate ester group was found to increase the adhesion to metal substrates by reaction with the metal, therefore producing a strong chemical bond between the coating polymer and the metal [25,90]. This metal-phosphate bond is more resistant to displacement by water than the normal coating hydrogen bond to metal substrates, and contributed to improvements in corrosion resistance of the coatings as well (See FIG. 11). Adhesion also increased by the inclusion of the TEOS oligomers but leveled off with further increase in the concentration of the TEOS oligomers (See Table 6). This behavior was also observed by Soucek et al. [29] in the polyurea/polysiloxane ceramer system. The adhesion increase can be attributed to the increase in the number of the Si—O—H bonds formed on the surface of the steel panel. Thus, the epoxy resin modified with both phosphate ester group and TEOS oligomer is expected to obtain better adhesion on metal substrates. The reason that the TEOS oligomer modified epoxies can get better adhesion on metal substrate is because the silanol groups (Si—OH) in the modified resin can bond with the metal hydroxyls (M-OH) to form Si—O-M linkage due to the condensation reaction.

Figure 13:
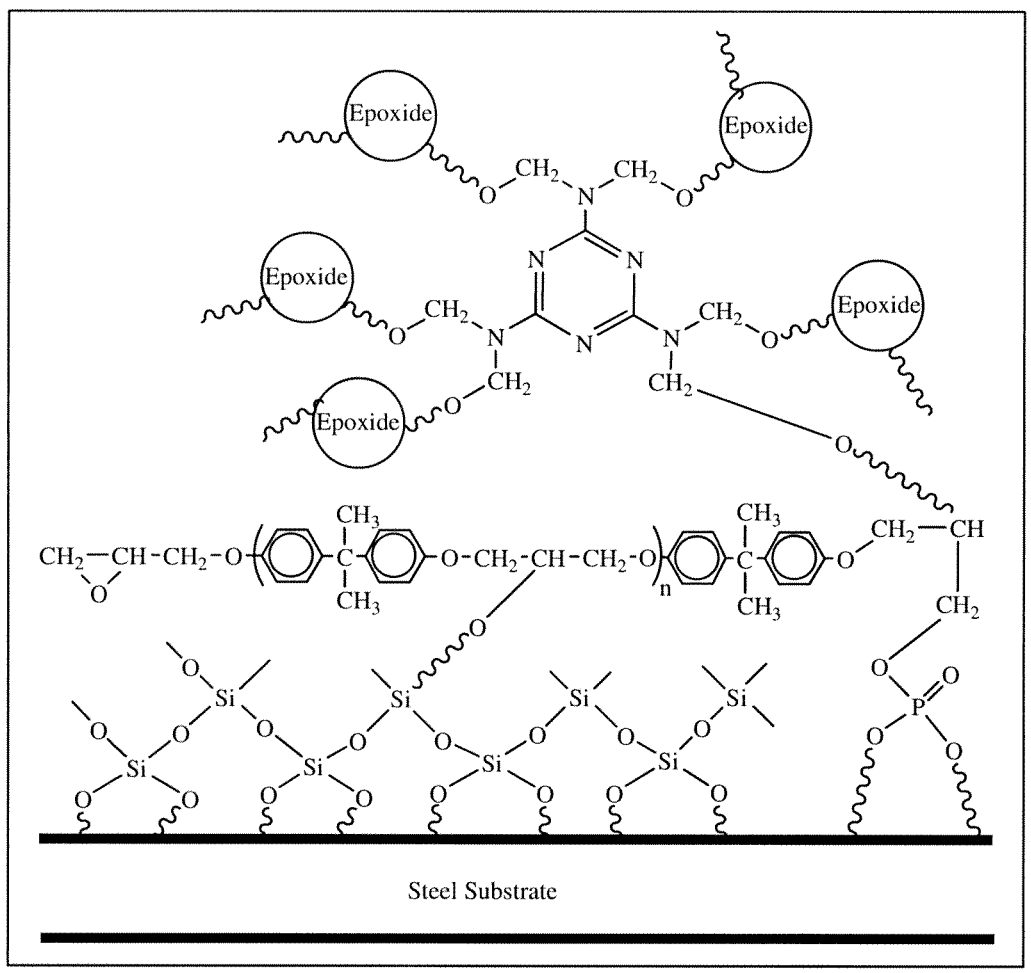
FIG. 13 is schematic illustration of a proposed mechanism for the interaction between hybrid coatings according to an embodiment of the present invention and a steel substrate.

Not being bound by theory, and based in part on the images of the hybrid coatings taken after salt spray exposure (See FIGS. 10, 11, and 12), a mechanism of corrosion protection is proposed in FIG. 13. In anti-corrosion coatings, the use of epoxide resin dominates over other synthetic resins due to its improved bonding with metallic substrates and long-term corrosion resistance. However, since epoxy resin is hydrophilic in nature, the moisture resistance is compromised. The formation of well-adhered sol-gel layer on the steel substrate can block the transport of the chemical species of corrosion reaction, mainly including water and oxygen, onto the coating substrate interface, and limit the rate of corrosion.

An additional benefit of the TEOS-modifies epoxide is found in the fact that it allows use of the system disclosed herein to replace conventional chromate and phosphating pretreatments. Without being bound by an particular theory, the corrosion inhibition may be derived from the generation of a nano-layer of pre-ceramic protective layer that is chemically bonded to the metal substrate.

II. Fluorinated Polymer Phase

Methyl methacrylate (MMA), n-butyl acrylate (BA), 2-hydroxyethyl methacrylate (HEMA), p-toluenesulfonic acid monohydrate (ACS reagent, ≥98.5%), 2-hydroxyethyl mercaptan, 2,2'-azobis(2-methylpropionitrile) (AIBN), methyl ethyl ketone (MEK) (ACS reagent, ≥99.0%), and n-hexane (ACS reagent, ≥99.0%) were purchased from Aldrich Chemical Company. 2,2,2-trifluoroethyl methacrylate (TFEMA; trade name: Fluorester) was provided by Tosoh F-Tech, Inc. Methanol-etherified melamine formaldehyde resin (trade name: Luwipal 072) was obtained from BASF Corporation. All of the materials were used as received without further purification.

The chemical structures of monomers, solvents, initiator, chain transfer agent, and catalyst are shown in Table 7.

TABLE 7

| Chemicals | Nomenclature | Structure |
|---|---|---|
| Monomer | Methyl Methacrylate (MMA) | |
| Monomer | n-Butyl Acrylate (BA) | |
| Monomer | 2-Hydroxyethyl Methacrylate (HEMA) | |
| Monomer | 2,2,2-Trifluoroethyl Methacrylate (TFEMA) | |

TABLE 7-continued

| Chemicals | Nomenclature | Structure |
|---|---|---|
| Initiator | 2,2'-Azobis(2-methylpropionitrile) (AIBN) | |
| Solvent | Methyl Ethyl Ketone (MEK) | |
| Solvent | n-Hexane | |
| Chain Transfer Agent | 2-Hydroxyethyl Mercaptan | |
| Catalyst | p-Toluenesulfonic Acid Monohydrate | | a. General Synthesis Procedure

Solution polymerization was conducted in a 500-mL, round bottom, four-necked flask immersed in a constant temperature water bath and equipped with a thermometer, a mechanical stirrer, a nitrogen gas inlet, and a reflux condenser. Methyl ethyl ketone was used as a solvent. Half of the solvent (60 mL, 48.24 g) was initially charged to the reaction flask and heated to a temperature of 60° C. The remaining solvent (60 mL, 48.24 g) was added to the monomer solution along with the chain transfer agent (2-hydroxyethyl mercaptan), and the initiator (2,2'-azobis(2-methylpropionitrile). A syringe/needle/pump setup was used to feed the mixture to the reaction flask with a constant feed rate over one hour. Afterwards, 10 wt % of the original amount of the initiator was dissolved in the solvent (5 mL) and added to the system through the condenser. Further stilling was conducted for several hours (See Table 8). Unreacted monomers and solvent were first removed without excessive heating, using a rotary evaporator. The solution was washed with excess n-hexane (2×500 mL) to completely eliminate the residual monomers and other impurities that were present. The precipitated copolymer was dried in a vacuum oven at 40° C. for 96 h. Later, the product was re-dissolved into methyl ethyl ketone to obtain a 60 wt % high-solids solution. Fourier Transform Infrared (FTIR) spectroscopy verified the disappearance of C=C bond stretching peaks resulting from vinyl groups of monomers, after further rotary evaporation and n-hexane extraction.

A series of low, medium, and high molecular weight copolymers were synthesized with the amounts of chemicals used in the synthesis shown in Table 8. The copolymer compositions were found by $^1$H NMR spectroscopy using integral area of chemical shifts of monomer functional groups for quantitative analysis and the yields were determined to be 90%±5%.

TABLE 8

| Copolymer | Monomers | | | | Chain Transfer Agent | Initiator (g) | Solvent (g, mL) | Additional Initiator (g) | Rxn Time (hr) |
| | MMA (g, mL) | BA (g, mL) | HEMA (g, mL) | TFEMA (g, mL) | | | | | |
|---|---|---|---|---|---|---|---|---|---|
| F0-CTA5 Low $M_n$ | 59.41 g, 63 mL | 56.57 g, 63 mL | 57.83 g, 54 mL | — | 8.82 g, 8.62 mL | 2.61 g. | 96.48 g, 120 mL | 0.261 g. | 2 |
| F0-CTA2.5 Medium $M_n$ | 59.41 g, 63 mL | 56.57 g, 63 mL | 57.83 g, 54 mL | — | 4.41 g, 4.31 mL | 2.61 g. | 96.48 g, 120 mL | 0.261 g. | 3 |
| F0-CTA0.5 High $M_n$ | 59.41 g, 63 mL | 56.57 g, 63 mL | 57.83 g, 54 mL | — | 0.89 g, 0.87 mL | 3.47 g. | 96.48 g, 120 mL | — | 3.5 |
| F5-CTA5 Low $M_n$ | 42.44 g, 45 mL | 64.66 g, 72 mL | 57.83 g, 54 mL | 10.63 g, 9 mL | 8.91 g, 8.71 mL | 2.63 g. | 96.48 g, 120 mL | 0.263 g. | 2 |
| F5-CTA2.5 Medium $M_n$ | 42.44 g, 45 mL | 64.66 g, 72 mL | 57.83 g, 54 mL | 10.63 g, 9 mL | 4.45 g, 4.35 mL | 2.63 g. | 96.48 g, 120 mL | 0.263 g. | 3 |
| F5-CTA0.5 High $M_n$ | 42.44 g, 45 mL | 64.66 g, 72 mL | 57.83 g, 54 mL | 10.63 g, 9 mL | 0.89 g, 0.87 mL | 3.51 g. | 96.48 g, 120 mL | — | 3.5 |
| F10-CTA5 Low $M_n$ | 42.44 g, 45 mL | 56.57 g, 63 mL | 57.83 g, 54 mL | 21.24 g, 18 mL | 9.04 g, 8.84 mL | 2.67 g. | 96.48 g, 120 mL | 0.267 g. | 2 |
| F10-CTA2.5 Medium $M_n$ | 42.44 g, 45 mL | 56.57 g, 63 mL | 57.83 g, 54 mL | 21.24 g, 18 mL | 4.51 g, 4.42 mL | 2.67 g. | 96.48 g, 120 mL | 0.267 g. | 3 |
| F10-CTA0.5[a] High $M_n$ | 42.44 g, 45 mL | 56.57 g, 63 mL | 57.83 g, 54 mL | 21.24 g, 18 mL | 0.91 g, 0.89 mL | 3.56 g. | 96.48 g, 120 mL | — | 3.5 |

[a]F10-CTA0.5 = 10 vol. % TFEMA (2,2,2-trifluoroethyl methacrylate) - 0.5 wt. % CTA (chain transfer agent); based on total amount of the reaction monomers and the initiator.

The nomenclature for the copolymers is focused on the concentration of the monomer, 2,2,2-trifluoroethyl methacrylate (TFEMA), and the chain transfer agent, 2-hydroxyethyl mercaptan, in the composition. The designation consists of two terms and two numbers. As an example, for copolymer F5CTA2.5 in Table 8, the first term "F" represents the TFEMA monomer and the number "5" next to the letter "F" indicates that the concentration of TFEMA monomer in the feed is 5 vol. %. The second term "CTA" designates the chain transfer agent and the following number "2.5" indicates the chain transfer agent concentration (2.5 wt %). $^1$H and $^{13}$C NMR resonance assignments of the acrylic copolymers are given in Table 9.

TABLE 9

| Structural Group | $^1$H NMR (ppm) | Structural Group | $^{13}$C NMR (ppm) |
|---|---|---|---|
| O—CH$_2$—CH$_2$—CH$_2$—CH$_3$ | 0.7-1.0 | O—CH$_2$—CH$_2$—CH$_2$—CH$_3$ | 13-14 |
| O—CH$_2$—CH$_2$—CH$_2$—CH$_3$ | 1.2-2.8 | O—CH$_2$—CH$_2$—CH$_2$—CH$_3$ | 19-20 |
| C—CH$_3$ | 1.2-2.8 | C—CH$_3$ | 22-26 |
| O—CH$_2$—CH$_2$—CH$_2$—CH$_3$ | 1.2-2.8 | O—CH$_2$—CH$_2$—CH$_2$—CH$_3$ | 30-32 |
| O—CH$_2$—CH$_2$—OH | 1.2-2.8 | C—C=O main chain | 34-37 |
| —CH$_2$ main chain | 1.2-2.8 | —CH$_2$ main chain | 43-49 |
| O—CH$_3$ | 3.0-4.3 | O—CH$_3$ | 52-53 |
| O—CH$_2$—CH$_2$—OH | 3.0-4.3 | O—CH$_2$—CH$_2$—OH | 60-62 |
| O—CH$_2$—CH$_2$—CH$_2$—CH$_3$ | 3.0-4.3 | O—CH$_2$—CH$_2$—CH$_2$—CH$_3$ | 64-66 |
| O—CH$_2$—CH$_2$—OH | 3.0-4.3 | O—CH$_2$—CH$_2$—OH | 66-67 |
| O—CH$_2$—CF$_3$ | 4.4-5.3 | O—CH$_2$—CF$_3$ | 77-78 | b. Film Preparation

Film formation was performed by crosslinking the copolymers with melamine formaldehyde (MF) resin. 60 wt % high solids acrylic copolymer solution (10 g) was mixed with MF resin (2.406 g) based on 2:1 equivalence ratio of methoxy groups in MF resin to hydroxy groups in the copolymer. Equivalent weight of MF resin was taken as 80 g/eq, resulting from the presence of dimers, trimers, and higher oligomers [91]. As a strong acid catalyst, p-toluenesulfonic acid monohydrate, 1 wt % (0.02406 g) of MF resin was added to the formulation. The mixture was stirred for 1 h under ambient conditions (1 atm, 24±2° C.); later, thin films were cast on steel and glass panels by a draw-down bar with a wet thickness of 125 μm. The films underwent evaporation at room temperature for 12 h, and were cured at 120° C. for 1 h. The films cast on glass panels were prepared for viscoelastic properties, tensile tests, oxygen permeability and refractive index measurements, peeling off the films from the glass panels. The films cast on steel panels were used for coating tests such as pencil hardness (ASTM D3363), cross-hatch adhesion (ASTM D3359), pull-off adhesion (ASTM D4541), impact resistance (ASTM D2794), Taber abrasion (ASTM D4060), gloss (ASTM D523), and solvent resistance (ASTM D4752). Dry film thickness was typically 50-80 μm. All films were kept at room temperature for 7 days before any tests were performed.

c. Instruments

FTIR spectroscopy was performed as described above for the base layer. The Waters Breeze GPC system was used for GPC with a HR4, HT2, HR1, HR0.5 styragel, and 500 Å ultrastyragel columns connected in series. The GPC analyses were performed at room temperature on 0.1% (w/v) sample solutions in distilled tetrahydrofuran (THE). Solutions were filtered on 0.45 μm membrane syringe filters and 200 μL were injected into the chromatograph with an eluent flow rate set at 1.0 mL·min$^{-1}$. The calibration curve was obtained with polystyrene (PS) standards.

Mass spectral experiments were performed to assist in determining the chemical structure of copolymers, using the same Bruker system and method as used for the base layer and described above.

The glass transition temperatures ($T_g$) were measured by differential scanning calorimeter (DSC) (2920, TA Instruments), employing approximately 10 mg of the encapsulated sample. The data were chosen by a second scan performed under a dynamic nitrogen flow (40 mL/min) by first cooling to −50° C. and then heating to 200° C. at a scanning rate of 10° C./min. The first scan was run to remove the thermal history. The value of glass transition temperature ($T_g$) was taken as the midpoint of the heat capacity transition region.

A Brookfield LV DV II+ Pro Digital viscometer was used to evaluate the effect of the molecular weight of the solid (copolymer) content on the viscosity of the copolymer solutions (60 wt. % solid content). Small sample adapter accessory in combination with disposable sample chamber was utilized to measure the viscosity at a very small sample volume of 16 mL. The measurements were performed under ambient condition (1 atm, 24±2° C.), using SC-25 spindle with a shear rate constant of 0.22. The shear rate is dependent on the rotational speed of the spindle, the size and the shape of the spindle and the sample chamber, and thus the distance between the chamber wall and the spindle surface. Consequently, the shear rate was calculated by multiplying the shear rate constant of the spindle (SRC=0.22) with the selected spindle speed of 100 rpm, which gave a precise shear rate of 22 s$^{-1}$.

Contact angles were measured using deionized water and ethylene glycol with a Rame-Hart contact angle goniometer, model 100-00. Silicon wafers were cut into small square pieces and were cleaned in a solution of $H_2SO_4$ (70 wt. %) and $H_2O_2$ (30 wt. %), using a reflux condenser at a steam bath for an hour. Afterwards, wafers were washed with distilled water and dried with nitrogen gas. Later, silicon wafers were spin coated with diluted copolymer solutions. Six images of advancing and receding angles on three randomly chosen spots from each sample were taken using image-capturing equipment (Dazzle DVC, Dazzle media). The contact angles on both sides of the droplet were measured using the Scion Image. The average value of all the contact angles was used in calculating surface energy. In addition, the standard deviation of six measurements for each dynamic contact angle (advancing and receding) was calculated and reported as error. The measurements were performed under ambient condition (1 atm, 24±2° C.).

The viscoelastic properties were measured on the same dynamic mechanical thermal analyzer and method described above for the base layer and the maximum of the tan delta was used to determine the glass transition temperature, while the crosslink density was determined by utilizing the minimum storage modulus in the rubbery plateau.

An Instron universal electromechanical tester 5567 was used to conduct tensile testing of specimens for all the formulations. During the test, the rectangular test specimen (length 35 mm, width 6 mm and thickness 0.05-0.08 mm) was placed in the grips of the testing machine, carefully making sure the grips were tightened evenly and firmly, to prevent the slippage of the specimen while testing. The crosshead speed of the machine was set at the rate of 1 mm/min, which was calculated considering the specimen gauge length of 25 mm and strain rate of 0.04 $min^{-1}$. The specimen was pulled at the constant rate of extension. 10 specimens were tested for each formulation and those with the closest values were selected to obtain mean values. Standard deviations were indicated as error bars.

Oxygen permeability of crosslinked films was measured via an 8001 Model oxygen permeation analyzer (Illinois Instruments, Inc.). Each film sample with a 0.05-0.08 mm thickness was sandwiched between two steel masking plates, containing a circular hole centered in, smaller than the film sample size. Later, the plates were placed in the test chamber using a silicon-free film sealant. Pure oxygen gas (99.9%) at 40 psi was sent into the upper half of the chamber at a flow rate of 20 $cm^3$/min while an oxygen-free (99.999% zero grade nitrogen) carrier gas at 40 psi was introduced through the lower half with 10 $cm^3$/min flow rate. Oxygen molecules diffusing through the film into the lower chamber were carried to the sensor by nitrogen gas. This allowed a direct measurement of the oxygen transmission rate (OTR) through the films. The tests were conducted at 0% relative humidity under dry conditions and OTR units of measure were reported as ($cm^3$ $O_2$)/$m^2$/day and Barrer ($10^{-11}$·($cm^3$ $O_2$)·cm·$cm^{-2}$·$s^{-1}$·$mmHg^{-1}$). The 'cm' represents the thickness of the film. The '$cm^{-2}$' and '$mmHg^{-1}$' are the reciprocals of the surface area of the film and the pressure of the oxygen gas, respectively.

The $n_D$ values of copolymers were measured at ambient temperature with an Abbe refractometer, model 60/HR (Epic, Inc.). The light source of the refractometer was sodium D1 (yellow) lamp. The refractive index of the prism, $n_{Dprism}$, is 1.91617 at the used wavelength (λ) of 589.6 nm at 20° C. The copolymer solutions were discharged a few drops from the pipette directly onto the prism surface and the hinged prism box was closed over the sample. For the cured films, proper wetting liquids ($n_{Dsample} < n_{Dliquid} < n_{Dprism}$) with a known refractive index were used to coat the surfaces of the upper and lower prism, as well as the sample. The scale reading was performed at the field telescope, turning the control knob to a position where the observed field is divided into light and dark portions, the dark area below. The refractive index of the sample, $n_{Dsample}$, was derived directly from the scale reading using the following expression:

$$n_{Dsample} = \sin(\alpha) \times \sqrt{(n_{Dprism})^2 - \sin^2(\phi-\beta)} + \cos(\alpha) \times \sin(\phi-\beta) \quad (3)$$

Where φ is the scale reading in degrees, α is 60.000°, β is 29.500°, and $n_{Dprism}$ is the index of the prism glass (1.91617).

The main objective of the current study was to synthesize acrylate-based copolymers with unique properties imparted by the presence of fluoroalkyl containing monomer, and the accurate balance among other nonfluorinated reactants. In addition, this study was carried out to investigate the effect of copolymer molecular weight, along with the effect of hydroxy-functional chain transfer agent on the high-solids fluoroacrylates. Accordingly, a systematic characterization was conducted to acquire more detailed information about the fluorine inclusion into high solids acrylic coatings.

d. Preparation and Depiction of Copolymers

Low, medium, and high molecular weight acrylics were all synthesized in a semi-batch system under monomer-starved conditions. The fluoroalkyl methacrylate monomer was added to the mixture of monomers along with initiator, solvent, and chain transfer agent, and added to the reaction over the entire course of the polymerization. The 2,2'-azobis(2-methylpropionitrile) was selected as an initiator due to the poor hydrogen-abstracting ability of its radicals [92]. Solution polymerization required that both the monomers and the resulting copolymer should be soluble under the reaction conditions in order to avoid precipitation, which would result in a decreased degree of polymerization and reaction rate. Methyl ethyl ketone was the preferred reaction solvent for the synthesis of the copolymers, due to the solubility of reactants and products. The number-average ($M_n$) and weight-average molecular weights ($M_w$), and the polydispersity index of copolymers were determined by GPC as shown in Table 10. It is observed that the PDIs of the low molecular weight copolymers are close to 1.5, whereas the PDIs of the higher molecular weight counterparts are closer to 2.0. The theoretical values of PDI for copolymers via radical recombination and disproportionation are 1.5-2.0, respectively [93, 94]. This suggests that the low molecular weight copolymers were produced mainly via termination of growing chain by radical recombination, and higher molecular weight copolymers terminated by disproportionation.

TABLE 10

| Copolymer | Monomers Feed Ratio (vol. %) | $M_n$ | PDI ($M_w/M_n$) | Number-Average Functionality[b] $f_n$ | Hydroxyl Equivalent Weight[c] | Viscosity[d] (mPa · s) |
|---|---|---|---|---|---|---|
| F0-CTA5 Low $M_n$ | MMA:BA:HEMA 35:35:30 | 1873 | 1.55 | 5.7 | 327.6 | 74.4 ± 5.1 |
| F0-CTA2.5 Medium $M_n$ | MMA:BA:HEMA 35:35:30 | 6325 | 1.89 | 17.8 | 355.7 | 355.1 ± 4.3 |
| F0-CTA0.5 High $M_n$ | MMA:BA:HEMA 35:35:30 | 11 177 | 2.19 | 29.2 | 383.1 | 460.7 ± 3.0 |
| F5-CTA5 Low $M_n$ | MMA:BA:HEMA:TFEMA 25:40:30:5 | 1995 | 1.59 | 6.1 | 330.2 | 91.2 ± 5.0 |
| F5-CTA2.5 Medium $M_n$ | MMA:BA:HEMA:TFEMA 25:40:30:5 | 6699 | 1.74 | 18.7 | 358.9 | 388.7 ± 3.5 |
| F5-CTA0.5 High $M_n$ | MMA:BA:HEMA:TFEMA 25:40:30:5 | 11 823 | 2.21 | 30.6 | 386.9 | 489.5 ± 2.7 |
| F10-CTA5 Low $M_n$ | MMA:BA:HEMA:TFEMA 25:35:30:10 | 1970 | 1.52 | 5.9 | 333.9 | 86.4 ± 2.5 |
| F10-CTA2.5 Medium $M_n$ | MMA:BA:HEMA:TFEMA 25:35:30:10 | 6143 | 1.97 | 16.9 | 363.5 | 316.7 ± 3.1 |

TABLE 10-continued

| Copolymer | Monomers Feed Ratio (vol. %) | $M_n$ | PDI $(M_w/M_n)$ | Number-Average Functionality[b] $f_n$ | Hydroxyl Equivalent Weight[c] | Viscosity[d] (mPa · s) |
|---|---|---|---|---|---|---|
| F10-CTA0.5[a] High $M_n$ | MMA:BA:HEMA:TFEMA 25:35:30:10 | 10 987 | 2.02 | 28.0 | 392.3 | 446.3 ± 2.0 |

[a]F10-CTA0.5 = 10 vol. % TFEMA (2,2,2-trifluoroethyl methacrylate) - 0.5 wt. % CTA (chain transfer agent); based on total amount of the reaction monomers and the initiator.
[b]Number-average functionality = Number-average molecular weight ($M_n$)/hydroxyl equivalent weight.
[c]Hydroxyl equivalent weight = 100/((% HEMA/$M_w$ of HEMA) + (% CTA/$M_w$ of CTA)); % Hydroxy-functional reactive group (HEMA or CTA) = (gr of HEMA or CTA)/(100 gr resin) * 100.
[d]Viscosities for copolymer solutions (60 wt. % solids content) were measured at a fixed shear rate of 22 s$^{-1}$ at 25° C. The average value of three measurements is tabulated (±standard deviation).

A highly effective mercaptan having hydroxyl functionality was used in order to reduce the molecular weight and to incorporate additional hydroxyl functionality into a significant number of oligomer molecules. Average functionalities were calculated by dividing the number-average molecular weight to the equivalent weight of copolymers. In addition, the effect of copolymer molecular weight on the viscosity of acrylic solutions (the copolymer content was 60% by weight) was also evaluated and all were summarized in Table 10.

Figure 14:
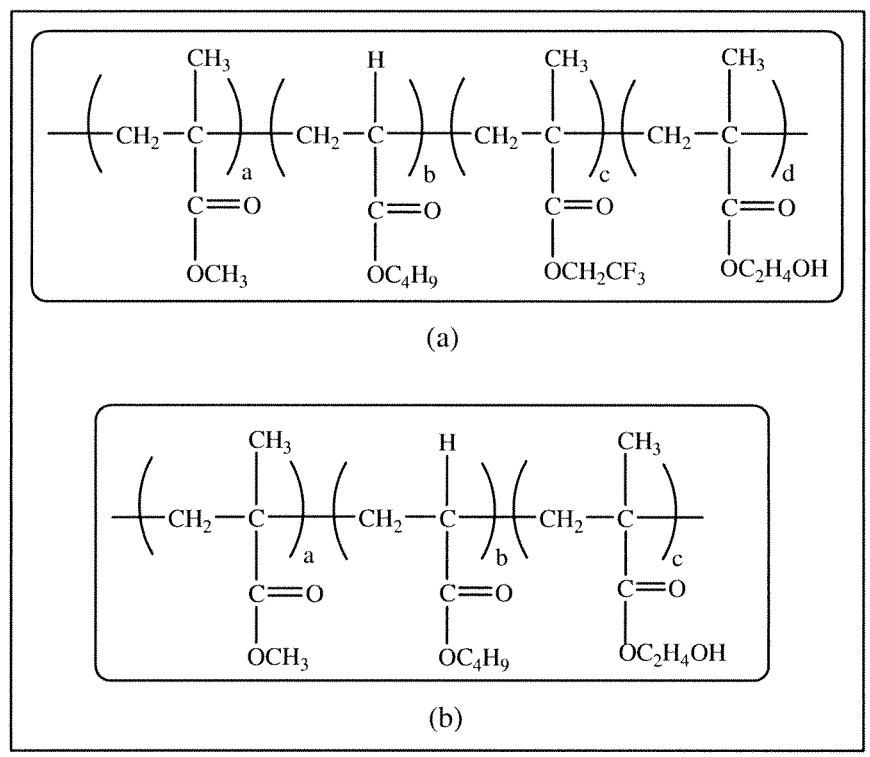
FIG. 14 is a schematic illustration of molecular structures for: (a) fluorinated; and (b) non-fluorinated acrylic copolymers.

Proposed structures of fluorinated acrylic copolymers and their non-fluorinated analogs are shown in FIG. 14.

e. Structural Characterization of Copolymers

Figure 15:
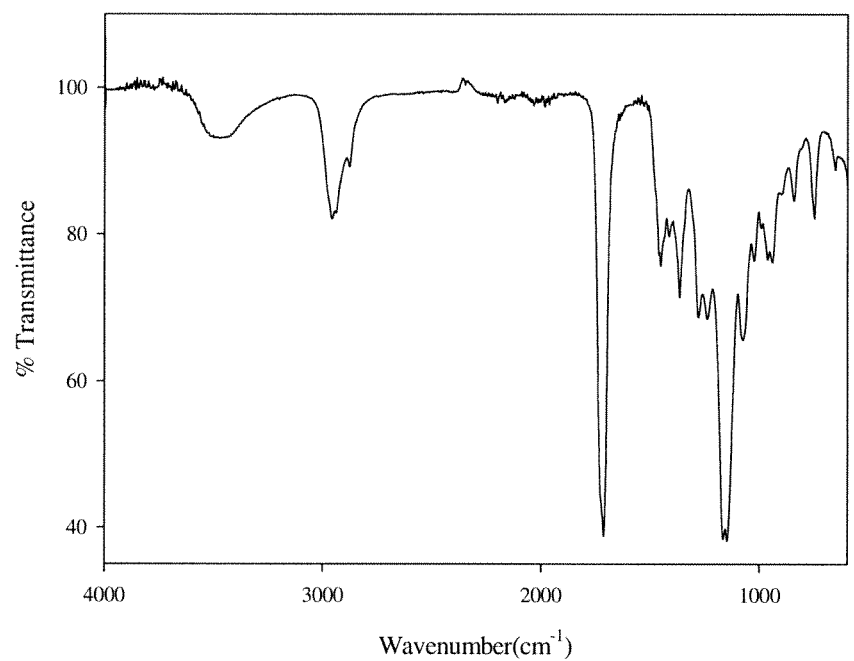
FIG. 15 is an FTIR spectrum of the F10-CTA5 designated copolymer.

The FTIR spectrum (FIG. 15) confirms the structure of the copolymer (F10-CTA5) in all aspects. From a comparison of the spectrum of poly(HEMA) with that of the copolymer, the broad absorption peak in the range 3300-3600 cm$^{-1}$ is attributed to O—H stretching in the 2-hydroxyethyl methacrylate (HEMA) moiety of the copolymer. Two distinct bands occurring at 2958 and 2877 cm$^{-1}$ are due to C—H stretching mode of methyl (CH$_3$) and methylene (CH$_2$) groups. In the copolymer, a strong C=O stretching vibration is observed at 1712 cm$^{-1}$. The carbonyl stretching vibration is due to the ester group. On the other hand, C—O stretching vibrations of the ester group are assigned to two bands at 1166 and 1147 cm$^{-1}$. The absorptions at 1452 and 1412 cm$^{-1}$ can be attributed to in-plane bending vibrations of C—H bonds in CH$_3$ groups [95]. The absorption band at 1365 cm$^{-1}$ is attributed to C—H bending vibration of CH$_2$ groups.

The characteristic absorption of C=C bond at 1640 cm$^{-1}$ disappears for all the copolymers. The absence of the peak in the copolymer is indicative of the participation of vinyl group in the copolymerization. Due to C—F stretching [96], F10-CTA5 shows a vibration in the range 1100-1300 cm$^{-1}$. Whereas, no characteristic band related to C—F bonds is observed in the FTIR spectra of fluorine-free copolymers. Two distinct bands occurring at 935 and 836 cm$^{-1}$ are due to out-of-plane C—H bending (twisting) vibrations of methyl and methylene groups. A strong band appears at 746 cm$^{-1}$ resulting from the in-phase rocking vibration of the methylene groups in the copolymer structure.

$^{19}$F NMR shows a singlet in a region from −70 to −74 ppm, assigned to fluorine in —CF$_3$ group. The $^1$H NMR spectra of copolymers confirm the presence of O—CH$_2$CF$_3$ protons from 2,2,2-trifluoroethyl methacrylate (singlet around 4.4-5.3 ppm). The $^{13}$C NMR spectra of copolymers confirm the presence of O—CH$_2$—CF$_3$ carbons from 2,2,2-trifluoroethyl methacrylate (singlet around 122 ppm). The other chemical shifts in the $^1$H and $^{13}$C NMR spectra are summarized in the experimental section (See Table 9).

The structure of acrylic copolymers has been characterized by MALDI-TOF mass spectrometry. MALDI-TOF was used for evidence of the anticipated end groups during the free-radical polymerization. All the low and medium molecular weight acrylic copolymers provided comparatively clearer mass spectra than high molecular weight (F0CTA0.5, F5CTA0.5, and F10CTA0.5) copolymers ($M_n$>10 000). The shortcoming with $M_n$ higher than 10 000 derives from the fact that the mass spectrometer used in the analysis has a limited resolution, much lower than needed for high molecular weight copolymers. This problem can be overcome by subjecting the copolymer to partial degradation to reduce the molar mass of the copolymer. As the degradation goes on, the length of the chain decreases and new end-groups are generated. However, the sequence of the partially degraded copolymer will be identical to the initial copolymer [97].

Figure 16:
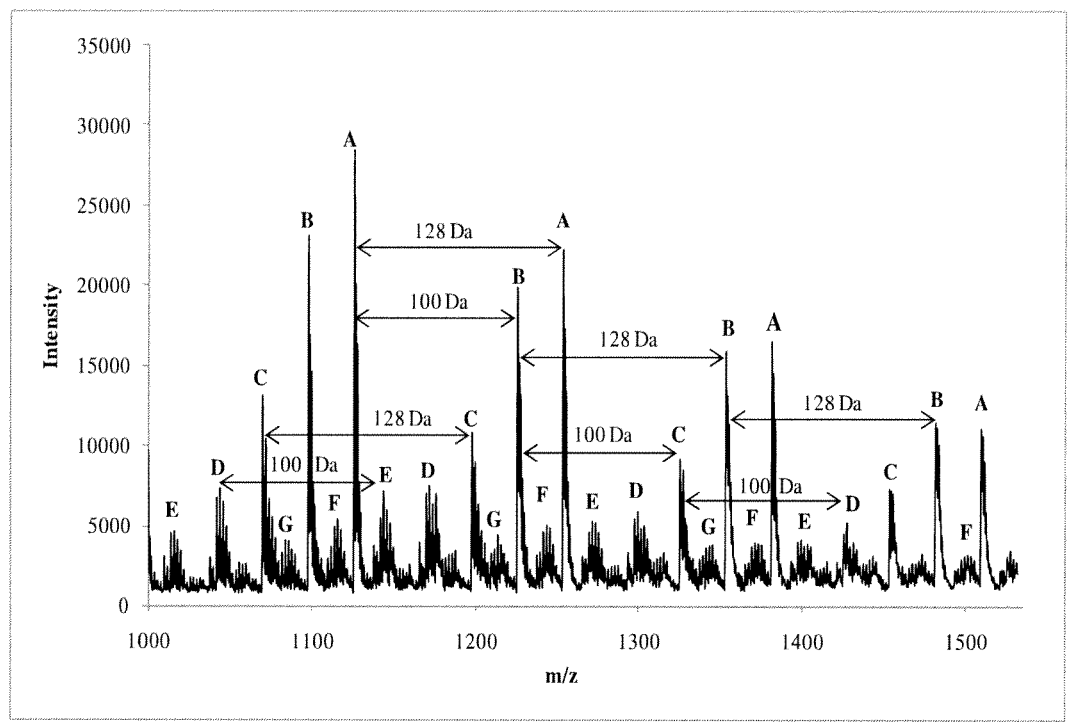
FIG. 16 is a mass spectrometry spectrum of the F10-CTA5 designated copolymer.

The enlarged mass spectrum of F10CTA5 ($M_n$=1970) in the ion mass region of 1000-1500 was selected for a detailed analysis of copolymer composition and end groups (See FIG. 16). The analysis was applied directly to the unfractionated sample. Three major series (A, B, and C) and four minor series (D, E, F, and G) were observed in the MALDI mass spectrum of F10-CTA5. The growing copolymer may terminate by the transfer of hydrogen or the other species from the initiator, solvent, or chain transfer agent present in the system. Therefore, each polymer chain might end with different species such as H(Hydrogen)+H; H+I(Initiator); H+CTA(Chain Transfer Agent); I+I; I+CTA; CTA+CTA: H+S(Solvent); I+S; S+S and CTA+S.

TABLE 11

Assignments of F10-CTA5 copolymer in MALDI-TOF mass spectrum

Random Structure Stoichiometry
R$_1$-(MMA)$_a$-(BA)$_b$-(HEMA)$_c$-(TFEMA)$_d$-R$_2$

| | R$_1$ = CTA, R$_2$ = S | | R$_1$ = H, R$_2$ = CTA | | R$_1$ = H, R$_2$ = H | | R$_1$ = CTA, R$_2$ = CTA | | R$_1$ = I, R$_2$ = I | |
|---|---|---|---|---|---|---|---|---|---|---|
| m/z obsrvd | a b c d | m/z calc | a b c d | m/z calc | a b c d | m/z calc | a b c d | m/z calc | a b c d | m/z calc |
| A | | | | | | | | | | |
| 1125.58 | 4 2 1 1 4 | 1125.53 | 3 1 2 2 3 | 1125.45 | 2 5 2 0 2 | 1125.65 | 1 4 0 2 | 1125.47 | 5 0 1 2 5 | 1125.49 |
| 1253.66 | 3 1 1 4 4 | 1253.61 | 2 2 2 3 3 | 1253.53 | 6 2 0 2 7 | 1253.74 | 1 5 0 2 | 1253.55 | 1 1 2 5 2 | 1253.58 |

TABLE 11-continued

Assignments of F10-CTA5 copolymer in MALDI-TOF mass spectrum

Random Structure Stoichiometry
$R_1\text{-}(MMA)_a\text{-}(BA)_b\text{-}(HEMA)_c\text{-}(TFEMA)_d\text{-}R_2$

| | $R_1$ = CTA, $R_2$ = S | | $R_1$ = H, $R_2$ = CTA | | $R_1$ = H, $R_2$ = H | | $R_1$ = CTA, $R_2$ = CTA | | $R_1$ = I, $R_2$ = I | |
|---|---|---|---|---|---|---|---|---|---|---|
| m/z obsrvd | a b c d | m/z calc | a b c d | m/z calc | a b c d | m/z calc | a b c d | m/z calc | a b c d | m/z calc |
| 1381.76 | 1 1 4 5 1 | 1381.69 | 2 2 3 4 2 | 1381.62 | 2 0 2 8 2 | 1381.82 | 1 6 0 2 | 1381.64 | 1 2 5 3 1 | 1381.66 |
| 1509.93 | 1 | 1509.78 | 2 | 1509.70 | 0 | 1509.91 | 1 7 0 2 | 1509.72 | 2 | 1509.75 |
| B | | | | | | | | | | |
| 1097.51 | 5 1 1 1 5 | 1097.49 | 4 0 2 2 4 | 1097.42 | 0 3 4 1 0 | 1097.55 | 2 3 0 2 | 1097.44 | 0 5 1 1 | 1097.61 |
| 1225.58 | 2 1 1 5 3 | 1225.58 | 1 2 2 4 2 | 1225.50 | 4 4 1 0 5 | 1225.63 | 2 4 0 2 | 1225.52 | 0 6 1 1 | 1225.69 |
| 1353.66 | 1 1 5 4 1 | 1353.66 | 2 2 4 3 2 | 1353.59 | 4 1 0 6 4 | 1353.56 | 2 5 0 2 | 1353.61 | 0 7 1 1 | 1353.78 |
| 1481.86 | 1 | 1481.75 | 2 | 1481.67 | 1 | 1481.80 | 2 6 0 2 | 1481.69 | 0 8 1 1 | 1481.86 |
| C | | | | | | | | | | |
| 1069.58 | 6 0 1 1 6 | 1069.461 | — | -1197.47 | 1 2 4 1 1 | 1069.52 | 3 2 0 2 | 1069.41 | 1 4 1 1 1 | 1069.58 |
| 1197.67 | 1 1 1 6 2 | 197.55 | 5 0 2 2 5 | 1325.56 | 3 4 1 1 4 | 1197.61 | 3 3 0 2 | 1197.49 | 5 1 1 1 6 | 1197.66 |
| 1325.73 | 1 1 6 3 1 | 1325.63 | 1 2 2 | 1453.64 | 4 1 1 5 4 | 1325.68 | 3 4 0 2 | 1325.57 | 1 1 1 7 1 | 1325.75 |
| 1453.82 | 1 | 1453.71 | 5 2 2 2 | | 1 | 1453.77 | 3 5 0 2 | 1453.66 | 1 | 1453.83 |
| D | | | | | | | | | | |
| 1041.55 | — | — | 0 4 2 1 | 1041.501 | 2 1 4 1 2 | 1041.49 | 4 1 0 2 | 1041.38 | 2 2 2 1 2 | 1041.55 |
| 1169.59 | 7 0 1 1 | 1169.52 | 0 5 2 1 0 | 169.5912 | 2 4 1 2 3 | 1169.57 | 4 2 0 2 | 1169.46 | 3 2 1 2 4 | 1169.63 |
| 1297.70 | 7 1 1 1 7 | 1297.60 | 6 2 1 0 7 | 97.67142 | 4 1 2 4 4 | 1297.65 | 4 3 0 2 | 1297.54 | 2 1 2 5 2 | 1297.71 |
| 1425.82 | 2 1 1 | 1425.68 | 2 1 | 5.76 | 1 | 1425.74 | 4 4 0 2 | 1425.63 | 1 | 1425.80 |

[a] Monoisotopic mass of each element was used for the calculation of ion mass. Peaks are assigned to the sodium complexes of structures ([A + Na]$^+$, [B + Na]$^+$, [C + Na]$^+$, and [D + Na]$^+$) Ion Mass = 22.9898 + 100.0524a + 128.0837b + 130.0630c + 168.0398d + $R_1$ + $R_2$
[b] 100.0524: MMA, 128.0837: BA, 130.0630: HEMA, 168.0398: TFEMA; $R_1$ or $R_2$ = 1.0078: H(Hydrogen), 68.0500: I(Initiator, 2,2'-Azobis(2-methylpropionitrile), 77.0061: CTA(Chain Transfer Agent, 2 hydroxyethyl mercaptan), 71.0497: S(Solvent, methyl ethyl ketone)

FIG. 16 and Table 11 indicate that each polymer chain may have different monomer units and end groups in the random copolymerization. Since the reactivity ratios and concentrations of monomers in the solution are all different, seven distinct peak clusters are observed in the spectrum. The peaks shown in FIG. 16 were assigned to copolymer chains comprised of the MMA, BA, HEMA, and TFEMA monomer units with different end groups at the $R_1$ and $R_2$ terminals. The calculated ion mass of each copolymer was expressed by Equation (4):

$$\text{Ion Mass}(m/z)_{calcd} = [MMA]_{a-mers} + [BA]_{b-mers} + [HEMA]_{c-mers} + [TFEMA]_{d-mers}$$

$$= \Delta[MMA]a + \Delta[BA]b + \Delta[HEMA]c + \Delta[TFEMA]d + [R_1 \text{ and } R_2 \text{ terminal groups}] + [Na^+]$$

(Ion Mass (m/z)$_{calcd}$; the calculated ion mass of the copolymer, $\Delta$ [MMA] or $\Delta$ [BA] or $\Delta$ [HEMA] or $\Delta$ [TFEMA]; the monoisotopic mass of the corresponding monomer unit, [Na$^+$]; the mass of the sodium ion.)

Table 11 also presents the observed (experimental) ion mass value of the strongest signal (highest intensity) among the respective peaks in each peak clusters. Herein, random structure stoichiometry has been predicted based on the several end group possibilities. Calculated ion masses were compared with the experimental ones, and the m/z values are in agreement with an error less than or equal to 0.01%. As an example, ion mass of A series observed in the mass region of 1000-1200 (m/z=1125.58 Da) almost agreed with the calculated mass values of the five possible copolymer chains with anticipated end groups as shown below.

$R_1$(CTA)+[MMA]$_{4-mers}$+[BA]$_{2-mers}$+[HEMA]$_{1-mer}$+ [TFEMA]$_{1-mer}$+$R_2$(S)+[Na$^+$]77.0061+100.0524× 4+128.0837×2+130.0630×1+168.0398×1+71.0497+ 22.9898=1125.53 Da(0.004% error)

$R_1$(H)+[MMA]$_{3-mers}$+[BA]$_{1-mer}$+[HEMA]$_{2-mers}$+ [TFEMA]$_{2-mers}$+$R_2$(CTA)+[Na$^+$]1.0078+ 100.0524×3+128.0837×1+130.0630×2+168.0398× 2+77.0061+22.9898=1125.45 Da(0.01% error)

$R_1$(H)+[MMA]$_{2-mers}$+[BA]$_{5-mers}$+[HEMA]$_{2-mers}$+ [TFEMA]$_{0-mer}$+$R_2$(H)+[Na$^+$]1.0078+100.0524× 2+128.0837×5+130.0630×2+168.0398×0+1.0078+ 22.9898=1125.65 Da(0.006% error)

$R_1$(CTA)+[MMA]$_{1-mer}$+[BA]$_{4-mers}$+[HEMA]$_{0-mer}$+ [TFEMA]$_{2-mers}$+$R_2$(CTA)+[Na$^+$]77.0061+ 100.0524×1+128.0837×4+130.0630×0+168.0398×2+ 77.0061+22.9898=1125.47 Da(0.01% error)

$R_1$(I)+[MMA]$_{5-mers}$+[BA]$_{0-mer}$+[HEMA]$_{1-mer}$+ [TFEMA]$_{2-mers}$+$R_2$(I)+[Na$^+$]68.0500+100.0524× 5+128.0837×0+130.0630×1+168.0398×2+68.0500+ 22.9898=1125.49 Da(0.008% error)

As shown in Table 11, the peak at about 1481 Da may be attributed to [(MMA)$_5$-(BA)$_4$-(HEMA)$_1$-(TFEMA)$_1$]Na$^+$ chain with the end groups of S(Solvent) and CTA(Chain Transfer Agent) or it may correspond to [(MMA)$_4$-(BA)$_3$-(HEMA)$_2$-(TFEMA)$_2$]Na$^+$, having H(Hydrogen) and CTA (Chain Transfer Agent) as end groups. The peaks corresponding to each series are interrelated with each other by the addition or subtraction of one butyl acrylate unit (128 Daltons), shown in FIG. 16. For example, [A+Na]$^+$ loses up to 3 butyl acrylate units from m/z=1509 to m/z=1125. Likewise, in [B+Na]$^+$ series, the difference between the peaks is also 128 Daltons (Da), which corresponds to the mass of butyl acrylate unit. The same interrelation is observed between the peaks of each series. In addition, [A+Na]$^+$ series is interrelated with [B+Na]$^+$ series by one methyl methacrylate unit (100 Da). For instance, the peak corresponding to [B+Na]$^+$ series at 1225 Da, loses one methyl methacrylate unit (100 Da) and shows a peak of [A+Na]$^+$ series at 1125 Da. Accordingly, [B+Na]$^+$ to [C+Na]$^+$; [C+Na]$^+$ to [D+Na]$^+$; [D+Na]$^+$ to [E+Na]$^+$; [E+Na]$^+$ to [F+Na]$^+$; and [F+Na]$^+$ series to [G+Na]$^+$ series, are all interrelated with each other by one methyl methacrylate unit (100 Da). Similar results for the other random copolymers (low and medium molecular weight series) with different monomer ratios in the feed were also confirmed by MALDI-TOF mass spectrometry (data not shown).

f. Surface Properties

Thin films were prepared by spin coating to investigate the wetting behavior of the copolymers. The wetting behavior was examined by contact angle measurements using two probe liquids. The largest possible angle, advancing angle, and the smallest possible contact angle, receding angle, for all the formulations were measured and tabulated in Table 10. The surface tensions of acrylic films were calculated from the average of advancing ($\theta_{adv}$) and receding ($\theta_{rec}$) contact angles. Owens-Wendt geometric mean with the two-liquid method [98] was applied. The equilibrium contact angle for a liquid drop on a solid surface is usually discussed in terms of Young's Equation (5) and Fowke's Equation (6).

$$\gamma_S = \gamma_{SL} + \gamma_L \cos\theta \quad (5)$$

$$\gamma = \gamma^d + \gamma^p \quad (6)$$

where $\gamma_S$, $\gamma_{SL}$, $\gamma_L$, $\theta$, $\gamma$, $\gamma^d$, and $\gamma^p$ are surface tension of solid, surface tension between solid and liquid, surface tension of liquid, contact angle, total surface tension, dispersion component, and polar component, respectively. The surface tension of solid surface and liquid, and their relationships are given by $$\gamma_S = \gamma_S^d + \gamma_S^p \quad (7)$$

$$\gamma_L = \gamma_L^d + \gamma_L^p \quad (8)$$

$$\gamma_{SL} = \gamma_S + \gamma_L - 2(\gamma_S^d \gamma_L^d)^{1/2} + 2(\gamma_S^p \gamma_L^p)^{1/2} \quad (9)$$

where $\gamma_L^p$, $\gamma_L^d$, $\gamma_S^p$, and $\gamma_S^d$ represent the polar component, and dispersion component from the liquid and the solid, respectively. The surface tension of acrylic film was obtained from the contact angles and the surface tensions of two different probe liquids, deionized water ($\gamma_L^d$=22.0 mJ/m$^2$, $\gamma_L^p$=50.2 mJ/m$^2$, $\gamma_L$=72.2 mJ/m$^2$) and ethylene glycol ($\gamma_L^d$=29.3 mJ/m$^2$, $\gamma_L^p$=19.0 mJ/m$^2$, $\gamma_L$=48.3 mJ/m$^2$) by using the following expression driven from Equations (5) and (9).

$$(1+\cos\theta)\gamma_L = 2(\gamma_S^d \gamma_L^d)^{1/2} + 2(\gamma_S^p \gamma_L^p)^{1/2} \quad (10)$$

TABLE 12

Dynamic contact angles, and surface tension

| Copolymers | Surface Tension (mJ/m$^2$) | | | Contact angle $\theta$ (°) With | | | |
|---|---|---|---|---|---|---|---|
| | | | | Deionized Water | | Ethylene Glycol | |
| | $\gamma^d$ | $\gamma^p$ | $\gamma$ | $\theta_{adv}$ | $\theta_{rec}$ | $\theta_{adv}$ | $\theta_{rec}$ |
| F0-CTA5 Low M$_n$ | 7.3 | 41.0 | 48.3 | 68.1 ± 1.8 | 36.9 ± 2.8 | 43.0 ± 1.7 | 37.6 ± 3.4 |
| F0-CTA2.5 Medium M$_n$ | 10.5 | 34.6 | 45.1 | 70.9 ± 3.1 | 38.9 ± 1.3 | 45.8 ± 1.2 | 30.5 ± 2.4 |
| F0-CTA0.5 High M$_n$ | 8.6 | 36.7 | 45.3 | 74.4 ± 1.5 | 35.9 ± 0.8 | 49.3 ± 2.6 | 33.0 ± 1.8 |
| F5-CTA5 Low M$_n$ | 28.4 | 7.6 | 36.0 | 93.8 ± 3.4 | 59.2 ± 2.0 | 54.0 ± 3.2 | 38.4 ± 2.7 |
| F5-CTA2.5 Medium M$_n$ | 25.6 | 10.2 | 35.8 | 96.2 ± 1.6 | 50.7 ± 3.2 | 50.1 ± 4.1 | 39.3 ± 1.5 |
| F5-CTA0.5 High M$_n$ | 25.7 | 8.4 | 34.2 | 100.4 ± 2.0 | 53.0 ± 2.6 | 56.6 ± 1.2 | 40.5 ± 2.0 |
| F10-CTA5 Low M$_n$ | 19.6 | 8.2 | 27.8 | 120.9 ± 3.5 | 53.4 ± 1.6 | 68.1 ± 0.7 | 50.8 ± 0.9 |
| F10-CTA2.5 Medium M$_n$ | 24.6 | 2.2 | 26.8 | 128.0 ± 2.2 | 59.2 ± 0.9 | 74.0 ± 2.1 | 61.1 ± 3.1 |
| F10-CTA0.5 High M$_n$ | 25.8 | 1.9 | 27.7 | 125.7 ± 0.9 | 62.5 ± 1.5 | 74.2 ± 2.8 | 60.4 ± 2.3 |

The difference between the advancing and receding angles is referred to as the contact angle hysteresis, an important diagnostic tool of surface studies [99]. As summarized in Table 12, small amounts of fluorine on the surface report a fairly high advancing contact angle, since the liquid is reluctant to advance and to wet the surface. However, fluorine had relatively little effect on the receding contact angle. The advancing values for deionized water were quite high; whereas, receding values were lower. As a consequence, large values of hysteresis were found. Contact angle hysteresis was most likely caused by chemical heterogeneity of the topmost layer, and surface reconstruction of the polymer film after contact with the deionized water [100].

Contact angle measurements indicate that the surface of fluorinated acrylic copolymers has more hydrophobic character as compared to fluorine-free acrylates, and contact angle elevates when the amount of fluorine is increased in the copolymer composition. In addition, the surface energies of the P(MMA-ran-BA-ran-HEMA-ran-TFEMA) are consistently lower than their P(MMA-ran-BA-ran-HEMA) fluorine free analogues, at equivalent percentages of chain transfer agent (CTA) incorporation. The lowest surface energies (around 27 mJ/m$^2$) are reported for F10 series, which may be explained on the basis of the difference in the electronegativity between fluorine and hydrogen, the higher carbon-fluorine bond strength, and the small bond polarization of carbon-fluorine bond [101].

g. Preparation and Coating Properties of Thermosetting Acrylics

Figure 17:
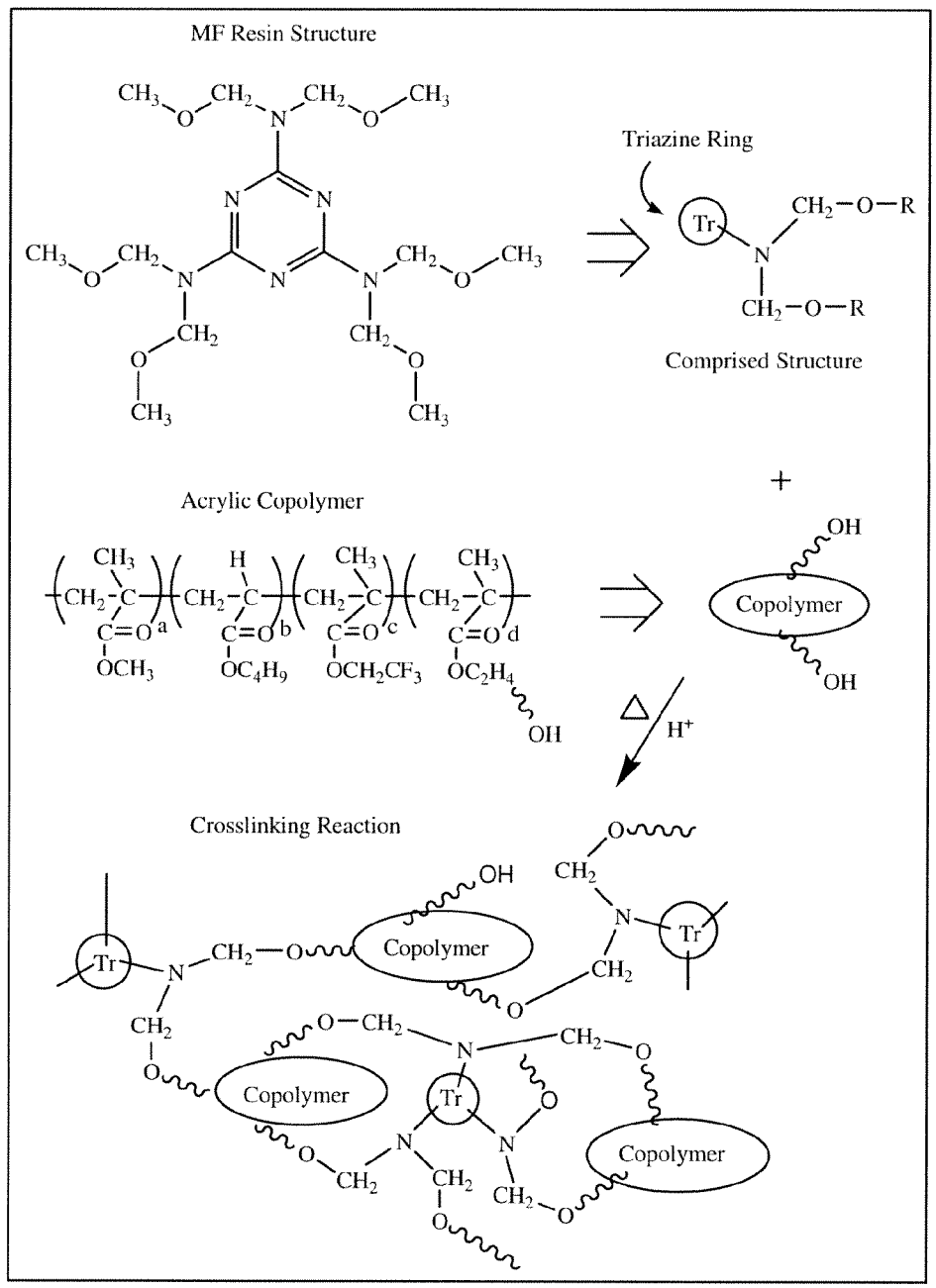
FIG. 17 is a schematic representation of a crosslinking reaction by melamine formaldehyde resin with a hydroxyl group in a copolymer under acid catalyst according to an embodiment of the present invention.

The major crosslinking reaction between copolymer and melamine formaldehyde resin is depicted in FIG. 17. Bauer et al. [102] reported that the hydroxyl groups tend to be more reactive with fully alkylated melamines, via strong acid catalysis. Therefore, in our study, a commercial methylated MF Class I resin was used with a strong acid catalyst, p-toluenesulfonic acid monohydrate. After the acrylic copolymers were crosslinked with the MF resin; general coatings tests, as well as tensile, dynamic mechanical, barrier, and optical properties were evaluated.

On the other hand, abrasion resistance and adhesion to the substrate enhanced for higher molecular weight copolymers. After 500 cycles on the Taber abraser, less weight loss was detected for acrylic coatings prepared with high molecular weight copolymers. These coatings also showed better adhesion (186 lb$_f$/in.$^2$) in the pull-off adhesion test.

TABLE 13

General coating properties

| Sample | | Pencil Hardness | Crosshatch Adhesion | Gloss* @20° | @60° | Pull-off Adhesion (lb/in$^2$) | Taber Abrasion (500 cycles) | MEK Double Rubs | Impact Resistance (lb/in) Direct | Reverse |
|---|---|---|---|---|---|---|---|---|---|---|
| F0 | Low | 5H | 5B | 78 | 108 | 93 ± 6 | 40 | >200 | 3 | 0.5 |
| | Med | 5H | 5B | 75 | 104 | 134 ± 15 | 25 | >200 | 3 | 1 |
| | High | 5H | 5B | 72 | 101 | 147 ± 6 | 20 | >200 | 3.5 | 1.5 |
| F5 | Low | 5H | 5B | 88 | 126 | 110 ± 10 | 40 | >200 | 3.5 | 1 |
| | Med | 5H | 5B | 83 | 123 | 150 ± 5 | 25 | >200 | 3.5 | 1 |
| | High | 5H | 5B | 81 | 120 | 162 ± 3 | 25 | >200 | 4 | 2 |
| F10 | Low | 5H | 5B | 95 | 139 | 128 ± 8 | 40 | >200 | 4 | 2 |
| | Med | 5H | 5B | 91 | 135 | 178 ± 21 | 25 | >200 | 4 | 2 |
| | High | 5H | 5B | 90 | 132 | 186 ± 5 | 20 | >200 | 4 | 2 |

*The error is ±2 gloss units.

Table 13 presents coating properties for cured films obtained from mixtures of copolymer series and melamine formaldehyde resin (films were cast and kept under ambient conditions for 12 h followed by thermally curing at 120° C. for 1 h). High hardness and high solvent resistance were observed for all of the films. Gray [76] previously evaluated the thermosetting coatings of the acrylic oligomers which were prepared by using different hydroxy-functional and nonhydroxy-functional chain transfer agents. His results indicated that hydroxy-functional mercaptans gave better hardness and solvent resistance to the coating than nonhydroxy-functional mercaptans. Therefore, it is postulated that the hydroxy-functional chain transfer agent, 2-hydroxyethyl mercaptan, in the formulations boosted the hardness, as well as positively altered the overall performance, of the films.

As observed in Table 13, pencil hardness, crosshatch adhesion, and appearance of the films are almost identical with those of the non-fluorinated control. However, a higher degree of gloss was observed with an increase in the fluorine content and with a lower molecular weight. Gloss measurements with an incident light at 20° and 60° were performed on the acrylic films cured on the steel substrates, in order to quantify the amount of light reflected at the specular angle from the surface. Since the readings obtained at 60° were over 70, the readings at 20° were also made to obtain higher precision. For example, gloss at 20° for F0 (low $M_n$) was measured as 78 but reached to a value of 95 for F10 (low $M_n$).

Figure 18:
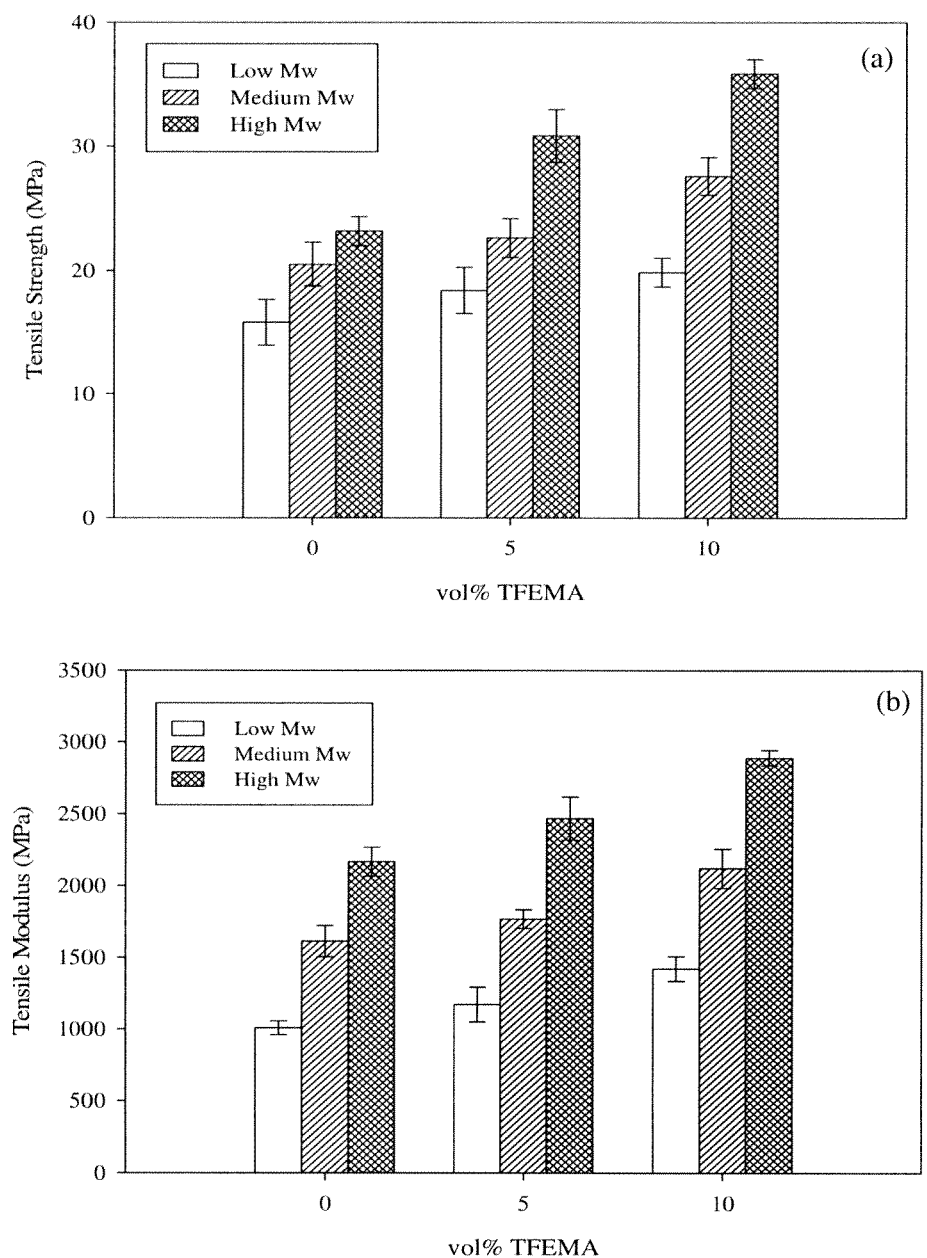
FIG. 18 is a graphical plot of (a) tensile strength; and (b) tensile modulus as a function of TFEMA content for copolymers according to an embodiment of the present invention.

Tensile properties of copolymers are summarized in FIGS. 18(a) and 18(b). FIG. 18 clearly shows that tensile strength and tensile modulus values uniformly increased upon introduction of increasing levels of TFEMA for films cast from acrylic copolymers with the MF resin. When crosslinking agent was introduced, tensile strength and modulus improved significantly as expected with respect to films without crosslinker [103].

Both tensile modulus and tensile strength are greatly influenced by the molecular weight of the copolymers, and crosslink density of the films prepared with the corresponding copolymers. This results in an increase of tensile modulus and tensile strength for medium molecular weight copolymers followed by an even further increase for higher molecular weight series. In addition, by increasing TFEMA content for the same molecular weight series, the increase of tensile modulus and strength is much smaller when compared with their nonfluorinated counterparts. While the highest modulus (3000 MPa) was revealed at 10% TFEMA for a high molecular weight copolymer, the lowest value obtained (1000 MPa) was at 0% TFEMA content for a low molecular weight copolymer. Likewise, the tensile strength increased up to 35 MPa, resulting from 10% TFEMA content at the high molecular weight copolymer, whereas the lowest value of the tensile strength was reported as 15 MPa a fluorine-free low molecular weight copolymer.

TABLE 14

Thermal properties of copolymers and viscoelastic properties of cured films

| Sample | | $T_g$ (° C.) by DSC (Copolymers) | Minimum Storage Modulus $E'_{min}$ (N/m$^2$) | Crosslink Density (mol/m$^3$) | $T_g$ (° C.) by DMA (Cured Films) | Max. tan δ |
|---|---|---|---|---|---|---|
| F0 | Low | 12 | 7.3E+06 | 666 | 117 | 0.45 |
| | Med | 29 | 11.9E+06 | 1073 | 125 | 0.37 |
| | High | 42 | 26.5E+06 | 2278 | 128 | 0.26 |
| F5 | Low | 8 | 7.6E+06 | 723 | 121 | 0.52 |
| | Med | 26 | 18.3E+06 | 1729 | 128 | 0.26 |
| | High | 41 | 25.3E+06 | 2209 | 135 | 0.18 |

TABLE 14-continued

Thermal properties of copolymers and viscoelastic properties of cured films

| Sample | | $T_g$ (°C.) by DSC (Copolymers) | Minimum Storage Modulus $E'_{min}$ (N/m²) | Crosslink Density (mol/m³) | $T_g$ (°C.) by DMA (Cured Films) | Max. tan δ |
|---|---|---|---|---|---|---|
| F10 | Low | 14 | 9.8E+06 | 863 | 118 | 0.29 |
| | Med | 30 | 22.8E+06 | 2163 | 120 | 0.27 |
| | High | 44 | 26.9E+06 | 2444 | 130 | 0.25 |

Glass transition temperatures of the copolymers are shown in Table 14. Lower glass transition temperatures are observed for F5 series copolymers in comparison to their F0 and F10 counterparts. The higher amount of n-butyl acrylate ($T_g$ of the high molecular weight homopolymer; −54° C.) in the F5 formulations causes a slight decrease in the $T_g$ values. Alternately, the increase of MMA to TFEMA ratio in the composition does not affect the $T_g$ drastically, although the glass transition temperature of poly(TFEMA) is always lower than that of poly(MMA). For all the low molecular weight copolymers, $T_g$ values are below the room temperature. As the molecular weight of copolymers increases, higher $T_g$ values are observed. The dependence of glass transition temperature on molecular weight was previously reported by Gibbs and DiMarzio [104]. They made quantitative predictions concerning the variations of glass transition temperature with molecular weight and concluded that for amorphous polymers, $T_g$ increased with molecular weight toward asymptotic limits, which were reached at a number average molecular eight of about 10 000 [105, 106]. Mazzola et al. [56] also reported the increase of $T_g$ with the increase in molecular weight of partially fluorinated acrylic copolymers based on ammonium 2-fluoroacrylate and acrylic acid.

The crosslink densities of the cured films were calculated using viscoelastic measurements from dynamic mechanical analysis. The crosslink density of the film has been defined as the moles of elastically effective network chains per cubic meter of sample [107, 108]. The storage modulus (E') value at temperatures well above the $T_g$ of the cured material is an indication of crosslink density [109]. The crosslink density can be calculated by using the following expression derived from the theory of rubber elasticity [110], where R is the gas constant (8.3145 N·m/mole·K), T is the absolute temperature in Kelvin, and $E'_{min}$ is the minimum value of elastic modulus in the rubbery plateau:

$$v_e = \frac{E'_{min}}{3RT} \tag{11}$$

The $T_g$, $E'_{min}$, crosslink density, and the maximum tan δ for the nine coating films are also summarized in Table 14. The $T_g$ of the crosslinked films was obtained from the maximum of the α-transition. For F0 series, $T_g$ increased from 117 to 128° C. with the increase in copolymer molecular weight, while the crosslink density increased from 666 to 2278 mol/m³. For F5 series, $T_g$ increased from 121 to 135° C. when the copolymer molecular weight was increased, likewise the crosslink density increased from 723 to 2209 mol/m³. Even the higher fluorine percentage (10%) did not change this trend (low molecular weight F10 had a $T_g$ of 118° C. with a crosslink density of 863 mol/m³ and the $T_g$ increased up to 130° C. and the crosslink density reached a value of 2444 mol/m³, with increase in number average functionality). As a result, the findings were as crosslinking proceeds, $T_g$ increases, and the height of the tan δ peak decreases as extent of cure increases (See Table 14). Glass transition temperatures of the final reacted coatings were higher than those of uncured copolymer counterparts. Readily crosslinked films formed strong networks and gave high crosslink density, measured at temperatures around 50° C. above the glass transition temperature of the cured s.

h. Barrier and Optical Properties

Oxygen permeability values at 25° C. are reported as cc/m²/day and Barrer in Table 15. The oxygen transmission rate (OTR) of each film is presented as the average value of the last 20 data points observed in the plateau region of OTR versus time graph, and the standard deviation is reported as less than 3%.

TABLE 15

Oxygen permeability and refractive index*.

| Sample | | $n_D$ (copolymer) | $n_D$ (film) | Oxygen Permeability (cc/m²/day) | Oxygen Permeability (Barrer) |
|---|---|---|---|---|---|
| F0 | Low | 1.46557 | 1.53068 | 600 ± 7 | 0.235 ± 0.003 |
| | Med | 1.46643 | 1.53212 | 420 ± 5 | 0.165 ± 0.002 |
| | High | 1.46782 | 1.53857 | 356 ± 10 | 0.120 ± 0.003 |
| F5 | Low | 1.45543 | 1.50017 | 960 ± 20 | 0.376 ± 0.007 |
| | Med | 1.45716 | 1.50857 | 560 ± 8 | 0.219 ± 0.003 |
| | High | 1.45813 | 1.51879 | 430 ± 5 | 0.168 ± 0.002 |
| F10 | Low | 1.43479 | 1.49045 | 1670 ± 50 | 0.653 ± 0.020 |
| | Med | 1.43577 | 1.49066 | 916 ± 35 | 0.359 ± 0.013 |
| | High | 1.43883 | 1.49130 | 907 ± 20 | 0.254 ± 0.007 |

*The mean value of 3 refractive index measurements is reported. The standard deviation is less than or equal to 0.00011.

In F0 series, a significant decrease of OTR from 0.235 to 0.120 Barrer (48%) is observed with the increase of the number average molecular weight of the copolymer from $M_n$=1873 to $M_n$=11 177. As for F10 series, the oxygen transmission rate seems to be more noteworthy with 61% reduction from low molecular weight (F10-CTA5, $M_n$=1970) to high molecular weight (F10-CTA0.5, $M_n$=10 987). On the contrary, the inclusion of fluorinated monomer leads to poorer barrier properties. The OTR value increases by a factor of 2.1 for low $M_n$ copolymers (from F0CTA5, $M_n$=1873 to F10CTA5, $M_n$=1970) and 2.8 for high $M_n$ counterparts (from F0CTA0.5, $M_n$=11 177 to F10CTA0.5, $M_n$=10 987), while the TFEMA concentration goes from 0 to 10 vol. %.

The refractive indices of the copolymers before and after curing were also compared (See Table 15). Fluorine-substituted monofunctional methacrylate monomer has been demonstrated to have significant effects on the optical properties. Liu et al. [111] studied the copolymerization of 2,2,2-trifluoroethyl methacrylate (TFEMA) with methyl methacrylate (MMA) in fluoroalcohol to obtain a good cladding material for an optical fiber based on poly(methyl methacrylate) (PMMA). They compared the refractive index of the PMMA film with that of the copolymer and related the lower refractive index of the copolymer to the presence of fluorinated units. In our study, for low molecular weight copolymer solutions, refractive index value decreased from 1.46557 to 1.43479; and for cured films, refractive index value decreased from 1.53068 to 1.49045, while 2,2,2-trifluoroethyl methacrylate increased from 0 to 10% in the composition. The inclusion of fluorinated monomer in the standard formulation also resulted in improved refractive index, by lowering the value 2.1% and 3% for medium and high molecular weight copolymers respectively.

Acrylate-based copolymers were successfully synthesized with different acrylic monomers to obtain new high-solids surface active acrylics with potential uses for the automotive industry. Surface properties initially motivated this study of adding fluorine to the coating. Obviously, there are a range of properties that fluoropolymers bring to the final film, including chemical inertness, thermal resistance, low friction, and water repellence. For dielectric properties and thermal resistance, the use of large quantities of fluorine throughout the coating may be necessary. However, the incorporation of small amounts of fluoroalkyl monomers (5-10 wt. %) to copolymerization was anticipated as adequate to obtain the desired surface properties, thus there is no need of large amounts of fluorinated groups throughout the bulk of the film.

As for the general coating properties, Malshe et al. [55] previously studied the coating properties of fluorinated acrylic copolymers based on methyl methacrylate (MMA), butyl acrylate (BA), and 2-hydroxy ethyl methacrylate (HEMA). They partially esterified the hydroxyl functionality of HEMA with tetrafluoro propanoic acid and cured the polymer with butylated melamine formaldehyde resin. In their study, fluorine incorporation extended the protective ability of coating against corrosion; however, coating properties (i.e. pencil hardness, gloss, impact resistance, solvent resistance) were not noticeably improved. The low levels of fluorine used in the top coat copolymer did not change the coating properties of the film drastically, but acrylic films with higher solvent resistance, pencil hardness, and gloss were obtained as compared to the study reported by Malshe and coworkers [55]. Not being bound by theory, it may be due to the fact that the copolymers with higher hydroxyl functionality caused films to become stronger and more solvent resistant due to the crosslinking reactions, and the less tendency of uncrosslinked copolymers to act as plasticizers [112].

It is well known that fluoroalkyl containing monomers are used in contact lenses to improve oxygen permeability [113]. Poly(methyl methacrylate) (PMMA) was previously reported as a barrier to oxygen with a transmission rate of 0.5 Barrer, which was not suitable for extended wear, thus new fluoroacrylate-based contact lens materials with improved levels of oxygen permeability were introduced later. In the instant invention, the increase in fluorine concentration also caused a higher oxygen transmission rate. However, the values were found to be still considerably low as compared to the ones in polymeric contact lens materials [114].

Higher molecular weight acrylics respond with a high modulus and crosslink density (See FIG. 18 and Table 14); consequently, causing a significant increase in the effective diffusion path length of gas molecules, leading to appreciable reductions in oxygen permeability. As expected, $O_2$ permeability was confirmed to be inversely related to the crosslink density and the molecular weight. The higher crosslink density (the lower free volume) in organic domains associated with the higher molecular weight (higher number-average functionality) resulted in decrease of oxygen transmission rate (See Table 15). Permeability to small molecules; particularly water and oxygen, contributes to corrosion. Therefore, it is very satisfactory that low oxygen transmission rates were obtained for the protective coatings.

The acrylic resins described herein also satisfy the environmental regulations with a higher solids content. The surface active, high barrier acrylic coatings were formulated with reduced solvent levels, which can still be applied using conventional equipment. The usage of lower molecular weight acrylic copolymers resulted in reducing the viscosity (See Table 10). In addition, the oxygenated solvent, methyl ethyl ketone (MEK), had also a favorable viscosity reduction profile for these acrylic copolymers. Even though MEK has still been labeled as a volatile organic compound (VOC), the removal of MEK from hazardous air pollutants' (HAPs) list occurred at the end of 2005 [115]. As a result, the aforementioned acrylic resins with a solids content of 60% by weight are suitable for use in high-solids clearcoats for automotive original equipment manufacturer (OEM) coating systems, which are still mostly solventborne.

III. Formulation of Multi-Phase Self-Stratifying Coatings

Combinations of telechelic resin layers and fluorinated polymer layers described above and/or as disclosed below were mixed together and applied to a surface in order to determine whether or not stratification would occur. In addition, various properties of potential telechelic resin component/fluorinated polymer component systems were determined, measured and/or calculated in order to better understand and/or predict which combinations would provide a multi-phase self-stratification coating system.

a. Interfacial Surface Energy

One such property of potential telechelic resin component/fluorinated polymer component layers combinations was the interfacial surface tension between a particular telechelic resin component and a particular fluorinated polymer component which was determined according to the protocol described below.

Contact angles were measured between the given layers and deionized water ($\gamma_L^d$=22.0 mJ/m², $\gamma_L^p$=50.2 mJ/m², $\gamma_L$=72.2 mJ/m²) or ethylene glycol ($\gamma_L^d$=29.3 mJ/m², $\gamma_L^p$=19.0 mJ/m², $\gamma_L$=48.3 mJ/m²) using a Rame-Hart contact angle goniometer, model 100-00, where $\gamma_L^d$, $\gamma_L^p$, and $\gamma_L$ represent dispersion component of the surface energy, polar component of the surface energy and total surface energy, respectively. Four images of advancing and receding contact angles on two randomly chosen spots from each sample were taken using image-capturing equipment (Dazzle DVC, Dazzle media). The contact angles on both sides of the droplet were measured using a Scion Image.

An advancing contact angle is measured when the sessile drop has the maximum volume allowable for the liquid-solid interfacial area: any addition will make the drop expand and increase the liquid-solid interfacial area. This can be thought of as the "wetting angle" because the drop is ready to wet additional area. The receding angle is the opposite: if any liquid is removed from the drop, the liquid-solid interfacial area will decrease. This is the "de-wetting angle." The advancing angle is the largest possible angle and the receding is the smallest possible contact angle with both angles presumed to be measured at thermodynamic equilibrium.

Once contact angles were measured, an average value of all the contact angles was used in calculating a surface energy for the particular layer. Owens-Wendt geometric mean with the two-liquid method [116] was applied and the measurements were performed under ambient conditions (1 atm, 24±2° C.).

The equilibrium contact angle for a liquid drop on a solid surface is usually discussed in terms of Young's equation and Fowke's equation discussed above. In addition, from Equations 5 and 9 above, the following relationship can be derived for the surface tension of the solid.

$$(1+\cos\theta)\gamma_L = 2(\gamma_S^d \gamma_L^d)^{1/2} + 2(\gamma_S^p \gamma_L^p)^{1/2} \qquad (12)$$

The surface tension of a solid polymer surface was then obtained from the contact angles and the data of the two different probe liquids (water and ethylene glycol) using the following expressions.

$$(1+\cos\theta_1)\gamma_{L1} = 2(\gamma_S^d \gamma_{L1}^d)^{1/2} + 2(\gamma_S^p \gamma_{L1}^p)^{1/2} \quad (13)$$

$$(1+\cos\theta_2)\gamma_{L2} = 2(\gamma_S^d \gamma_{L2}^d)^{1/2} + 2(\gamma_S^p \gamma_{L2}^p)^{1/2} \quad (14)$$

$$(1+\cos\theta_1)\gamma_{L1} - 2(\gamma_S^d \gamma_{L1}^d)^{1/2} - 2(\gamma_S^p \gamma_{L1}^p)^{1/2} = 0 \quad (15)$$

$$(1+\cos\theta_2)\gamma_{L2} - 2(\gamma_S^d \gamma_{L2}^d)^{1/2} - 2(\gamma_S^p \gamma_{L2}^p)^{1/2} = 0 \quad (16)$$

The polar and dispersion components ($\gamma_S^p$, and $\gamma_S^d$) were solved by setting Equations 15 and 16 to zero. In addition, the Harmonic Mean method of Wu[117] was used for calculating an interface surface tension between two polymers, 1 and 2:

$$\gamma_{12} = \gamma_1 + \gamma_2 - \frac{4\gamma_1^d \gamma_2^d}{\gamma_1^d + \gamma_2^d} - \frac{4\gamma_1^p \gamma_2^p}{\gamma_1^p + \gamma_2^p} \quad (17)$$

where $\gamma_1$ and $\gamma_2$ are the total surface energies of materials 1 and 2, respectively. Data for the various tested polymers are shown in Table 16 with the composition for the acrylic resin components listed in Table 17 and the epoxy resin components listed in Table 18.

TABLE 16

| Sample | Surface Tension (mJ/cm²) | | |
|---|---|---|---|
| | $\gamma^d$ | $\gamma^p$ | $\gamma = \gamma^d + \gamma^p$ |
| A1 + MF | 24.5 | 14.9 | 39.4 |
| A12 + MF | 15.8 | 19.9 | 35.7 |
| A12E2 + MF | 11.5 | 31.2 | 42.7 |
| A12E2 + MF + PolyAmide | 11.9 | 35.2 | 47.1 |
| A1E1 + MF + PolyAmide | 7.9 | 45.3 | 53.2 |
| A22 + MF | 26.3 | 11.4 | 37.7 |
| A22E1 + MF | 18.1 | 19.0 | 37.1 |
| A22E2 + MF | 26.9 | 12.6 | 39.5 |
| A22E5 + MF | 21.9 | 16.9 | 38.8 |
| A5 + MF | 3.9 | 49.4 | 53.3 |
| A5E3 + MF | 5.9 | 48.6 | 54.5 |
| A9 + MF | 6.8 | 50.1 | 56.9 |
| A9D332 + MF + PolyAmide | 3.7 | 61.5 | 65.2 |
| D332 + PolyAmide | 2.9 | 78.1 | 81.0 |
| E1 + MF | 9.7 | 47.3 | 57.0 |
| E1 + PolyAmide | 10.2 | 47.7 | 57.9 |
| E2 + MF | 4.3 | 64.1 | 68.4 |
| E2 + PolyAmide | 2.0 | 84.9 | 86.9 |
| E3 + MF | 6.2 | 60.7 | 66.9 |
| E5 + MF | 3.6 | 63.1 | 66.7 |

TABLE 17

| Acrylic Resin | Monomers | Monomer Ratio | Mn | PDI (Mw/Mn) | Difference from "A1" |
|---|---|---|---|---|---|
| A1 | MMA:BA:HEMA:F | 25:40:30:5 | 1448 | 1.81 | — |
| A2 | MMA:EA:HEMA:F | 25:40:30:5 | 2659 | 1.55 | Ethyle acrylate, low MW |
| A5 | MMA:BA:HEMA:F | 25:40:30:5 | 7070 | 1.49 | High MW |
| A6 | MMA:EA:HEMA:F | 25:40:30:5 | 6410 | 1.42 | Ethyle acrylate, high MW |
| A8 | MMA:BA:HEMA | 35:35:30 | 6626 | 1.46 | No F, high MW |
| A9 | MMA:BA:HEMA | 35:35:30 | 2491 | 1.48 | No F, low MW |
| A10 | MMA:BA:AA:HEMA:F | 30:25:10:30:5 | 3692 | 1.36 | Added acrylic acid, IPA solvent |
| A12 | MMA:BA:HEMA:F | 25:35:30:10 | 4066 | 1.51 | High F content, mid MW |
| A13 | MMA:BA:HEMA:F | 25:35:30:10 | 6596 | 1.61 | High F content, high MW |

TABLE 18

| | Description | | |
|---|---|---|---|
| Epoxy Resin | Equivalent Weight | Viscosity (cps @ 25° C.) | Other Information |
| D317* | 192-203 | 16,000-25,000 | bisphenol A-epichlorohydrin type; fast cure with polyamine curing agents |
| D332** | 172-176 | 4,000-6,000 | low-equivalent weight of D317, high-purity diglycidyl ether of bisphenol A |

| | |
|---|---|
| E1 | phosphate modified D317 + 2.5% TEOS oligomer |
| E2 | D332 + 2.5% TEOS oligomer |
| E3 | D317 reacted with Pamolyn 343 + 2.5% TEOS oligomer |
| E4 | D317 + 2.5% TEOS oligomer |
| E5 | TEOS-modified epoxy ester |

*Dow Liquid Epoxy Resin (DER) 317
**Dow Liquid Epoxy Resin (DER) 332

Based on the Harmonic Mean Method of Wu, the calculated interfacial tension between the two liquid phases (E2+Polyamide) and (A12+MF) in system (A12E2+MF+Polyamide) was 51.1 mJ/m², which was large enough to inhibit the second phase being fully dispersed in the first phase. When only MF resin was used as a crosslinking agent, interfacial surface tension was reduced to 29.84 mJ/m². That value was proven to be high enough for good phase separation. XPS spectra of the system A12E2+MF (discussed below) also supported the interfacial tension calculations. For the other three systems, A1E1, A5E3 and A9D332, interfacial tension was found to be less than 10 mJ/m².

The polymer layers were coated on a silicon wafer and on a steel substrate which have similar polarities and surface tensions. Both silicon wafer and steel may be called as polar substrates. However, a silicon wafer shows stronger polarity effects than a steel substrate. Therefore, contact angles measured on silicon wafer were always higher than those measured on steel substrate for each system, due to the fact that a more polar substrate (silicon wafer) enables the fluorinated acrylic system to better enrich the air interface. This results in high hydrophobicity, high contact angle, and low surface tension in the air-film interface. Since the results are in the same trend, measurements done on the steel substrate are not necessary to be shown here.

Not being bound by theory, it is postulated that the small amount of fluorinated monomer did not affect bulk properties of the polymer system. In the systems investigated here, when the curable mixture is coated on the substrate, the fluorinated acrylic selectively enriches the surface by diffusing through the liquid resin bulk. The fluorinated acrylic system is shown to segregate to the surface, which creates a hydrophobic surface. Despite the low bulk concentration of the fluorinated monomer, the material is hydrophobic. Also, the addition of crosslinking agents increases the hysteresis; the main reason is the presence of surface heterogeneity. This could be due to the surface roughness when coated on steel substrate and the morphological effects occurring during thermal curing process at the solid interface.

Results in Table 16 are also shown for samples prepared with PDMS grafted acrylic copolymer (A22), namely, A22E1, A22E2, and A22E5. All A22 systems had lower surface tensions (37.1, 39.5, and 38.8 mJ/m$^2$ respectively) as compared to the fluorinated systems. Among the fluorinated systems, A12E2+MF gave the lowest surface tension of 42.7 mJ/m$^2$. The highest surface tension was 65.2 mJ/m$^2$, which was observed on the film of non-fluorinated system A9D332.

Not being bound by theory, and in addition to the above, the self-stratifying system can also be defined as two polymers in an homogeneous mixture which upon application separate into a three phase system: (1) a top phase having a film-air interface rich in Polymer A; (2) a bottom phase having a film substrate interface rich in Polymer B; and (3) a third diffuse interfacial phase between the top phase and the bottom phase. For example, such a self-stratifying system can include two organic polymers mutually dissolved in an organic solvent(s) that when applied in a single coating process to a substrate, separate into a top coat that diffuses toward the film-air interface and the bottom coat or primer diffuses to the film-substrate interface.

In addition, it is appreciated that the self-stratification process can be driven by three factors: (1) chemical potential; (2) diffusion; and (3) phase miscibility. The chemical potential is the force that attracts the polymer to the interface, diffusion enables the polymers to be transported, and the polymer-polymer and polymer-solvent miscibility dictate the homogeneity of organic phase before application, and the gradient organization of the two polymers after application.

It is further appreciated that the self-stratification system can have or include more than one solvent. For example a relatively "fast" evaporating solvent can be used to dissolve both polymeric phases and which will then subsequently evaporate quickly after application of the system to a substrate, while another a slow or medium evaporating solvent that dissolves of only one of the two phases can be used in tandem to allow sufficient time for the bottom phase and the top phase to separate/self-stratify.

The bottom phase can be a substrate driven primer phase. For example, the bottom phase can include polar groups such as alkoxysilanes, a modified Bisphenol-A epoxide and/or phosphates that afford for desirable coating and/or attachment to polar substrates such as glass, metal, etc. Likewise, the top phase can be an air interface driven phase such as an acrylic modified with fluorinated acrylates and/or high solids thermoset acrylic oligomers for solvent borne coatings. It is appreciated that the amount of fluorinated acrylic monomers can dictate the chemical potential needed to attract "Polymer A" to the film-air interface and the molecular weight of the acrylic oligomer can dictate propensity of diffusion and gradient organization.

Control of the gradient between the phases can also be dependent on polymer-polymer miscibility. For example, a solvent that provides too much miscibility can result in no driving force for gradient organization while a solvent having too little miscibility can result in incomplete dissolution of the bottom phase and top phase polymers.

In this manner, the present invention can provide a self-stratification system that exhibits phase separation as a gradient over a macro length scale, for example on the order of 50 microns from top to bottom. In contrast, heretofore systems have used either film-air or film-substrate interface agents that provide nanoscale organization, i.e. nanometer layers of active materials at the interfaces.

b. Chemical Analysis

FIGS. 20 (A)-(E) provide ESEM-EDS generated atom mapping images for cross sections of the systems disclosed. The "dot maps" provide a visual image for the presence of a particular element in a certain region of the sample. As shown for the Si and F images, Si concentrated in the base or lower layer while F concentrated in the top or upper layer and the coating exhibited compositional gradient, i.e. the coating self-stratified. As such, the diffusion and/or segregation of Si to the base layer and F to the top layer was used as an indicator for whether or not a coating system successfully self-stratifies.

To further corroborate the stratification in the film, the mapping function in the Environmental Scanning Electron Microscope (ESEM) with an attached X-ray Energy Dispersive System (EDS) was used to investigate the distribution of the elements (fluorine and silicon) in a film cross-section. Four examples are shown in FIGS. 20(a)-(e) as representative of various levels of stratification obtained. The Carbon and oxygen mapping are used as controls and the fluorine and silicon atoms are used to depict the levels of stratification. The only source of fluorine is the acrylic topcoat, and the only source of silicon atom is the epoxide.

Figure 20A:
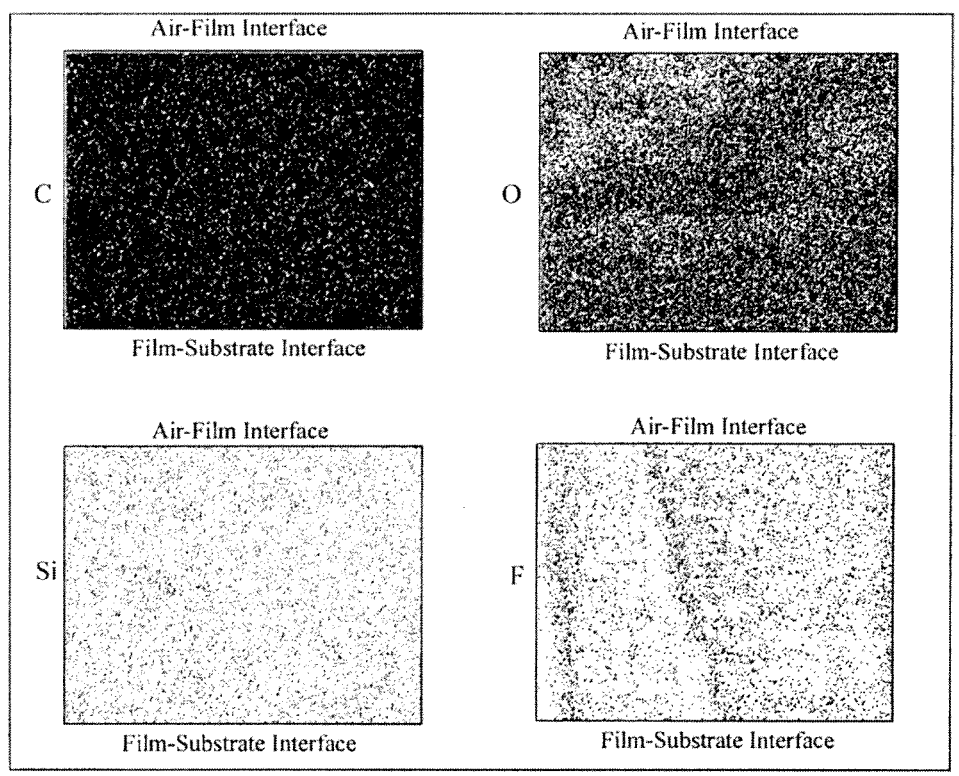
FIGS. 20(a)-(e) are ESEM-EDS providing atom mapping images of various samples as indicated.
Figure 20B:
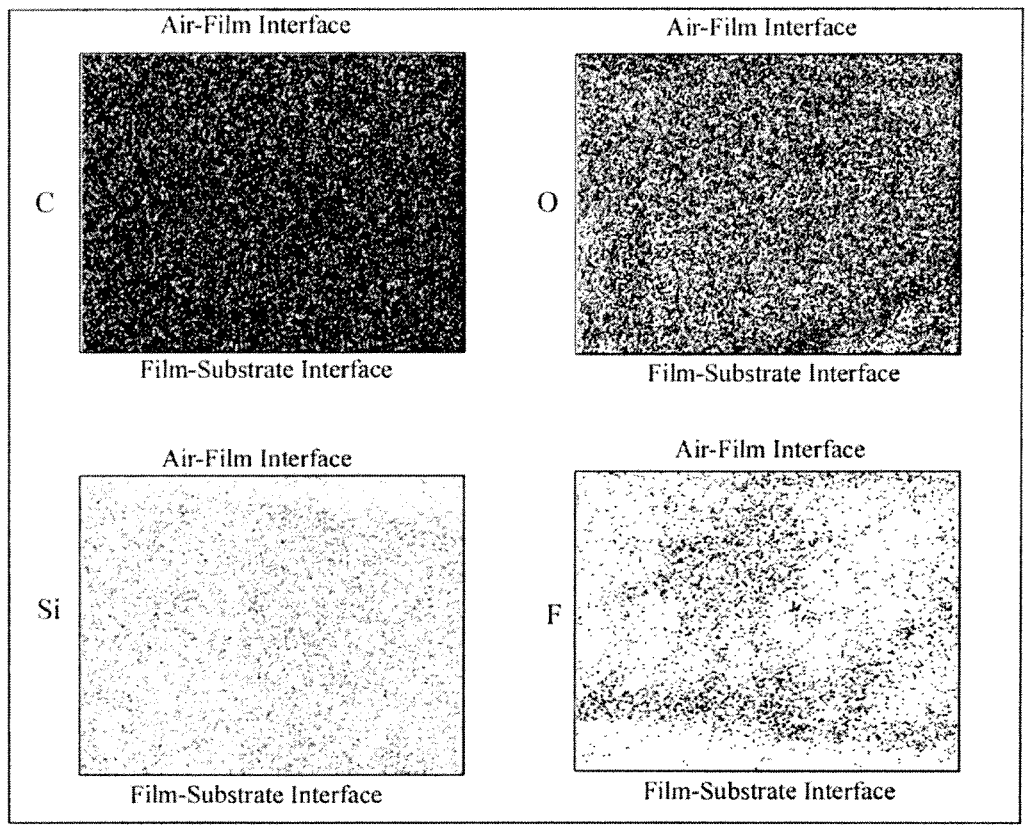

The atom mapping images for the epoxide ester (F5M-EE2.5) and epoxide phosphate ester (F5L-EP2.5) are shown in FIGS. 20A and 20B. The epoxide ester (FIG. 20A) showed no discernable stratification. This was consistent with the XPS data showing very little if any enhancement at the interfaces in comparison with the other binder systems. The next system is the phosphated epoxide (FIG. 20B) which showed more organization at the interfaces particularly the film substrate interface. This was also consistent with the XPS data.

Figure 20C:
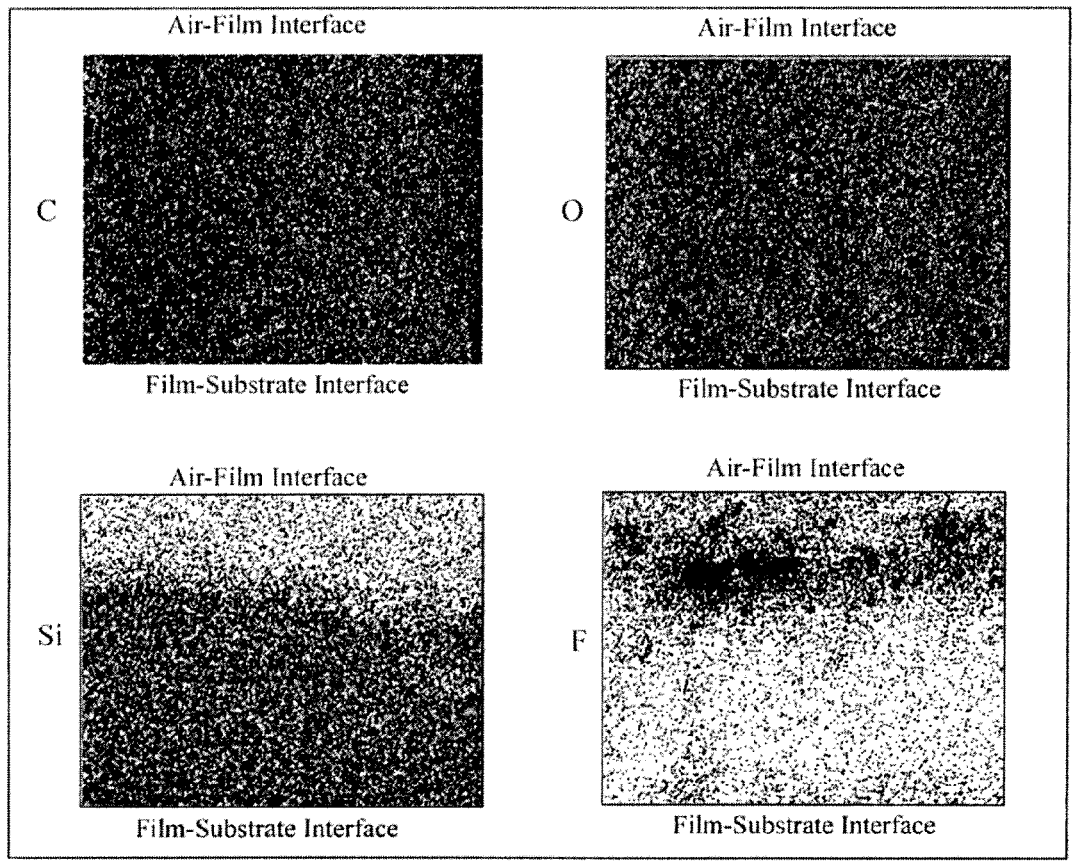
Figure 20D:
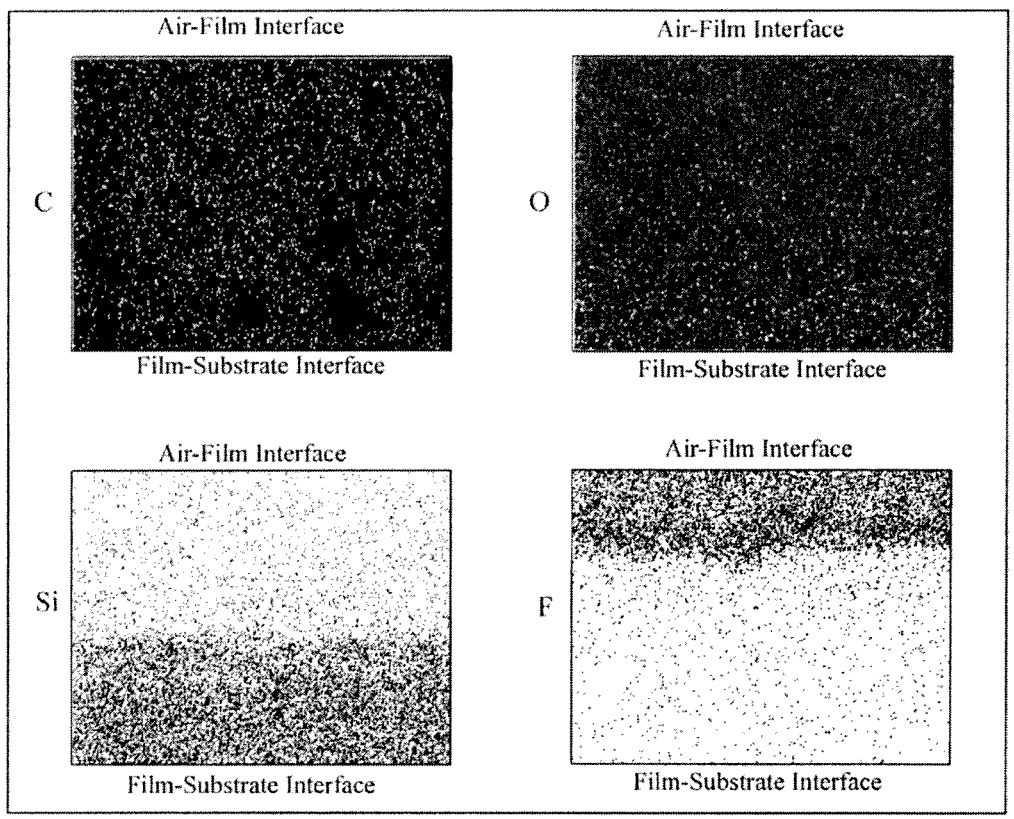
Figure 20E:
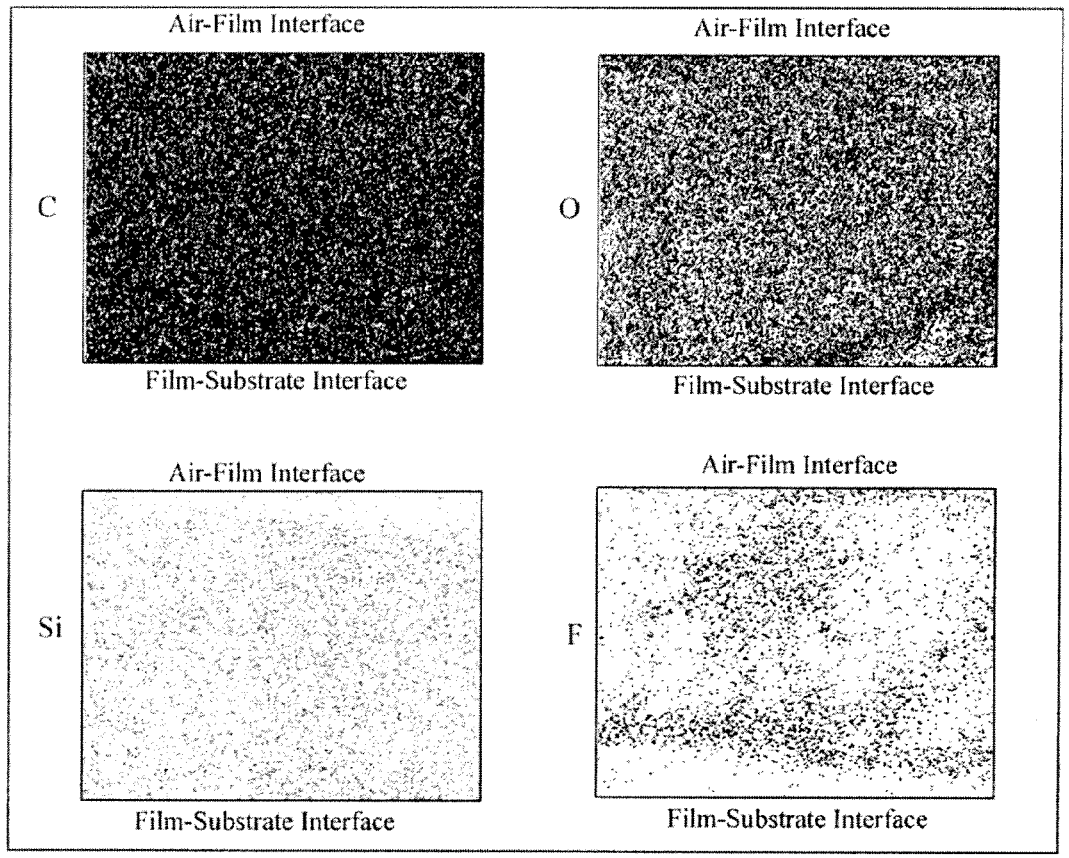

FIGS. 20C and 20D are both TEOS modified epoxide with either a dual amide M-F curing system or just a M-F crosslinker. A low molecular weight acrylic oligomer with 10 vol. % TFEMA (F10L) was used for both systems. Stratification is observed in the dual crosslinker system (FIG. 20C). Again the elemental cross-section observed was consistent with the XPS data. What is observed is a two phase system where the acrylic rich phase is emanating from the film-air interface downward and a silicon rich epoxide phase is emanating upward from the film-substrate interface. There are similarities, yet also important differences between the dual crosslinker system and the M-F crosslinked system (FIGS. 20C and 20D). There is a clear self-organization of the silicon from the film-substrate interface, and fluorine from the film-air interface for the M-F crosslinking system (FIG. 20D). Both have epoxide and acrylate rich phases emanating from the appropriate interface, however, the important difference is the M-F crosslinking system has a third phase of what can be described as a phase of equal concentration phases A and B between interface enhanced phases. This can be viewed as a very diffuse phase boundary.

In order to further investigate stratification of the phase systems listed in Table 16, x-ray photo-electron spectrometry (XPS) spectra were obtained for selected base layer/top layer combinations using a Perkin-Elmer PHI-5600 system in order to determine if Si and F diffused and/or segregated to the base layer and top layer, respectively. The XPS system included a conventional dual anode X-ray source (Mg and Al), a 50 cm hemispherical electron energy analyzer, a XYZT sample stage with eight sample storages, and an inert gas sputtering source (PHI-04-303) for sample cleaning and depth profiling.

Figure 19:
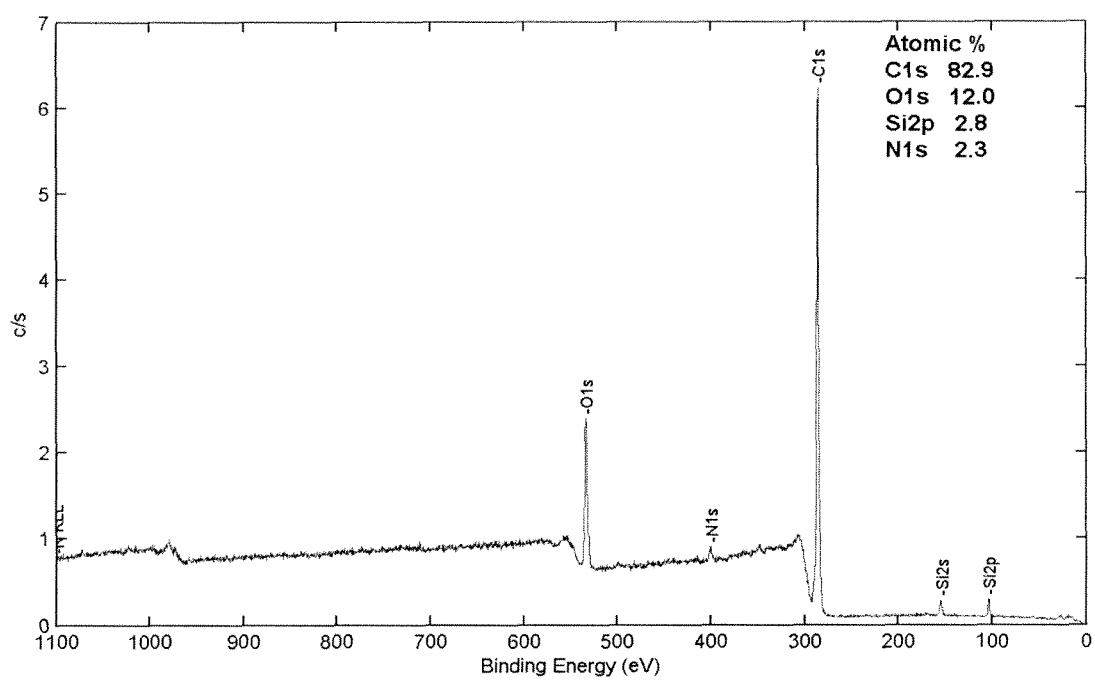
FIG. 19 is an XPS spectrum of a film-substrate interface of a self-stratified coating according to an embodiment of the present invention.

A representative XPS profile is shown in FIG. 19 with a summarization of XPS data as a function of various parameters shown in Tables 19-21 below. The samples were prepared by mixing appropriate amounts of acrylic, epoxy and crosslinker components, and unless noted otherwise, were drawn down onto a substrate and flashed for 20 hr at 25° C. (standard), followed by baking at 120° C. for 1 hr for all samples except those containing the E3 epoxy. All E3 epoxy containing samples were baked at 120° C. for 24 hr.

Table 19 provides data on the presence of Si and F at the film-air interface and the film-substrate interface as a function of top layer/E1 bottom layer mixture ratio. In particular, the A1:E1 and A5:E1 content ratio was change from 70:30 to 50:50. In addition, A1 and A5 acrylics were prepared with the non-phosphate containing E4 epoxy. As observed from comparing the A5E1 data with the A5E4 data, the non-phosphate containing samples exhibited better stratification than the phosphate containing samples.

TABLE 19

| Sample | F at film-air interface? | F at film-substrate interface? | Si at film-air interface? | Si at film-substrate interface? |
|---|---|---|---|---|
| A1E1 (70:30) | yes | no | no | yes |
| A5E1 (70:30) | trace | no | trace | yes |

TABLE 19-continued

| Sample | F at film-air interface? | F at film-substrate interface? | Si at film-air interface? | Si at film-substrate interface? |
|---|---|---|---|---|
| A1E1 (50:50) | yes | no | trace | yes |
| A5E1 (50:50) | trace | no | no | trace |
| A1E4 | yes | no | no | yes |
| A5E4 | trace | no | no | yes |

Table 20 provides data as a function of processing conditions. In particular, data on flash and/or bake conditions are shown, along with data on spraying of the acrylic/epoxy mixture onto a substrate instead of drawing down the material onto the substrate. Comparison of A1E1 and A12E2 with no flashing versus standards flashing suggests that no flashing of these two systems decreases stratification. In addition, a higher baking temperature resulted in decreased stratification for these two acrylic/epoxy mixtures (compare standard processing A1E1 and A12E2 to A1E1 and A12E2 baked at 160° C.). And finally, spraying of the A1E1 and A12E2 mixtures increased stratification (compare standard processing A1E1 and A12E2 to standard+spraying A1E1 and A12E2).

TABLE 20

| Sample | Processing Condition | F at film-air interface? | F at film-substrate interface? | Si at film-air interface? | Si at film-substrate interface? |
|---|---|---|---|---|---|
| A1E1 | No flash 120° C. bake | yes | yes | trace | yes |
| A12E2 | No flash 120° C. bake | yes | no | yes | yes |
| A12E3 | No flash 120° C. bake | — | — | — | — |
| A5E3 | No flash 120° C. bake | trace | no | yes | yes |
| A9D332 | No flash 120° C. bake | — | — | — | — |
| A1E1 | standard | yes | trace | trace | yes |
| A12E2 | standard | yes | no | trace | yes |
| A12E3 | standard | yes | no | trace | yes |
| A5E3 | standard | yes | yes | trace | yes |
| A9D332 | standard | no | no | no | no |
| A1E1 | 20 hr flash 160° C. bake | yes | yes | yes | yes |
| A12E2 | 20 hr flash 160° C. bake | yes | yes | yes | yes |
| A12E3 | 20 hr flash 160° C. bake | — | — | — | — |
| A5E3 | 20 hr flash 160° C. bake | yes | yes | yes | yes |
| A9D332 | 20 hr flash 160° C. bake | — | — | — | — |
| A1E1 | 1 hr/50° C. flash 120° C. bake | — | — | — | — |
| A12E2 | 1 hr/50° C. flash 120° C. bake | yes | yes | yes | trace |
| A12E3 | 1 hr/50° C. flash 120° C. bake | — | — | — | — |
| A5E3 | 1 hr/50° C. flash 120° C. bake | yes | yes | yes | yes |
| A9D332 | 1 hr/50° C. flash 120° C. bake | — | — | — | — |
| A1E1 | standard + spray | yes | no | trace | yes |
| A12E2 | standard + spray | yes | no | no | yes |
| A12E3 | standard + spray | — | — | — | — |
| A5E3 | standard + spray | — | — | — | — |
| A9D332 | standard + spray | — | — | — | — |

TABLE 21

| Sample-Solvent | F at film-air interface? | F at film-substrate interface? | Si at film-air interface? | Si at film-substrate interface? |
|---|---|---|---|---|
| A12E2-MEK | yes | no | trace | yes |
| A12E2-acetone | yes | — | no | — |
| A12E2-isopropanol | yes | — | no | — |
| A5E3-MEK | yes | yes | trace | yes |
| A5E3-acetone | trace | — | no | — |
| A5E3-isopropanol | trace | — | no | — |

Table 21 provides data on effect of stratification for the A12E2 and A5E3 mixtures when prepared using different solvents. As shown in this table, the use of different solvents can provide different stratification results.

In addition to the above, mixtures of the A12E2, A1E1, and A5E3 systems put into an oven for 16 hours at 60° C. were analyzed suing XPS. The XPS spectrum of A12E2 indicated a strong silicon signal (Si2p:2.8%) on the film-substrate interface and a strong fluorine signal (F1s:1.2%) on the air-film interface. However, both silicon and fluorine signals were found on the film-substrate and air-film interface for the other two systems A1E1 and A5E3. As such, only the A12E2 mixture showed good stratification during such an aging condition.

Samples of A12E2, A1E1 and A5E3, aged for six months at room temperature had XPS silicon signals of Si2p: 1.0% for A12E2, 0.5% for A1E1, and 0.8% for A5E3 at the film-substrate interface and fluorine signal of F1 s: 1.5% for A12E2, 0.6% for A1E1, and 0.1% for A5E3 at the film-air interface. From the XPS data, it was found that A12E2 still had better stratification than A1E1 and A5E3 systems. The intensity of fluorine was higher at the air-film interface for the A12E2 after 6 months aging.

c. Film Properties

Six more commonly employed testing techniques based on ASTM standards were used for predicting properties of coating formulations according to embodiments of the present invention. These techniques were: pencil hardness (ASTM D3363); cross-hatch adhesion (ASTM D3359); pull-off adhesion (ASTM D4541); impact resistance (ASTM D2794); mandrel bending test (ASTM D4060); and MEK resistance (ASTM D4752). In addition, the viscoelastic properties were measured on a dynamical mechanical analyzer (Perkin Elmer Instruments, Pyris Diamond DMA) with a frequency of 1 Hz in tensile mode, a heating rate of 3° C./min over a range of 20 to 150° C., a sampling interval of 0.05 seconds and a $N_2$ gas flow rate resulting from a gauge pressure of 40 psi circulated in the DMA furnace during the measurements. A gap distance was set at 2 mm for rectangular test specimens (length 10 mm, width 10 mm and thickness 0.08-0.10 mm). The maximum of the tan delta was used to determine the glass transition temperature, while the crosslink density was determined by utilizing the minimum storage modulus in the rubbery plateau.

Film properties of freshly prepared samples, samples aged at room temperature for 3 months and samples aged at room temperature for 6 months are shown in Table 22 below. As shown in the table, film properties generally improved with aging.

TABLE 22

| Sample | Aging T(° C.) | Aging Time | Pencil Hardness | Crosshatch Adhesion | Impact Resistance (lb/in) | Pull-Off Adhesion (lb/in²) | Conical Mandrel (elong'n) | MEK Double Rubs |
|---|---|---|---|---|---|---|---|---|
| A12E2 | — | fresh | 5H | 5B | >40 | 173 | >30% | 100 |
| A1E1 | — | fresh | 4H | 5B | >40 | 160 | >30% | 211 |
| A5E3 | — | fresh | 3H | 5B | 25 | 130 | >30% | 85 |
| A12E2 | 25 | 3 mon | 3H | 5B | >40 | 235 | >30% | 198 |
| A1E1 | 25 | 3 mon | 3H | 5B | 35 | 140 | >30% | 203 |
| A5E3 | 25 | 3 mon | 5H | 5B | 33 | 128 | >30% | >250 |
| A12E2 | 25 | 6 mon | 5H | 5B | >40 | 220 | >30% | >300 |
| A1E1 | 25 | 6 mon | 5H | 5B | >40 | 290 | >30% | >300 |
| A5E3 | 25 | 6 mon | 5H | 5B | >40 | 200 | >30% | >300 |

Film properties of A1E1, A12E2, and A5E3 formulations prepared with MF resin compared to A1E1 and A12E2 formulations prepared with MF and polyamide (PA) are shown in Table 23. The results indicate that use of the MF resin alone provides improved film properties than the use of a MF and PA.

TABLE 23

| Sample | Aging Time | Pencil Hardness | Crosshatch Adhesion | Impact Resistance (lb/in) | Pull-Off Adhesion (lb/in²) | Conical Mandrel (elong'n) | MEK Double Rubs |
|---|---|---|---|---|---|---|---|
| A12E2-MF | 6 mon | 5H | 5B | >40 | 220 | >30% | >300 |
| A1E1-MF | 6 mon | 5H | 5B | >40 | 290 | >30% | >300 |
| A5E3-MF | 6 mon | 5H | 5B | >40 | 200 | >30% | >300 |
| A12E2-MF | fresh | 5H | 5B | >40 | 200 | >30% | >300 |
| A12E2-MFPA | fresh | 5H | 5B | >40 | 173 | >30% | 100 |
| A1E1-MF | fresh | 5H | 5B | >40 | 170 | >30% | >300 |
| A1E1-MFPA | fresh | 4H | 5B | >40 | 160 | >30% | 211 |
| A5E3-MF | fresh | 3H | 5B | >25 | 130 | >30% | 85 |
| A5E3-MF-rerun | fresh | 4H | 5B | >30 | 120 | >30% | 97 |

The crosslink densities of A1E1, A12E2 and A5E3 systems freshly prepared and aged for 6 months were calculated as disclosed above with the results shown in Table 24. In addition, viscoelastic properties of these systems are provided in the table. For the freshly prepared samples, when the two crosslinking agents MF and PA were used in the preparation of the films, a higher crosslink density was observed. In addition, the A5E3 system exhibited two Tg values, thereby indicating macroscopic phase separation. It is postulated that fatty acids in the E3 resin increased the materials non-polarity and was repelled by the relatively polar A5 acrylic. Consequently, the A5 and E3 resins did not mix well.

The highest crosslink density was observed in the system A5E3-MF and is believed to be due to auto oxidation of fatty acids with the films being harder and stiffer. In addition, crosslink density increased for all the systems when the samples were aged for 6 months. It is appreciated that as the systems aged, free volume decreased, the polymer chains became stiffer, and densification increased. Also, polymer chains diffused better into the solvent while aging which increased the crosslink density.

TABLE 24

| Sample | Aging Time | Minimum Storage Modulus (N/m² × 10⁶) | Crosslink Density (mol/m³) | $T_g$ (° C.) |
|---|---|---|---|---|
| A12E2-MF | 6 mon | 6.77 | 665.26 | 78.93 |
| A1E1-MF | 6 mon | 4.99 | 490.46 | 85.18 |
| A5E3-MF | 6 mon | 21 | 1899.80 | 56.31 & 155.20 |
| A12E2-MF | fresh | 2.82 | 273.46 | 81.11 |
| A12E2-MFPA | fresh | 3.52 | 371.01 | 66.20 |
| A1E1-MF | fresh | 1.99 | 200.85 | 62.40 |
| A1E1-MFPA | fresh | 2.63 | 282.63 | 67.54 |
| A5E3-MF | fresh | 11.39 | 1000.5 | 62.17 & 154.31 |

Crosslink densities and viscoelastic properties as a function of solvent for the A12E2 system prepared with MF and PA crosslinking agents are shown in Table 25. The use of isopropanol as a solvent resulted in the highest crosslink density and $T_g$ when compared with MEK and acetone. The polarity of isopropanol is higher than that of acetone and MEK and isopropanol may have a better plasticizing effect on the system with an increase in chain diffusion providing greater film uniformity.

TABLE 25

| Sample | Solvent | Minimum Storage Modulus (N/m² × 10⁶) | Crosslink Density (mol/m³) | $T_g$ (° C.) |
|---|---|---|---|---|
| A12E2-MFPA | MEK | 3.52 | 371.01 | 66.20 |
| A12E2-MFPA | Acetone | 6.42 | 672.59 | 82.55 |
| A12E2-MFPA | Isopropanol | 7.63 | 785.43 | 83.43 |

It is appreciated that polymer film drying by solvent evaporation, and possibly crosslinking, must occur in order for the multicomponent coating to be self-stratified and used in one step application. Solvent loss can affect the rate of crosslinking reaction (curing) and/or the phase behavior of the system, which in turn can lead to the success or failure of self stratification. Stated differently, the solvent can affect passage from a reactivity controlled regime to a segmental diffusion controlled regime.

It is further appreciate that solvent evaporation through a film can occur in two distinct phases. The early stages of film formation by solvent evaporation occur in the first phase, which is controlled by surface boundary resistance to solvent loss. In this phase, the surface is still wet with solvent; and heat of solvent evaporation, solvent vapor pressure, solvent diffusion coefficient in air, and the air velocity are all important aspects of the drying process, whereas at later stages these factors are not as important. Latter stages are presumed to occur in the second phase where internal diffusion resistance controls the solvent transport. During the evaporation process of the second phase, the change in solvent diffusion coefficient in polymeric medium is extremely important, since the diffusion coefficient of solvent is very dependent on the concentration of the solvent. As the solvent evaporates, the concentration of the solvent in the film will decrease, thus the solvent-in polymer diffusion coefficient will change. It should be noted that solvent diffusion within the film is the evaporation rate controlling process in the second phase.

The term "solvent entrapment" or "solvent retention" is inherently associated with the solvent evaporation rate during the second phase. When the solvent does not diffuse rapidly through the polymer because of a low diffusion coefficient, the solvent may be locked or remain in the film for extended time periods (e.g. years). Solvent retention in significant quantities for normal film thicknesses can affect the stratification drastically, since the solvent keeps two incompatible complex polymers in a thermodynamically stable monophase system. In addition, solvent retention can be a serious problem affecting the quality and durability of coating films.

d. Self-Diffusion

Diffusion within a self-stratifying coating can be an important factor that affects film properties. In macromolecular systems, diffusion coefficients are typically strongly dependent on temperature and concentration, and have values that can range from $10^{-5}$ to $10^{-15}$ cm²/s. Diffusion within a multicomponent system can be extremely difficult to measure and/or calculate. As such, self-diffusion of one component in a mixture with uniform chemical concentration is often used to provide insight into the diffusion behavior of such systems. Experimental determination of self-diffusion coefficients are typically carried out using: radiation absorption[118, 119]; light-scattering techniques[120-122]; radioactive tracer methods[123]; and nuclear magnetic resonance techniques [124-126]. Among them, the last two methods are the most appropriate for measuring diffusion coefficients in the polymeric systems.

Pulsed gradient spin echo nuclear magnetic resonance (PGSE-NMR) spectroscopy monitors translational motions of magnetic spins and has a number of advantages over other methods. It has been used by several researchers to observe the solvent diffusion behavior in solvent/polymer systems. For example, Von Meerwall and coworkers investigated the influence of several parameters on the polymer and solvent diffusion coefficients for a variety of systems[127-130].

In PGSE, the sample is placed in a magnetic field gradient as opposed to a homogeneous magnetic field in normal NMR experiments. The fundamental equation of NMR is:

$$\omega = -\gamma H \qquad (18)$$

where H is the strength of the applied magnetic field; γ is the magnetogyric ratio (a constant for a given nucleus); and w is the precessional frequency of the nucleus being observed. The use of this technique for measuring solvent diffusion coefficients has been well reviewed [131]. By applying a magnetic field gradient, nuclei at different positions in the sample will have different precessional frequencies. When the proper radio frequency pulses are applied to the sample, an echo signal can be detected. The magnetic field gradient can be returned to a homogeneous field at varying times before the echo is received. Diffusion of the species being irradiated after the gradient is turned off results in attenuation of the intensity of the echo from that of a normal signal. By varying the time during which the field gradient is applied, and observing the change in attenuation of the echo, the self-diffusion coefficient of the observed species may be determined.

The attenuation of the spin echo height is a function of magnetic field gradients. The height of the gradient is expressed as an exponential function of the height of the spin echo:

$$\frac{A(2\tau, G, G_0)}{A(2\tau, G=0, G_0)} = \exp(-\gamma^2 D_S X) \quad (19)$$

where $$X = \delta^2 G^2(\tau - \delta/3) - \delta G G_0[(t_1^2 + t_2^2) + \delta(t_1 + t_2) + 2\delta^2/3 - 2\tau^2] \quad (20)$$

and $A(2\tau, G, G_0)$ is the height of the spin echo at time, $2\tau$ when both the constant field gradient of magnitude, $G_0$, and the pulsed field gradient of magnitude, G, are applied. In addition, $A(2\tau, G=0, G_0)$ is the height of the spin echo at time, $2\tau$, when only a constant field gradient of magnitude, $G_0$, is applied. The term $\delta$ is the duration of the magnetic field gradient pulse; $\gamma$, the gyromagnetic ratio; $\tau$, the time separation between field gradient pulses; and $t_1$, the time delay between the radio frequency and the field gradient pulses, $t_2 = \tau - \delta - t_1$.

Figure 21:
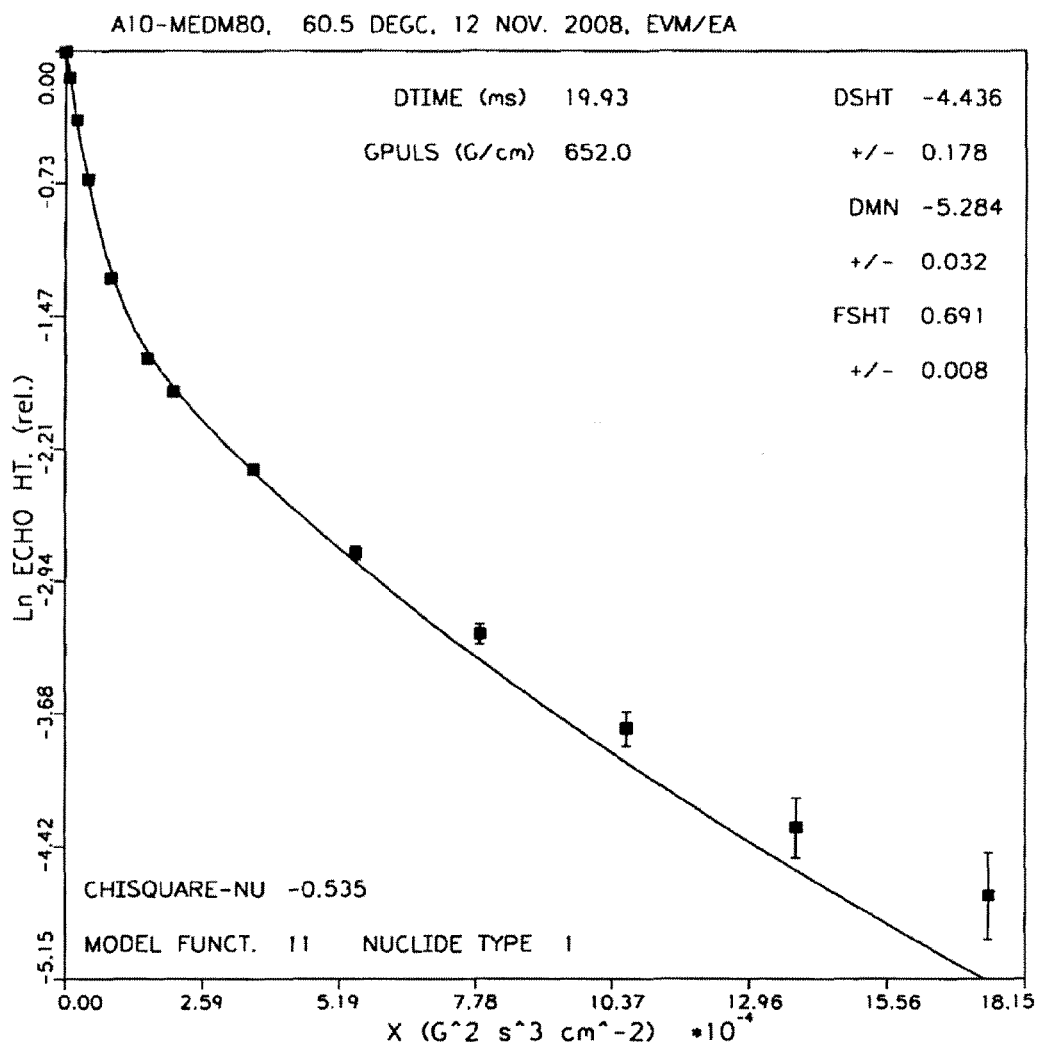
FIG. 21 is a plot illustrating diffusional spin-echo attenuation in a methyl ethyl ketone (MEK)-Acrylic Copolymer (A10-HIM) system including 40 wt. % MEK at 60.5° C. in which the ordinate represents logarithm of spin-echo amplitude; the abscissa denotes the gradient parameter; and the curved line denotes a fitted two-component polydispersity model.

Based on Equations 19 and 20, the self-diffusion coefficients were determined by plotting the logarithm of the attenuated echo height, $$\log\left[\frac{A(2\tau, G, G_0)}{A(2\tau, G=0, G_0)}\right],$$

versus, the term, X, of Equation (20). An example of such a plot for diffusional spin-echo attenuation in a methyl ethyl ketone (MEK)-Acrylic Copolymer (A10-HIM) is shown in FIG. 21. The ordinate represents logarithm of spin-echo amplitude and the abscissa denotes the gradient parameter. In addition, the results are for a methyl ethyl ketone (MEK)-Acrylic Copolymer (A10-HIM) system containing 40 wt. % MEK at 60.5° C. with the curved line representing a fit from a two-component polydispersity model.

The plots are not always linear and can be the result of a number of factors such as polydispersity, restricted diffusion, and the presence of other diffusing species[132]. In order to obtain diffusion coefficients, the analysis of the data from experiments were performed by using different diffusion models to fit and analyze the pulsed-gradient spin echo data [126].

i. Diffusion Measurements

The PGSE-NMR equipment included a stable current-regulated, high-impedance, iron-core magnet and 33 MHz modified Spin-Lock CPS-2 spectrometer. The spectrometer was adjusted to produce a principal spin-echo after 90°-τ-180° pulse sequence. Measurements of proton spin-echo amplitude were performed at temperatures of 45.5° C., 60.5° C. and 90.5° C. Temperature was controlled within 0.2° C. by supplying a constant-speed regulated hot-air stream to the NMR probe. About 300 mg of material was placed at the flat bottom of NMR sample tubes having a 7 mm outer diameter. The NMR sample tubes containing a fixed amount of solvent and polymer were sealed with teflon tape to prevent solvent from evaporation and the solvent concentration was varied from 0 to 80 wt %. As expected on the basis of the known chemical compatibility of the solvent and polymers, no evidence of phase separation was detected in the systems. The optimum height of the sample stack was about 8 mm.

The PGSE-NR experiments were conducted at fixed $G_0$ and G and at varying $\delta$. The time separation between gradient pulses, $\tau$, varied for each sample, and every time it was less than 20 ms. For different samples, the steady field gradient, $G_0$ varied between 0.70 G/cm and 0.80 G/cm for echo stability and pulsed field gradient, G was 602, 652, or 680 G/cm, depending on the concentration of the system and the duration of the gradient pulse. The duration ($\delta$) of the gradient pulses was varied in 11 to 19 increments from zero until the echo was attenuated to below 2% of its original value.

Medium molecular weight (MEDM) and high molecular weight (HIM) acrylics were studied. The previous identifiers of the A12 and A13 systems were changed to A10-MEDM for A12, and A10-HIM for A13. A10 was the acrylic copolymer having 10% fluorinated monomer (TFEMA) synthesized by free radical solution polymerization. In addition, and as discussed above, Gel Permeation Chromatography (GPC) analysis was used to measure the molecular weight and molecular weight distribution of the two acrylic systems with the number average molecular weight ($M_n$) of A10-HIM being 6325. The weight average molecular weight ($M_w$) of the A10-HIM copolymer was 11961.

Regarding A10-HIM, the number average molecular weight ($M_n$) was determined to be 2596 and the weight average molecular weight ($M_w$) was 4229. Both $M_n$ and $M_w$ are important for the two-component polydispersity model in the diffusion coefficient measurements.

For A10-HIM, diffusion coefficients were determined at 40, 60 and 80 wt % MEK solvent. At lower solvent concentrations, diffusional spin-echo attenuation signals were not detectable.

Figure 22:
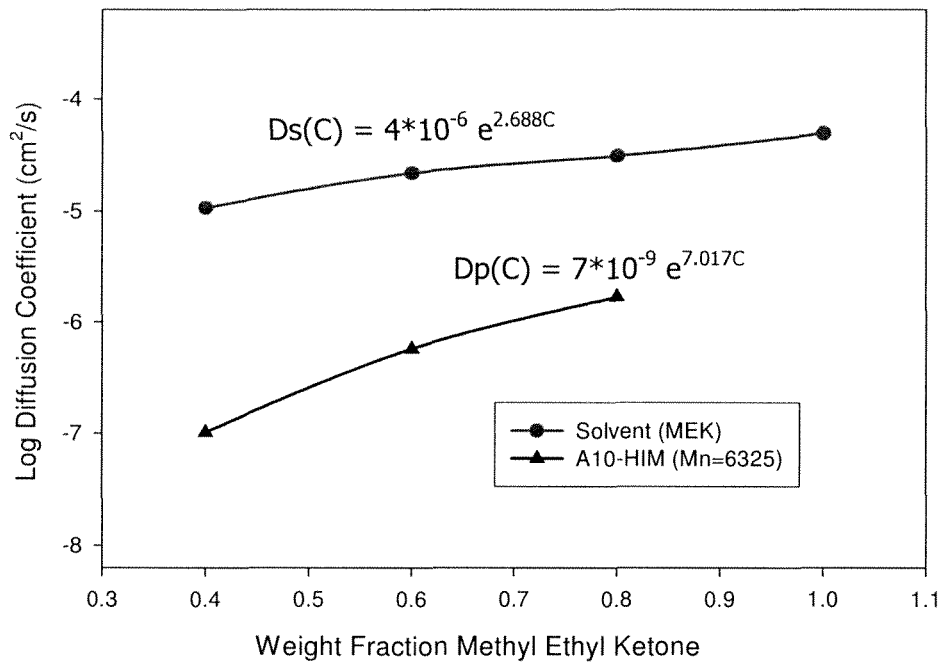
FIG. 22 is a plot of self-diffusion coefficients as a function of solvent concentration for MEK solvent and A10-HIM copolymer at 60.5° C.

Referring now to FIG. 22, a plot of MEK solvent and A10-HIM self-diffusion coefficients at 60.5° C. is shown with the diffusion coefficient increasing with increasing solvent content. Exponential variation of the diffusion coefficients with the solvent concentration was found for both the MEK solvent and the A10-HIM copolymer with equations for each shown on the plot with C being the weight fraction of the solvent. It is appreciated that only 3 data points (40, 60 and 80 wt. %) were used for the correlation between diffusion coefficient and solvent concentration. In addition, FIG. 23 provides a similar for A10-MEDM and MEK solvent at 60.5° C. and MEK concentrations of 20, 40, 60 and 80 wt. %.

Figure 23:
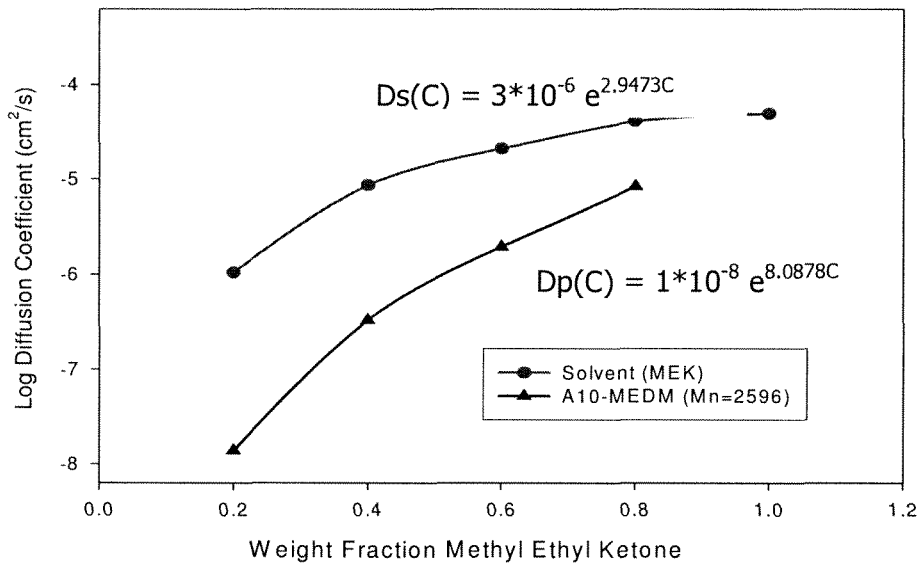
FIG. 23 is a plot of self-diffusion coefficients as a function of solvent concentration for MEK solvent and A10-MEDM copolymer at 60.5° C.
Figure 24:
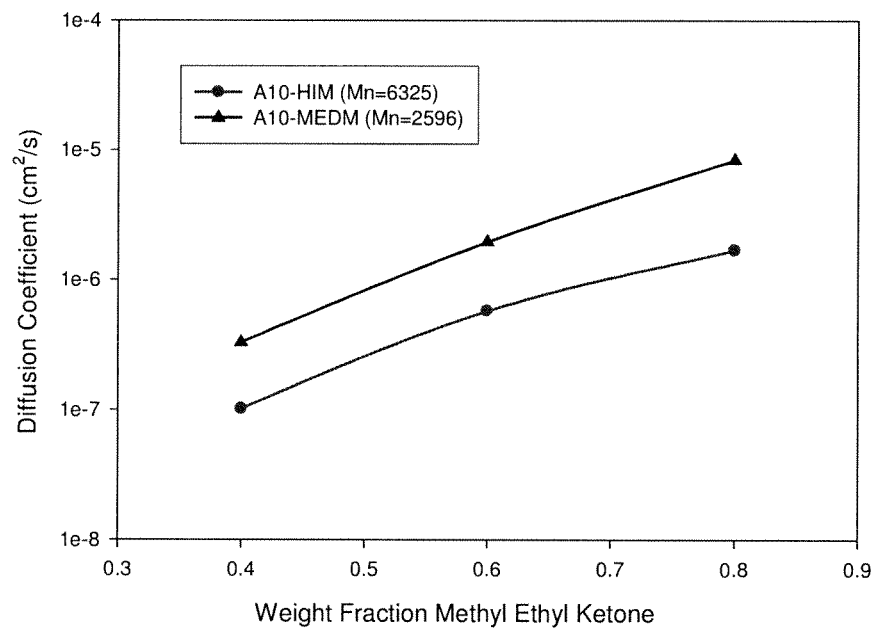
FIG. 24 is a plot of self-diffusion coefficients as a function of MEK solvent concentration for A10-HIM and A10-MEDM copolymers at 60.5° C.
Figure 25:
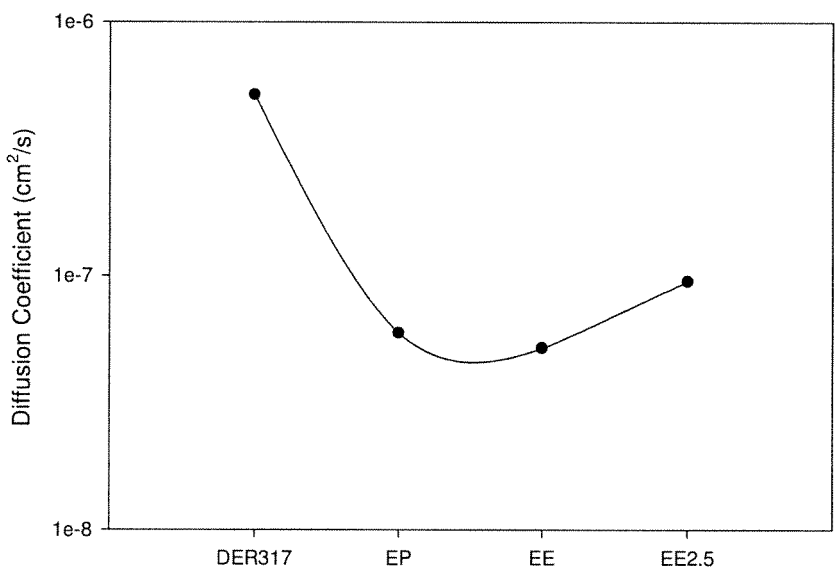
FIG. 25 is a plot of self-diffusion coefficients for epoxy derivatives DER317, BPA based epoxy phosphate (EP), BPA based epoxy ester (EE) and TEOS modified BPA based epoxy ester (EE2.5) at 90.5° C.

Comparison of the results for A10MEDm and A10-HIM in FIGS. 22 and 23 is shown in FIG. 24 which illustrates that the medium molecular weight copolymer diffuses faster in binary solvent-polymer systems than its high molecular weight counterpart. In addition, the A10-MEDM copolymer exhibit the fastest self-diffusion coefficient (Log D=−5.0770 at 80 wt % solvent) while the lowest self-diffusion coefficient was exhibited by A10-HIM (Log D=−6.9920 at 40 wt. % solvent). It is appreciated that the results are in good agreement with existing literature.

Regarding diffusion within the epoxy resins, FIG. 22 illustrates a plot for self-diffusion within DER317, BPA based epoxy phosphate (EP), BPA based epoxy ester (EE) and TEOS modified EE (EE2.5). Based on the plot, the TEOS addition to the epoxy ester increased the self diffusion within the resin with the diffusion coefficient increasing from 5.188×$10^{-8}$ cm$^2$/sec to 9.506×$10^{-8}$ cm$^2$/sec.

In view of the teaching presented herein, it is to be understood that numerous modifications and variations of the present invention will be readily apparent to those of skill in the art. For example, while the invention has primarily been described with reference to bisphenol-A (BPA) based liquid epoxide resin and tetraethylorthosilicate, other epoxide resins and alkoxysilane oligomers may likewise be used in combination to provide modified epoxy derivatives with substantial improvement over epoxide resins. In addition, while the invention has primarily been described with reference to methyl methacrylate, n-butyl acrylate, 2-hydroxyethyl methacrylate, and 2,2,2-trifluoroethyl methacrylate, other acrylic copolymers containing fluoroalkyl containing monomers are included within the scope of the present invention. As such, the foregoing is illustrative of specific embodiments of the invention but is not meant to be a limitation upon the practice thereof. It is the following claims, including all equivalents, which define the scope of the invention.

REFERENCES

[1] Novak, B. M., Advanced Materials 1993; 5(6):422.
[2] Wen, J.; Jordens, K.; Wilkes, G. L., Materials Research Society Symposium Proceedings 1996; 435:207.
[3] Alexandre, M.; Dubois, P., Materials Science and Engineering 2000; 28:1.
[4] Matejka, L.; Dukh, O.; Kolarik, J., Polymer 2000; 41:1449.
[5] Matsuura, Y.; Matsukawa, K.; Kawabata, R.; Higashi, N.; Niwa, M.; Inoue, H., Polymer 2002; 43:1549.
[6] Wirnsberger, G.; Scott, B. J.; Chmelka, B. F.; Stucky, G. D., Advanced Materials 2000; 12:1450.
[7] Yano, K.; Usuki, A.; Okada, A., Journal of Polymer Science 1997; 35:2289.
[8] Mark, J. E.; Jiang, C.; Tang, M. Y., Macromolecules 1984; 17:2613.
[9] Landry, C. J. T.; Coltrain, B. K.; Brady, B. K., Polymer 1992; 33:1486.
[10] Mark, J. E., Polymer Engineering and Science 1996; 36:2905.
[11] Gigant, K.; Posset, U.; Schottner, G., Applied Spectroscopy 2002; 56:762.
[12] Klukowska, A.; Posset, U.; Schottner, G.; Wis, M. L.; Salemi-Delvaux, C.; Malatesta, V., Materials Science 2001; 20:95.
[13] MacKenzie, J. D.; Bescher, E. P., Journal of Sol-Gel Science and Technology 1998; 13:371.
[14] Spanhel, L.; Popall, M.; Muller, G., Proceedings of the Indian Academy of Sciences: Chemical Sciences 1995; 107:637.
[15] Wicks, Z. W., Jr.; Jones, F. N.; Pappas, S. P., Organic Coatings Science and Technology, $2^{nd}$ ed. NY: John Wiley & Sons, 1999.
[16] Paul, S., Surface Coatings Science and Technology, $2^{nd}$ ed. NY: John Wiley & Sons, 1996.
[17] Lambourne, R., Ed., Paint and Surface Coatings Theory and Practice. NY: John Wiley & Sons, 1987.
[18] Soucek, M. D., Inorganic/Organic Hybrid Coatings. In: Kickelbick, G., editor. Hybrid Materials. Weinheim, German: Wiley-VCH Verlag GmbH & Co. KGaA, 2007.
[19] Judeinstein, P.; Sanchez, C. J., Materials Chemistry 1996; 6:511.
[20] Huang, H. H.; Wilkes, G. L.; Carlson, J. G., Polymer 1989; 30:2001.
[21] Wilkes, G. L.; Orler, B.; Huang, H. H., Polymer Preprints (American Chemical Society, Division of Polymer Chemistry) 1985; 26(2):300.
[22] Ahmad, Z.; Sarwar, M. I.; Mark, J. E., Journal of Materials Chemistry 1997; 7(2):259.
[23] Girard-Reydet, E.; Lam, T. M.; Pascault, J. P., Macromolecular Chemistry and Physics 1994; 195(1):149.
[24] Child, T. F.; Van Ooij, W. J., Transactions of the Institute of Metal Finishing 1999; 77(2):64.
[25] Massingill, J. L., Journal of Coatings Technology 1991; 63(797):47.
[26] Sabata, A.; Van Ooij, W. J.; Koch, R. J., Journal of Adhesion Science and Technology 1993; 7(11):1153.
[27] Witucki, G. L., Journal of Coatings Technology 1993; 65(822):57.
[28] Holmes-Farley, S. R.; Yanyo, L. C., Journal of Adhesion Science and Technology 1991; 5(2):131.
[29] Ni, H.; Simonsick, W. J.; Skaja, A. D.; Williams, J. P.; Soucek, M. D., Progress in Organic Coatings 2000; 38(2): 97.
[30] Ni, H.; Skaja, A. D.; Soucek, M. D., Progress in Organic Coatings 2000; 40(1-4):175.
[31] Ni, H.; Skaja, A. D.; Sailer, R. A.; Soucek, M. D., Macromolecular Chemistry and Physics 2000; 201(6):722.
[32] Ni, H.; Skaja, A. D.; Sailer, R. A.; Soucek, M. D., Polymeric Preprints (American Chemical Society, Division of Polymer Chemistry) 1998; 39(1):367.
[33] Ni, H.; Skaja, A. D.; Sailer, R. A.; Soucek, M. D., Polymeric Materials Science and Engineering 1998; 79:21.
[34] Tuman, S. J.; Soucek, M. D., Journal of Coatings Technology 1996; 68:73.
[35] Tuman, S. J.; Chamberlain, D.; Scholsky, K. M.; Soucek, M. D., Progress in Organic Coatings 1996; 28:251.
[36] Lan, T.; Pinnavaia, T. J., Materials Research Society Symposium Proceedings 1996; 435:79.
[37] Messersmith, P. B.; Giannelis, E. P., Chemistry Materials 1994; 6:1719.
[38] Wang, M. S.; Pinnavaia, T. J., Chemistry Materials 1994; 6:468.
[39] Landry, M. R.; Coltrain, B. K.; Landry, C. J. T.; O'Reilly, J. M., Journal of Polymer Science, Part B: Polymer Physics 1995; 33(4):637.
[40] Hussain, M.; Nishijima, S.; Nakahira, A.; Okada, T.; Niihara, K., Materials Research Society Symposium Proceedings 1996; 435:369.
[41] Bauer, B. J.; Liu, D.-W.; Jackson, C. L.; Barnes, J. D., Polymers for Advanced Technologies 1996; 7(4):333.
[42] Matejka, L.; Dusek, K.; Plestil, J.; Kriz, J.; Lednicky, F., Polymer 1999; 40(1): 7.
[43] Matejka, L.; Plestil, J.; Dusek, K., Journal of Non-Crystalline Solids 1998; 226(1,2):114.
[44] Ellis, B., Introduction to the Chemistry, Synthesis, Manufacture, and Characterization of Epoxy Resins In: Ellis, B., editor. Chemistry and Technology of Epoxy Resins. London, UK: Blackie Academic & Professional, an imprint of Chapman & Hall, 1993.
[45] DeSimone, J. M.; Guan, Z.; Elsberndt, C. S., Science 257 (1992), p. 945.
[46] Pittman, A. G., Surface Properties of Fluorocarbon Polymers, in: L.A. Wall (Ed.), Fluoropolymers, Wiley, NY, 1972.
[47] Feiring, A. E.; Wonchoba, E. R., Macromolecules 31 (1998), p. 7103.
[48] Antonietti, M.; Oestreich, S., Novel Fluorinated Block Copolymers, in: Hougham, G. G.; Cassidy, P. E.; Johns, K.; Davidson T. (Eds.), Fluoropolymers 1 Synthesis Kluwer Academic/Plenum Publishers, NY, 1999.
[49] Shafrin, E. G.; Zisman, W. A., Journal of Physical Chemistry 64 (1960), p. 519.
[50] Scheirs, J., Fluoropolymers: Technology, Markets and Trends, Rapra Technology Ltd., Shawbury, U.K., 2001.

[51] Kostov, G.; Rousseau, A.; Boutevin, B.; Pascal, T., Journal of Fluorine Chemistry 126 (2005), p. 231.
[52] Van Duijnhoven, F.; Bastiaansen, C., Advanced Materials 11 (1999), p. 567.
[53] Pittman, C. U. J.; Chen, C. Y.; Ueda, M., Journal of Polymer Science, Part A: Polymer Chemistry 18 (1980), p. 3413.
[54] Casazza, E.; Piacenti, F.; Russo, S., European Patent, 1 378 526 A1, 2004.
[55] Malshe, V. C.; Sangaj, N. S., Progress in Organic Coatings 53 (3) (2005), p. 207.
[56] Mazzola, M.; Frediani, P.; Bracci, S.; Salvini, A., European Polymer Journal 39 (2003), p. 1995.
[57] Castner, D. G.; Grainger, D. W. (Eds.), Fluorinated Surfaces, Coatings, and Film American Chemical Society, Washington, D.C., 2001.
[58] Chen, Y.; Cheng, S.; Wang, Y.; Zhang, C., Journal of Applied Polymer Science 99 (2006), p. 107.
[59] Chen, Z.; Cui, X.; Jiang, W.; Cheng, X.; Wang, H., Journal of Applied Polymer Science 99 (2006), p. 558.
[60] Landfester, K.; Rothe, R.; Antonietti, M., Macromolecules 35 (2002), p. 1658.
[61] Linemann, R. F.; Malner, T. E.; Brandsch, R.; Bar, G.; Ritter, W.; Malhuapt, R., Macromolecules 32 (1999), p. 1715.
[62] Thomas, R. R.; Lloyd, K. G.; Stika, K. M.; Stephans, L. E.; Magallanes, G. S.; Dimonie, V. L.; Sudol, E. D.; El-Aasser, M. S., Macromolecules 33 (2000), p. 8828.
[63] Kostov, G.; Ameduri, B.; Boutevin, B., Journal of Fluorine Chemistry 114 (2002), p. 171.
[64] Saidi, S.; Guittard, F.; Guimon, C.; Geribaldi, S., Journal of Polymer Science, Polymer Chemistry 43 (2005), p. 3737.
[65] Zhang, Z. B.; Ying, S. K.; Shi, Z. Q., Polymer 40 (1999), p. 5439.
[66] Dargaville, T. R.; George, G. A.; Hill, D. J. T.; Whittaker, A. K., Progress in Polymer Science 28 (2003), p. 1355.
[67] Li, J.; Wang, Q.; Changhong, S.; Qingmin, C., European Polymer Journal 43 (2007), p. 2928.
[68] Choi, K. M.; Stansbury, J. W., Chemistry of Materials 8 (12) (1996), p. 2704.
[69] Kassis, C. M.; Steehler, J. K.; Betts, D. E.; Guan, Z.; Romack, T. J.; DeSimon, J. M.; Linton, R. W.; Macromolecules 29 (1996), p. 3247.
[70] Schmidt, D. L.; Coburn, C. E.; DeKoven, B. M.; Potter, G. E.; Meyers, G. F.; Fischer, G. A., Nature 368 (1994), p. 39.
[71] Wynne, K. J.; Makal, U.; Kurt, P.; Gamble, L., Langmuir 23 (2007), p. 10573.
[72] Kurt, P.; Wood, L.; Ohman, D. E.; Wynne, K. J., Langmuir 23 (2007), p. 4719.
[73] Finlay, J. A.; Krishnan, S.; Callow, M. E.; Callow, C. A.; Dong, R.; Asgill, N.; Wong, K.; Kramer, E. J.; Ober, C. K., Langmuir 24 (2008), p. 503.
[74] Delucchi, M.; Turri, S.; Barbucci, A.; Bassi, M.; Novelli, S.; Cerisola, G., Journal of Polymer Science, Part B: Polymer Physics 40 (2002), p. 52.
[75] Dilorenzo, M., Paint and Coatings Industry (November) (1994), p. 33.
[76] Gray, R. A., Journal of Coatings Technology 57 (728) (1985), p. 83.
[77] Hawker, C. J.; Elce, E.; Dao, J.; Volksen, W.; Russell, T. P.; Barclay, G. G., Macromolecules 29 (1996), p. 2686.
[78] Kamath, V. R.; Sargent, J. D. J., Journal of Coatings Technology 59 (746) (1987), p. 51.
[79] Myers, G. G., Journal of Coatings Technology 67 (841) (1995), p. 31.
[80] Spinelli, H. J., Organic Coatings and Applied Polymer Science Proceedings 47 (1982), p. 529.
[81] Hill, L. W.; Kozlowski, K., Journal of Coatings Technology 1987; 59(751):63.
[82] Bienstock, D.; Field, J. H., Corrosion 1961; 17:89.
[83] Aparicio, M.; Klein, L. C., Ceramic Transactions (Sol-Gel Commercialization and Applications) 2000; 123:73.
[84] Rao, K. J.; Baskaran, N.; Ramakrishnan, P. A.; Ravi, B. G.; Karthikeyan, A., Chemistry Materials 1998; 10:3109.
[85] Silverstein, R. M.; Bassler, G. C.; Morrill, T. C., Spectrometric Identification of Organic Compounds, 4$^{th}$ ed. NY: John Wiley & Sons, 1981.
[86] Nassor, E. J.; Nassor, E. C. D. O.; Avila, L. R.; Pereira, P. F. S.; Cestari, A.; Luz, L. M.; Ciuffi, K. J.; Calefi, P. S., Journal of Sol-Gel Science and Technology 2007; 43:21.
[87] Nielsen, L. E.; Landel, R. F., Mechanical Properties of Polymers and Composites. NY: Marcel Dekker, 1994.
[88] Pascault, J. P.; Sautereau, H.; Verdu, J.; Williams, R. J., Thermosetting Polymers. NY: Marcel Dekker, 2002.
[89] Buchheit, R. G.; Cunningham, M.; Jensen, H.; Kendig, M. W.; Martinez, M. A., Corrosion 1998; 54(1):61.
[90] Massingill, J. L., Jr.; Whiteside, R. C., Journal of Coatings Technology 1993; 65(827):65.
[91] Hill, L. W.; Kozlowski, K., Journal of Coatings Technology 59 (751) (1987), p. 63.
[92] O'Shannessy, D. J.; Ekberg, B.; Mosbach, K., Analytical Biochemistry 177 (1) (1989), p. 144.
[93] Kennedy, J. P.; Kelen, T.; Tüdös, F., Journal of Polymer Science A1 (1975), p. 2277.
[94] Melville, H. W.; Noble, B.; Watson, W. F., Journal of Polymer Science 4 (1949), p. 629.
[95] Silverstein, R. M.; Bassler, G. C.; T. C., Spectrometric Identification of Organic Compounds, John Wiley & Sons, NY, 1981.
[96] Lau, K. K. S.; Murthy, S. K.; Lewis, H. G. P.; Caulfield, J. A.; Gleason, K. K., Journal of Fluorine Chemistry 122 (2003), p. 93.
[97] Montaudo, G.; Montaudo, M. S., Polymer Characterization Methods, in: G. Montaudo, R. P. Lattimer (Eds.), Mass Spectrometry of Polymers, CRC Press, Boca Raton, Fla., 2002.
[98] Kinloch, A. J., Adhesion and Adhesives, Chapman and Hall, London, 1987.
[99] Johnson, R. E.; Dettre, R. H., Journal of Physical Chemistry 68 (1964), p. 1744.
[100] Good, Jr., R., Journal of Adhesion Science and Technology 6 (1992), p. 1269.
[101] Hiyama, T., General Introduction, in: H. Yamamoto, K. Kanie, T. Kusumoto, Y. Morizawa, M. Shimizu (Eds.), Organofluorine Compounds Chemistry and Applications, Springer-Verlag, NY, 2000.
[102] Bauer, D. R.; Dickie, R. A., Journal of Polymer Science, Part B: Polymer Physics 18 (1980), p. 2015.
[103] Pedraza, E. P.; Soucek, M. D., Polymer 46 (2005), p. 11174.
[104] Gibbs, J. H.; DiMarzio, E. A.; The Journal of Chemical Physics 28 (5) (1958), p. 373.
[106] DiMarzio, E. A.; Gibbs, J. H., The Journal of Chemical Physics 28 (5) (1958), p. 807.
[106] DiMarzio, E. A.; Gibbs, J. H., Journal of Polymer Science, Part A: Polymer Chemistry 40 (136) (1959), p. 121.
[107] Hill, L. W., Dynamic Mechanical and Tensile Properties, in: J. V. Koleske Ed.), Paint and Coating Testing Manual: ASTM, Philadelphia, Pa., 1995.
[108] Hill, L. W., Progress in Organic Coatings 31 (1997), p. 174.

[109] Sailer, R. A.; Soucek, M. D., Journal of Applied Polymer Science 73 (1999), p. 2017.
[110] Pascault, J. P.; Sautereau, H.; Verdu, J.; Williams, R. J., Thermosetting Polymers, Marcel Dekker, NY, 2002.
[111] Liu, W.; Tang, K.; Guo, Y.; Koike, Y.; Okamoto, Y., Journal of Fluorine Chemistry 123 (2003), p. 147.
[112] Hill, L. W.; Wicks, Z. W. J., Progress in Organic Coatings 10 (1982), p. 55.
[113] Kim, K. U.; Park, T. S.; Hwang, S. S.; Lee, J. C.; Lee, M. S.; Cheong, S. M., U.S. Pat. No. 5,424,468, 1995.
[114] Salamone, J. C., Ed., Polymeric Materials Encyclopedia, CRC Press, Inc., Boca Raton, Fla., 1996.
[115] Morris, M., List of Hazardous Air Pollutants, Petition Process, Lesser Quantity Designations, Source Category List, Federal Register, Environmental Protection Agency (EPA), Research Triangle Park, N.C., Dec. 19, 2005, pp. 75047.
[116] Kinloch, A. J., Adhesion and Adhesives, Chapman and Hall, NY, 1987.
[117] Wu, S., Journal of Adhesion, 5, 39, 1973.
[118] Klein, J.; Briscoe, B. J., Polymer, 17, 481, 1976.
[119] Klein, J., Contemp. Phys., 20, 611, 1979.
[120] Hervet, H.; Urbach, W.; Rondelez, F., J. Chem. Phys., 68, 2725, 1978.
[121] Leger, L.; Hervet, H.; Rondelez, F., Macromolecules, 14, 1732, 1981.
[122] Berne, B. J.; Pecora, R., Dynamic Light Scattering, Wiley, New York, 1976.
[123] Chen, S. P.; Ferry, J. D., Macromolecules, 1, 270, 1968.
[124] von Meerwall, E., Rubber. Chem. Tech., 58, 527, 1985.
[125] von Meerwall, E.; Burgan, R. D.; Ferguson, R. D., J. Magn. Reson., 34, 339, 1979.
[126] von Meerwall, E.; Ferguson, R. D., Comp. Phys. Commun., 21, 421, 1981.
[127] von Meerwall, E.; Ferguson, R. D., J. Appl. Polym. Sci., 23, 3657, 1979.
[128] von Meerwall, E.; Ferguson, R. D., J. Polym. Sci. Polym. Phys. Ed., 19, 77, 1981.
[129] von Meerwall, E.; Tomich, D. H.; Hadjichristidis, N.; Fetters, L. J., Macromolecules, 15, 1157, 1982.
[130] von Meerwall, E.; J. Magn. Reson. Comp., 50, 409, 1982.
[131] Blum, F. D., Spectroscopy, 1(5), 32, 1986.
[132] Korsmeyer, R. W.; von Meerwall.; Peppas, N. A., E.; J. Polym. Sci. Polym. Phys. Ed., 24, 409, 1986.

I claim:

1. A process for making a multi-phase self-stratified coating comprising:
providing a substantially homogeneous composition of polymeric binder components, the polymeric binder components including:
an epoxy resin having (i) epoxide end groups or (ii) having an epoxide end group and a phosphate end group or (iii) having an epoxide end group and an ester end group, and
monomer components including a fluorinated vinyl-based monomer;
applying said substantially homogeneous composition of polymeric binder components to a substrate; and
curing said substantially homogeneous composition of polymeric binder components to cause the polymeric binder components to self-stratify into a multi-phase coating exhibiting a gradient compositional character, wherein each phase is predominant in a different polymeric binder component and phases are separated by a diffuse interface exhibiting the attributes of the polymeric binder component that is predominant at that interface, and wherein at least one phase is predominant in said epoxy resin, and at least one other phase is predominant in a fluorinated polymer derived from said fluorinated vinyl-based monomers.

2. The process of claim 1, wherein said monomer components further include monomers selected from the group consisting of acrylates, fluorinated carboxylic acids, fluorinated esters and fluorinated methacrylates.

3. The process of claim 1, wherein said substantially homogeneous composition includes a cross-linking agent selected from a group consisting of methylated melamine formaldehyde resin, polyamide, an ethylene glycol acrylate, hydroxylamide, a methylenebisacrylamide, isocyanate, and auto-oxidative cross-linking agents.

4. The process of claim 1, wherein said epoxy resin includes reactive internal hydroxyl groups and telechelic reactive epoxide end groups.

5. The process of claim 4, wherein said epoxy resin has at least two phenol functional groups.

6. The process of claim 5, wherein said epoxy resin is bisphenol-A (BPA) epoxide.

7. The process of claim 5, wherein said epoxy resin is a glycidyl ester, a glycidyl ether, or a cycloaliphatic epoxide.

8. The process of claim 7, wherein said epoxy resin is an epoxy phosphate.

9. The process of claim 4, wherein said epoxy resin is an epoxy ester.

10. The process of claim 1, wherein said epoxy resin is modified with an alkoxide oligomer.

11. The process of claim 10, wherein said alkoxide oligomer is a non-metal alkoxysilane oligomer.

12. The process of claim 11, wherein said alkoxysilane oligomer is a tetraethylorthosilicate oligomer.

13. The process of claim 11, wherein said alkoxysilane oligomer is a tetramethylorthosilicate oligomer.

14. The process of claim 2, wherein said monomer components include a plurality of acrylates selected from the group consisting of methyl methacrylate, ethyl methacrylate, cyclohexyl acrylate, hexyl acrylate, w-butyl acrylate and 2-hydroxyethyl methacrylate.

15. The process of claim 1, wherein said fluorinated polymer derived from said fluorinated vinyl-based monomers is a fluorinated alcohol esterified with one of a methacrylic acid, an acrylic acid, or acid chlorides thereof.

16. The process of claim 15, wherein said fluorinated polymer derived from said fluorinated vinyl-based monomers is 2,2,2-trifluoroethyl methacrylate.

17. The process of claim 2, wherein said at least one other phase predominant in a fluorinated polymer derived from said fluorinated vinyl-based monomers includes between 1 and 25 wt % of fluorinated ester.

18. The process of claim 2, wherein said at least one other phase predominant in a fluorinated polymer derived from said fluorinated vinyl-based monomers includes between 2.5 and 15 wt % of acrylates and/or methacrylates.

19. The process of claim 1, wherein the substantially homogeneous composition of polymeric binder components is applied to the substrate by a liquid application technique selected from dipping, spraying, and brushing.

20. The process of claim 1, wherein the process replaces inorganic chromating and zinc phosphating pretreatments to provide corrosion resistance to the substrate.

* * * * *